(12) United States Patent
Bagnato et al.

(10) Patent No.: US 7,885,807 B2
(45) Date of Patent: Feb. 8, 2011

(54) TEXT ANALYSIS, TRANSLITERATION AND TRANSLATION METHOD AND APPARATUS FOR HIEROGLYPIC, HIERATIC, AND DEMOTIC TEXTS FROM ANCIENT EGYPTIAN

(75) Inventors: Domenica Bagnato, Vienna (AT); Alexander Prosser, Vienna (AT)

(73) Assignee: Hierodiction Software GmbH, Ganserndorf Sud (AT)

( * ) Notice: Subject to any disclaimer, the term of this patent is extended or adjusted under 35 U.S.C. 154(b) by 927 days.

(21) Appl. No.: 11/612,277

(22) Filed: Dec. 18, 2006

(65) Prior Publication Data
US 2008/0097745 A1   Apr. 24, 2008

(51) Int. Cl.
*G06F 17/28* (2006.01)
(52) U.S. Cl. .................... 704/4; 704/2; 704/277
(58) Field of Classification Search ........... 704/1–10, 704/277, 251, 257, 270.1
See application file for complete search history.

(56) References Cited

U.S. PATENT DOCUMENTS

| | | | | |
|---|---|---|---|---|
| 4,916,614 A | * | 4/1990 | Kaji et al. ............... | 704/2 |
| 6,002,997 A | * | 12/1999 | Tou ........................ | 704/2 |
| 7,333,927 B2 | * | 2/2008 | Lee et al. ................ | 704/4 |

OTHER PUBLICATIONS

Galucci C; Automatic Translation of Ancient Egyptian; Dec. 17, 2003.
Anonymous; Glyphkey v.2.1; Nov. 5, 2001.
Oard, D W, et al.; Effects of term segmentation on Chinese/English cross-language information retrieval; 6th International symposium on String Processing and Information Retrieval 5th International Workshop on Groupware; Sep. 22, 1999.
Anonymous, Determinative; Online Publication, Feb. 23, 2007.

\* cited by examiner

*Primary Examiner*—Huyen X. Vo
(74) *Attorney, Agent, or Firm*—Stites & Harbison PLLC; Richard S. Myers, Jr.

(57) ABSTRACT

A system for translating a body of text in an initial language into a target language, that comprises an input device for imputing a body of text comprising a plurality of elements, a first analyzer for analyzing said text and identifying one or more possible characters of said initial language corresponding to respective said elements, a second analyzer for analyzing a stream of said identified characters to identify known characters or recognizable patterns thereof and assign thereto one or more potential translations into said target language, a third analyzer for analyzing the potential translations in conjunction with one or more determinatives representative of a conceptual framework of said text to determine which potential translations correspond with said conceptual framework, and an output device for outputting one or more potential translations determined to correspond with said conceptual framework.

25 Claims, 35 Drawing Sheets

Overview of the invention

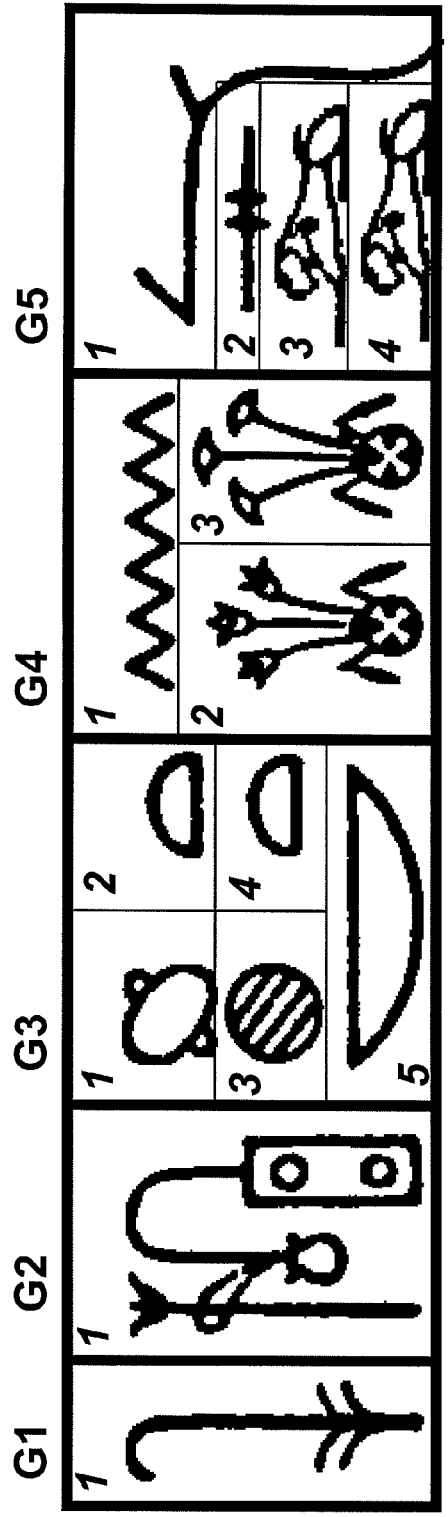
Fig. 1a: Group patterns and placeholders
Source: E. von Bergmann (trans.), Der Sarcophag des Nesschutafnut in der Sammlung Ägyptischer Alterthümer des Österr. Kaiserhauses in; G. Maspero (ed.), Recueil De Travaux Relatifs A La Philogie Et A L'Archéologie Égyptiennes Et Assyriennes: Sixième Année (Paris, 1885), 4

*Fig. 1b: Hieroglyphics mentioned in the text*

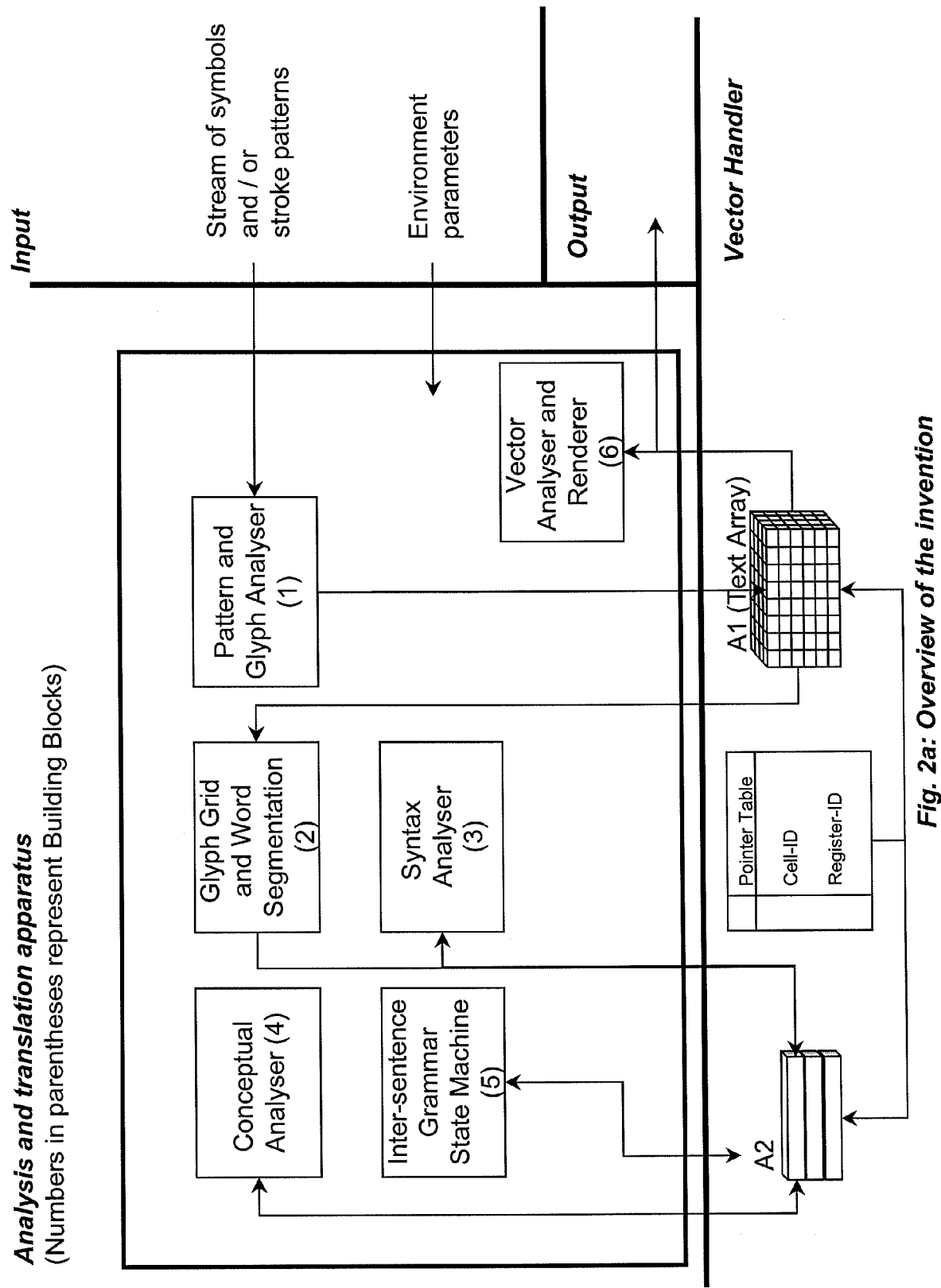
Fig. 2a: Overview of the invention

States of text array cells (A1) representing a symbol or pattern variant:
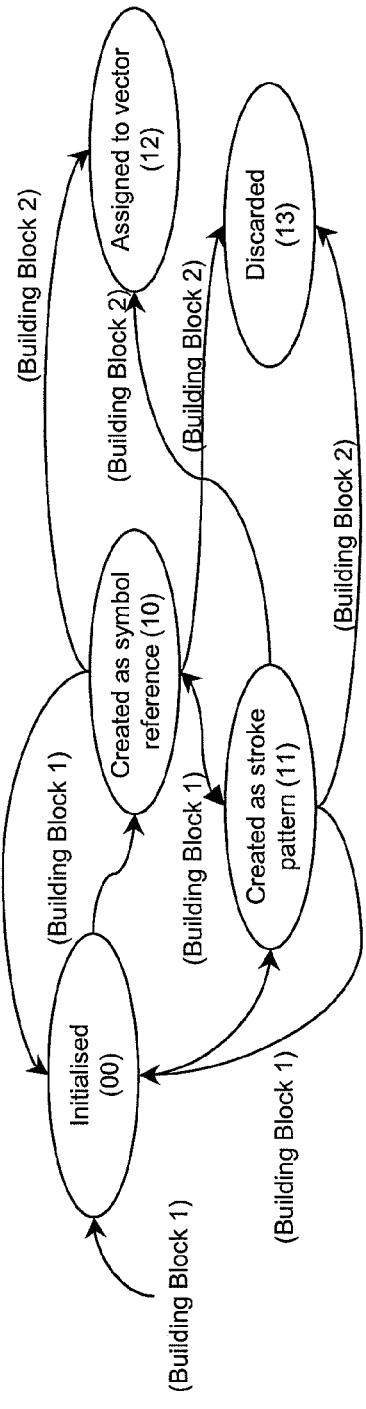
States of vectors (A2) representing a word/form variant:
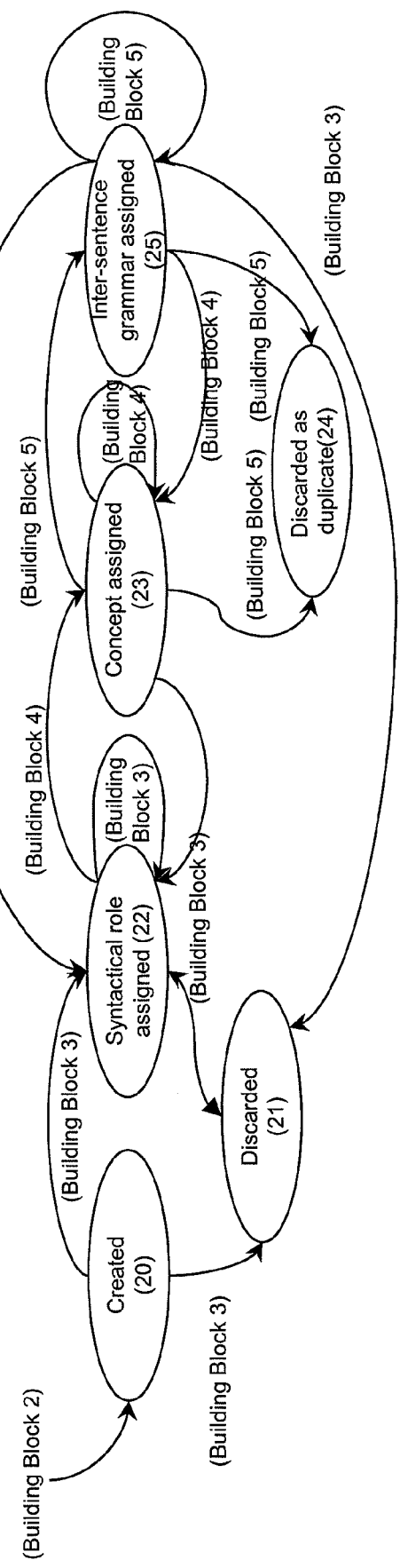
Fig. 2b: States of text array cells and vectors

A1 := (Physical Text Array, Collection(Array Function Primitive))

Array Function Primitive := Enumeration(determineCell, createCell, setCellContent, getCellContent, removeCell)
Physical Text Array := Array(Cell(Cell-ID, Content))

Cell-ID := (a,b,c) with a,b,c as vector identifying the cell in the array
a := line in register
b := number of the placeholder in the line
c := sequence number of alternatives for each vector (a,b)
Cell (a,b,c) is mapped onto a physical media address. If the media does not support variable cell length, a maximum length for content is defined in the embodiment.

Physical Text Array

| Cell | | | | |
|---|---|---|---|---|
| Cell-ID | Content | | | |
| | Type of Content | Group Pattern Type (cf. Fig. 4a) | Symbol reference or Stroke Pattern | Ligature Reference | State (cf. Fig. 2b) |

Type of Content := {"Empty" | "Symbol" | "Stroke Pattern"}

Stroke Pattern := Collection(Characteristic stroke)
Characteristic stroke := Collection(pixel-matrix information of characteristic point)

Ligature Reference := Collection(Cell-ID)

*The function primitives are specified in Figures 3b,c*

*Fig. 3a: Structure of the A1 Handler*

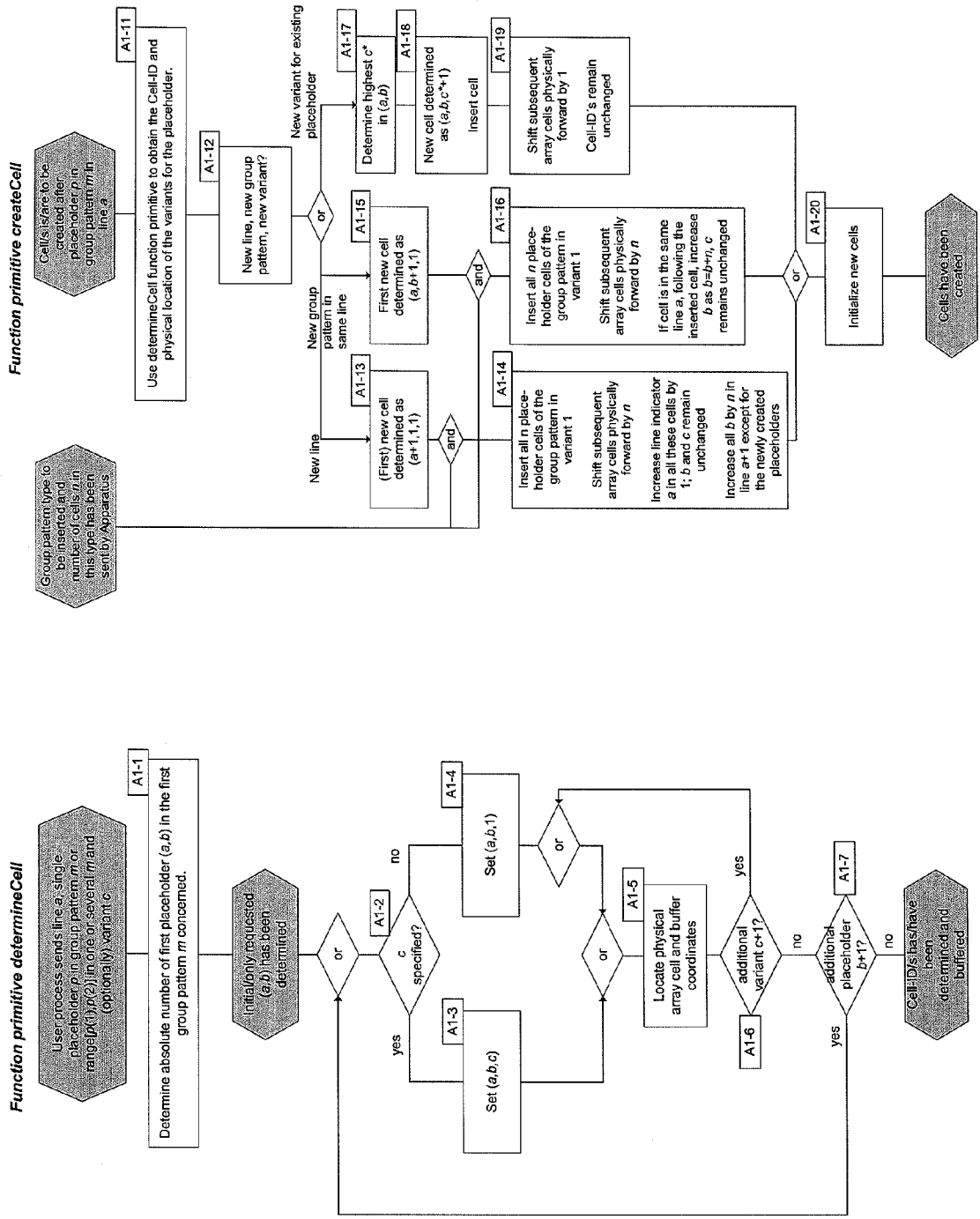
Fig. 3b: Function primitives offered for A1

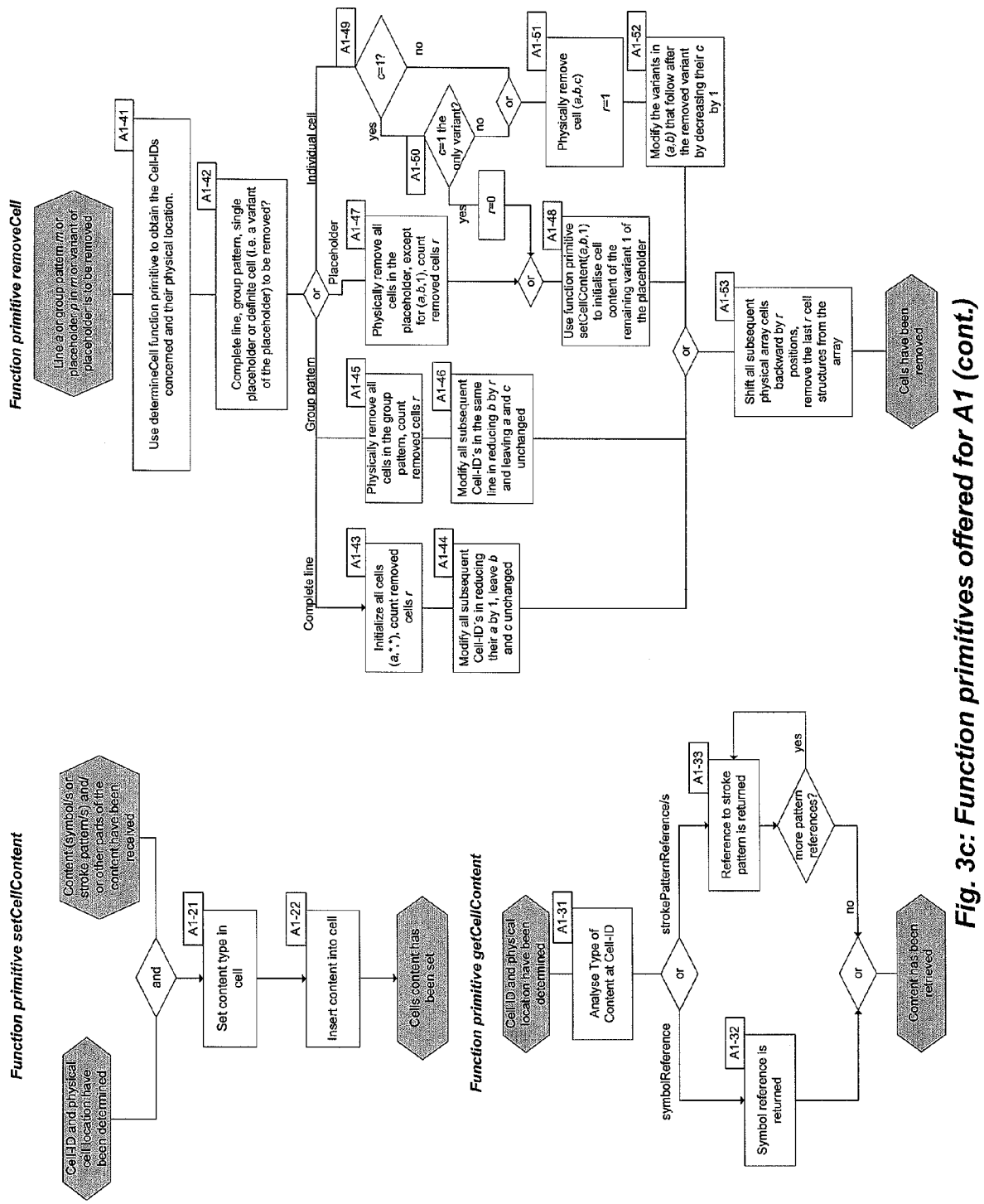
Fig. 3c: Function primitives offered for A1 (cont.)

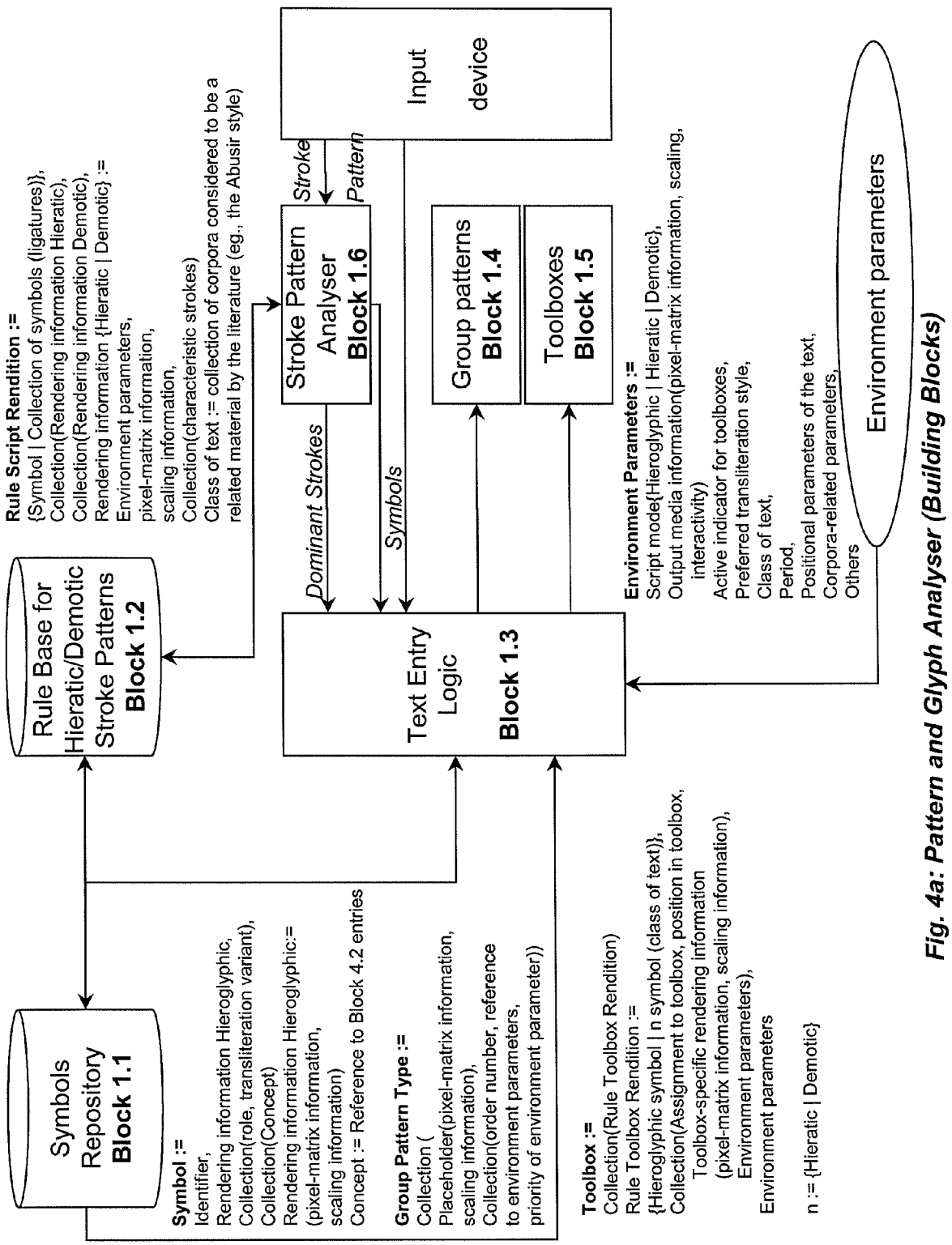
*Fig. 4a: Pattern and Glyph Analyser (Building Blocks)*

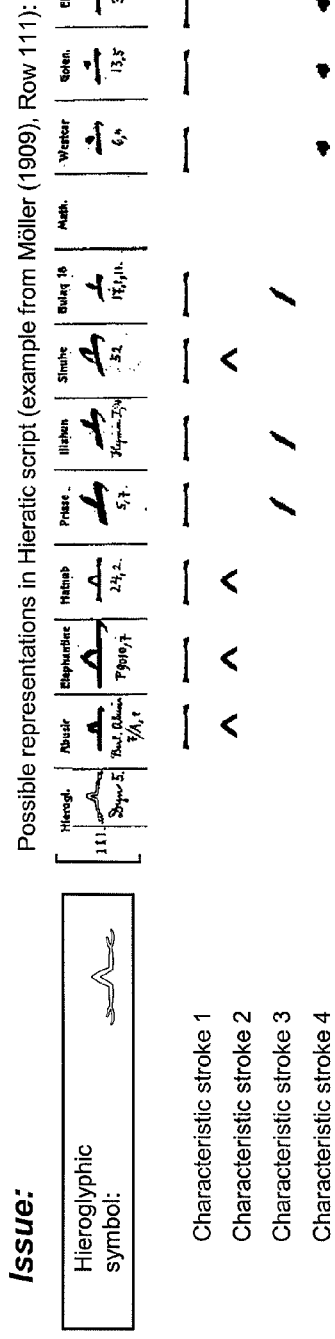
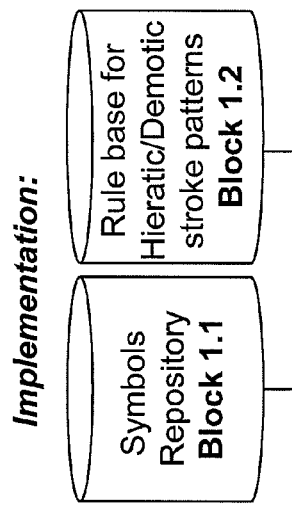
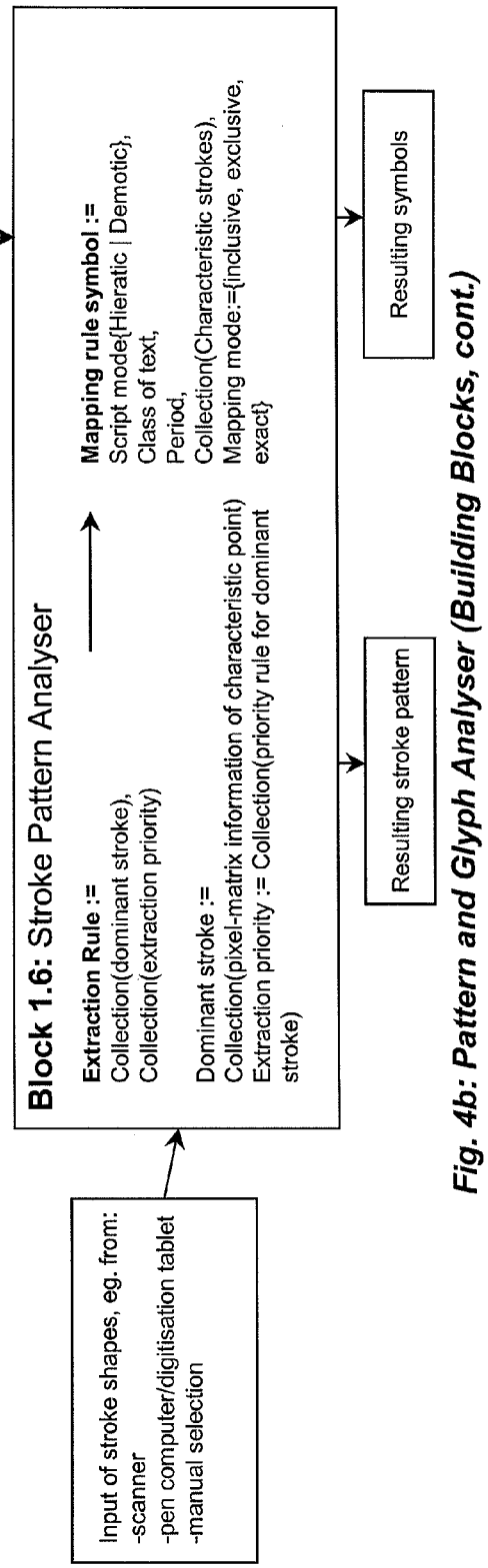
Fig. 4b: Pattern and Glyph Analyser (Building Blocks, cont.)

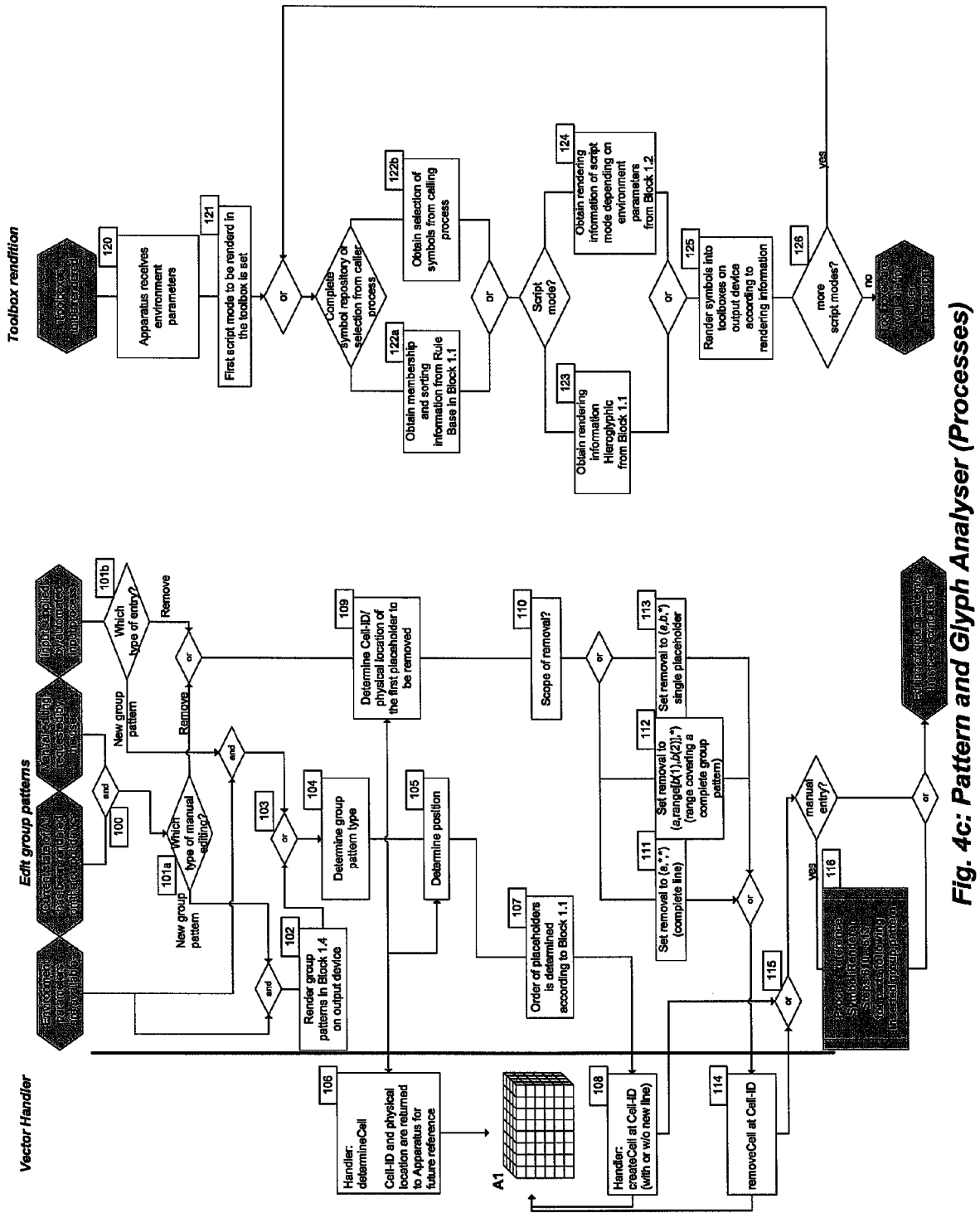
Fig. 4c: Pattern and Glyph Analyser (Processes)

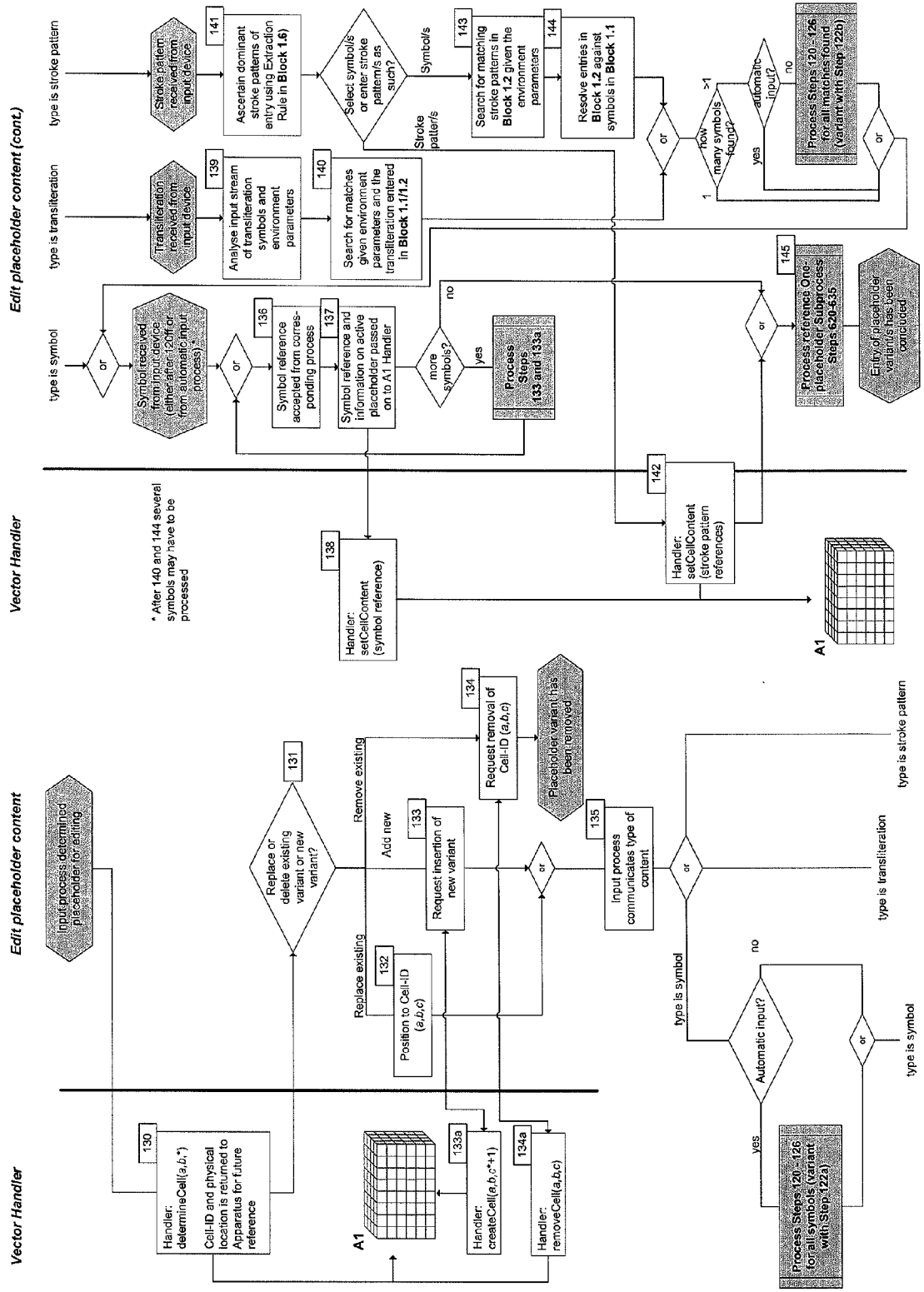
Fig. 4d: Pattern and Glyph Analyser (Building Blocks, cont.)

A2 := (Vector Path Array, Collection(Vector Path Function Primitive), Pointer Table)

Vector Path Function Primitive := Enumeration(amendPath, getRegisterContent, setRegisterContent, removePath, checkForDuplicatePath)
Vector Path Array := Array(Register-ID, Content)

Register-ID := (p,s) with p,s as coordinates identifying the register, which is mapped onto a physical media address
p := path number (an alternative word segmentation path through the text as represented in the A1 Handler)
s := sequence number of the register in the path p Vector Path Array

| Register | | | | |
|---|---|---|---|---|
| Register-ID | Content | | | |
| | Glyph grid vector (Fig. 6a) | Collection(variant, sentence structure assignment, {Retrograde \| not retrograde}) | Transliteration Collection(variant, translation) | Collection((type of attestation, attestation)) | State (Fig. 2b) |

Sentence structure assignment := Sentence element identifier (see Fig. 7c)
Concept Indicator (see Fig. 8d)
Type of attestation := {"Glyph Grid" | "Sentence" | "ISG"}

*The function primitives are specified in Figures 5b-d.*

Pointer Table := Tuples(Register-ID, Cell-ID)

*Fig. 5a: Structure of the A2 handler*

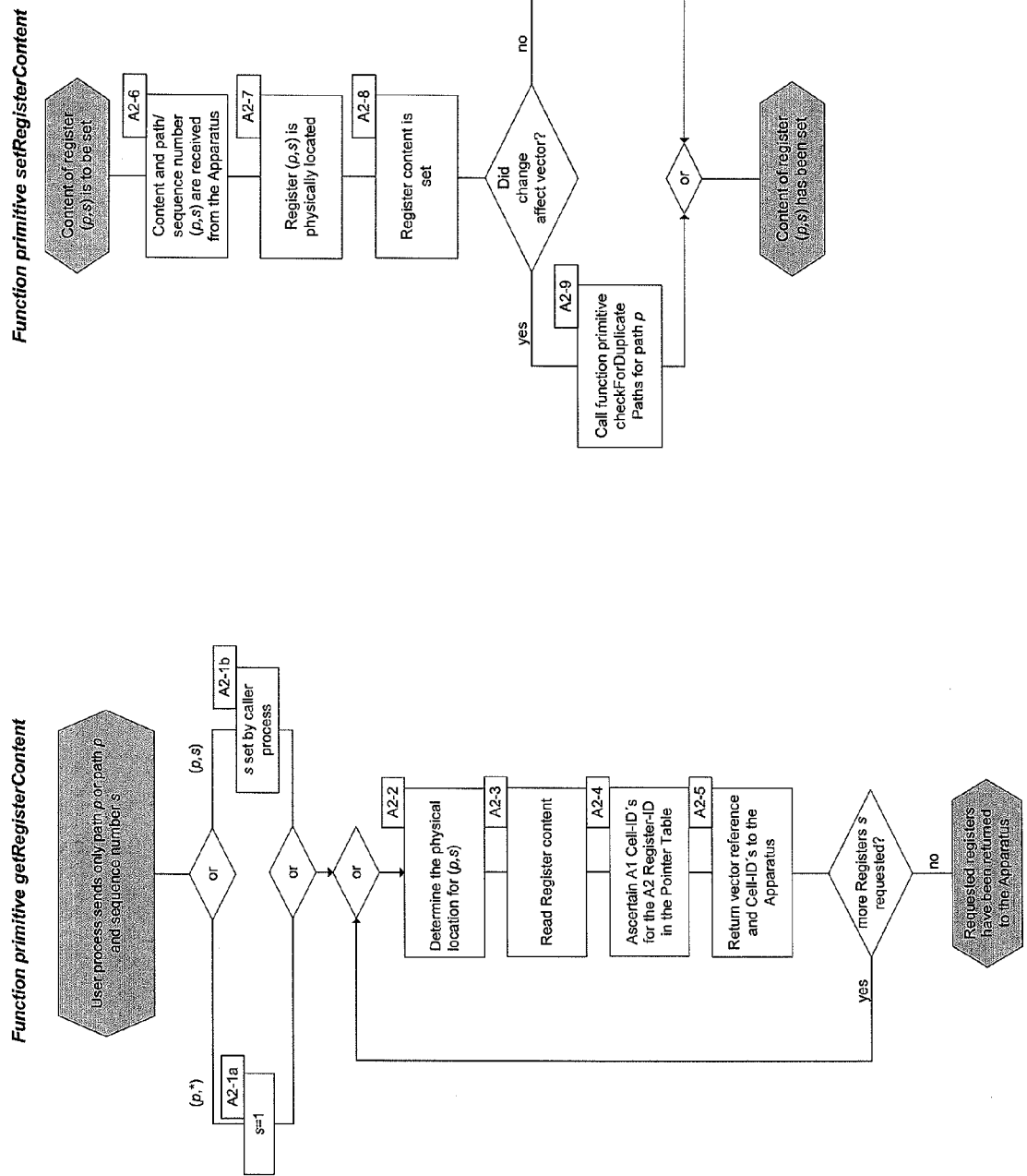
Fig. 5b: Function primitives offered for A2

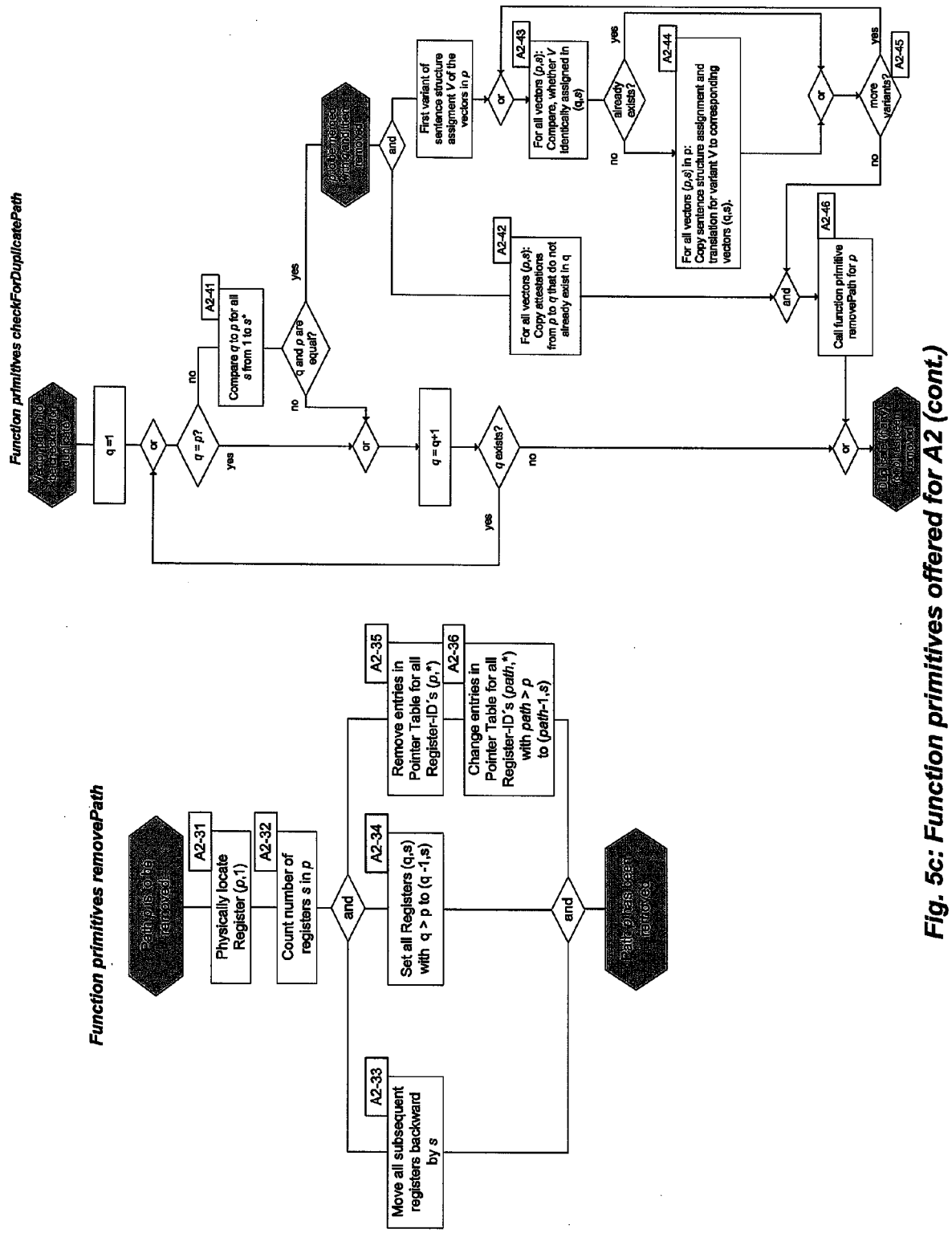
Fig. 5c: Function primitives offered for A2 (cont.)

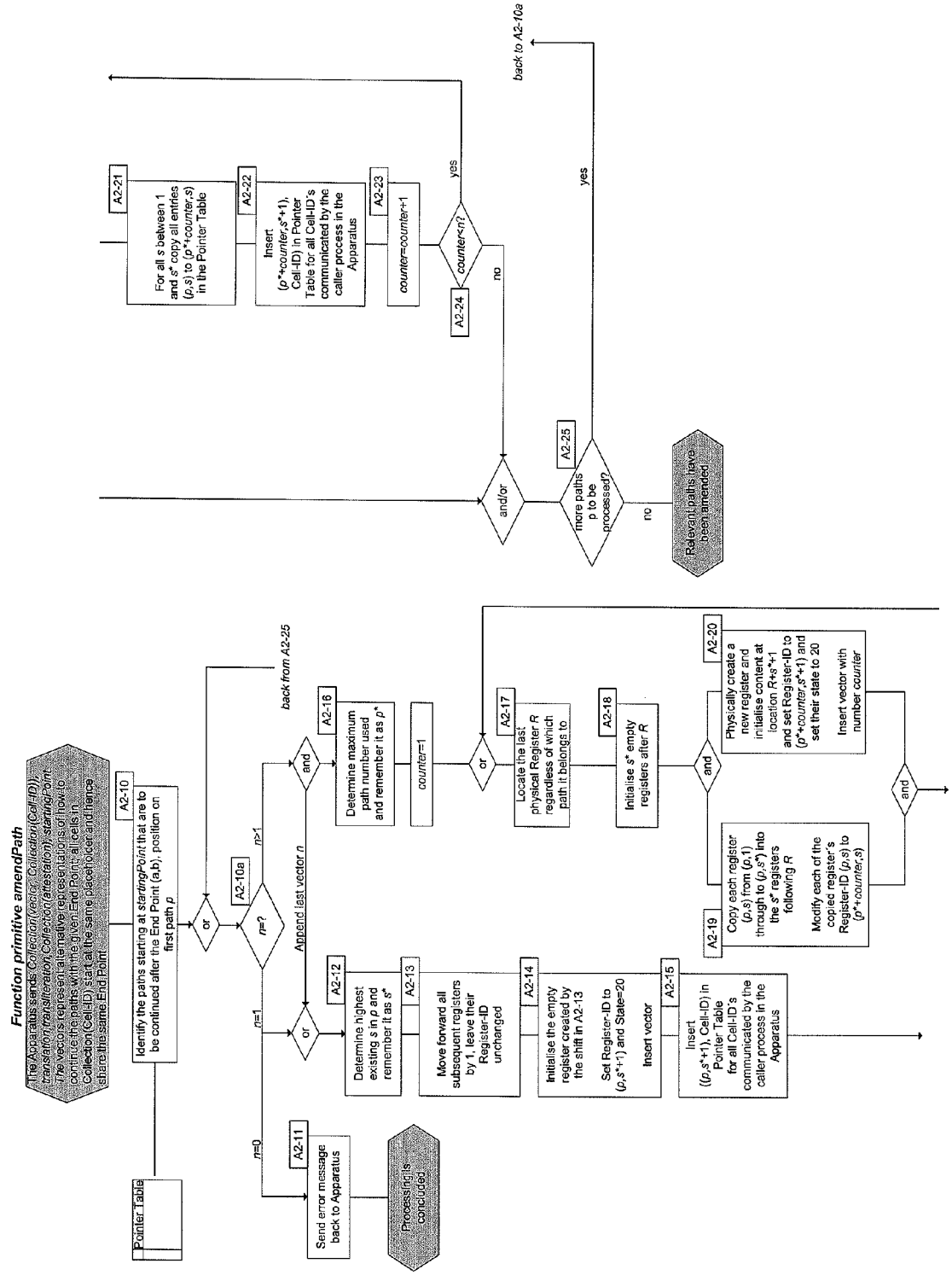
Fig. 5d: Function primitives offered for A2 (cont.)

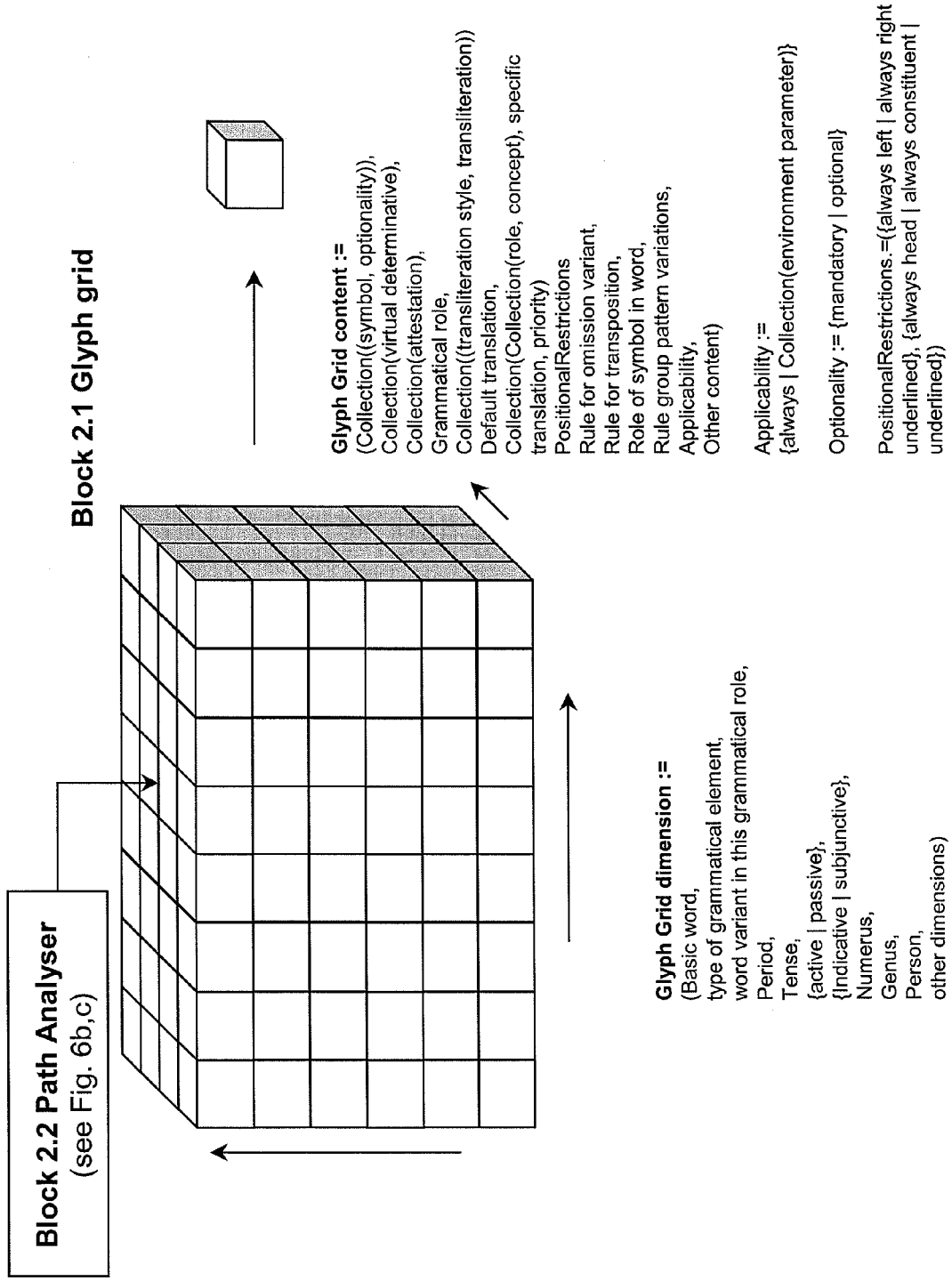
Fig. 6a: Building Block 2 – Glyph grid

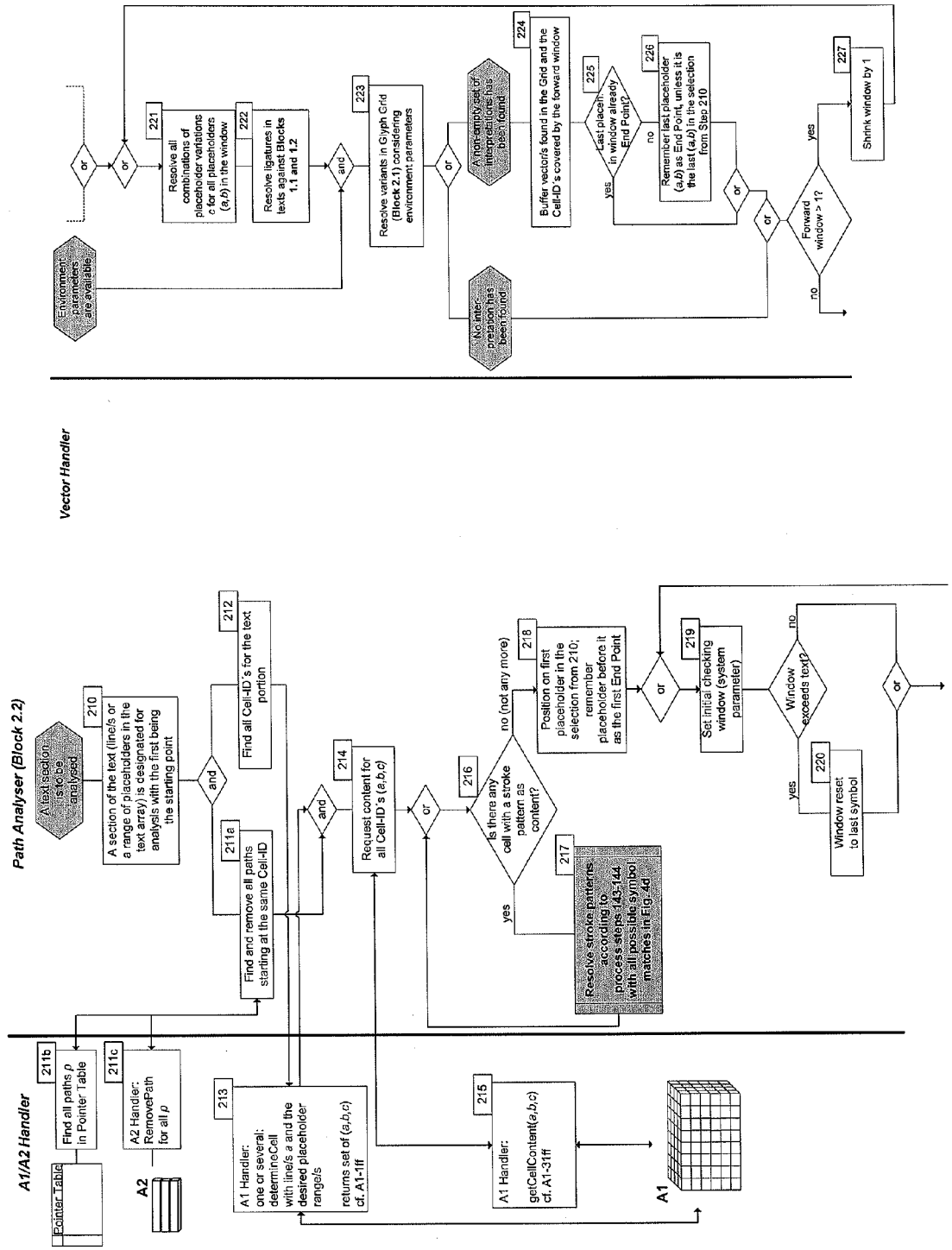
Fig. 6b: Word segmentation

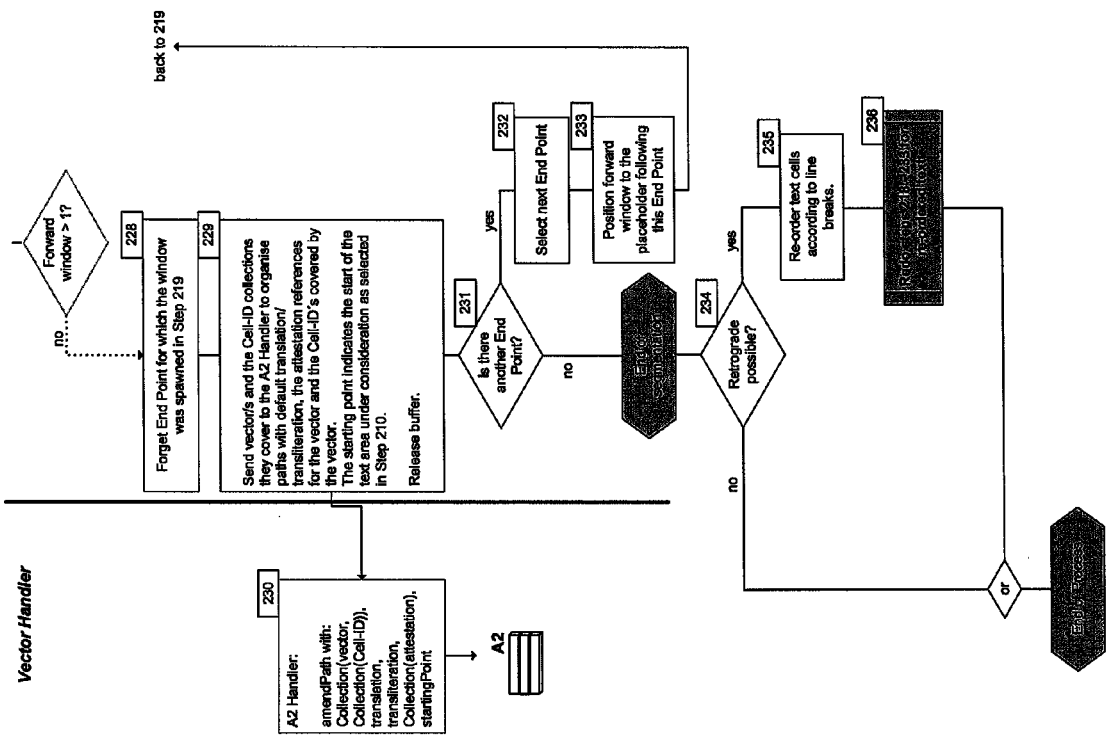
Fig. 6c: Word segmentation (cont.)

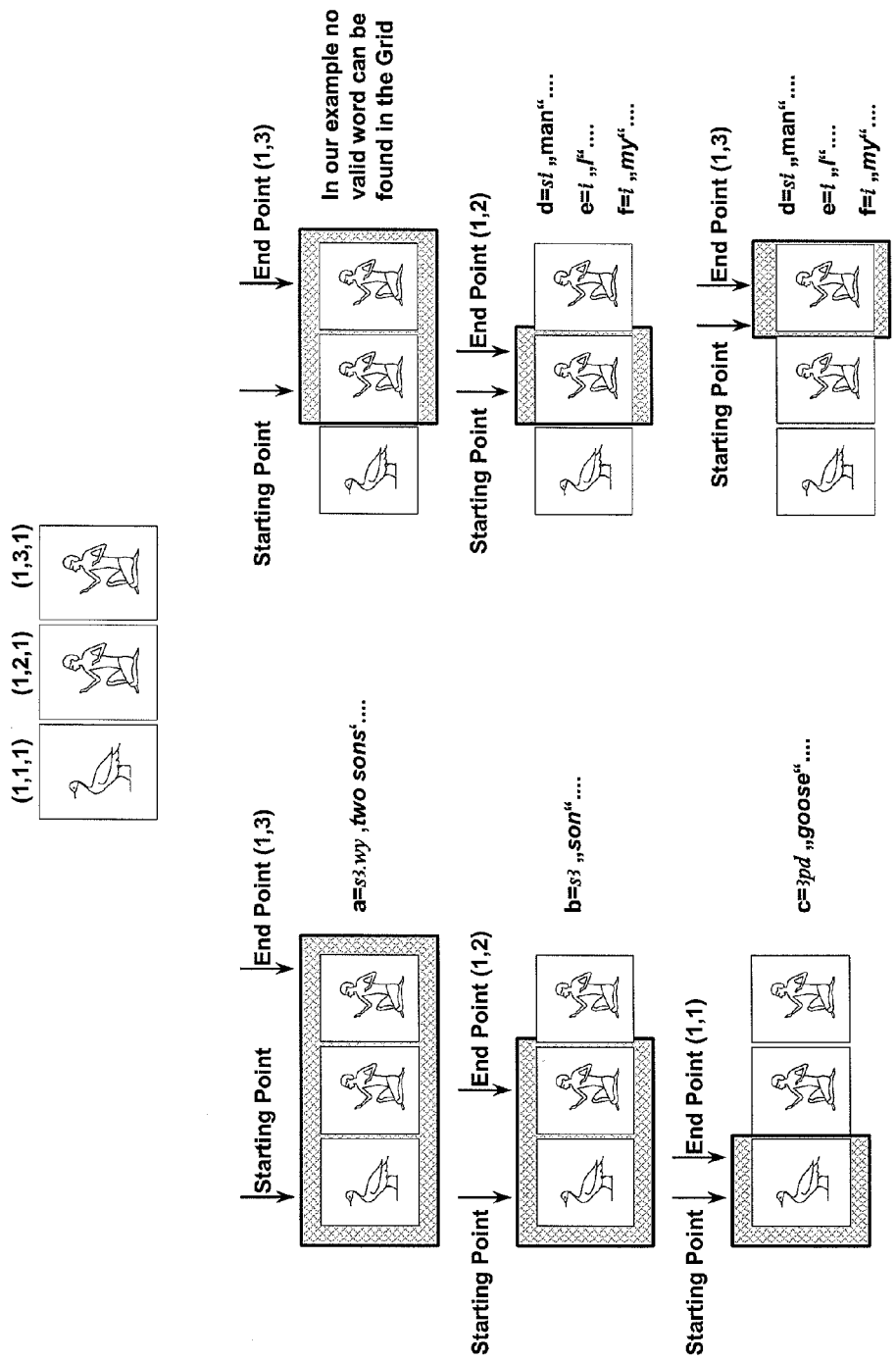
*Fig. 6d: Word segmentation (Example)*

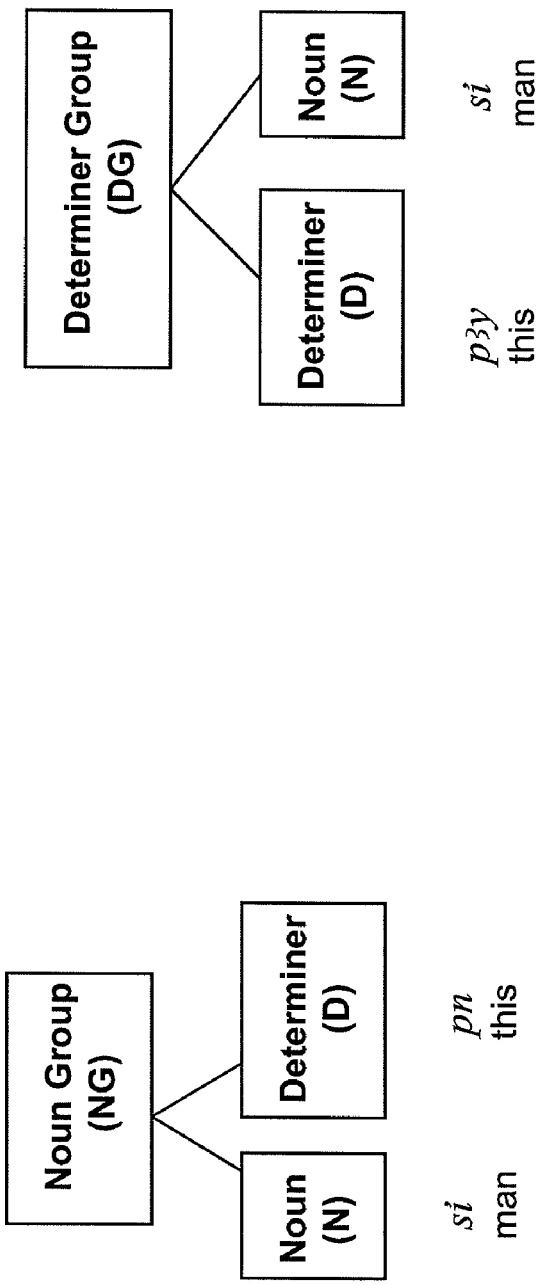
Fig. 7a: Binary trees

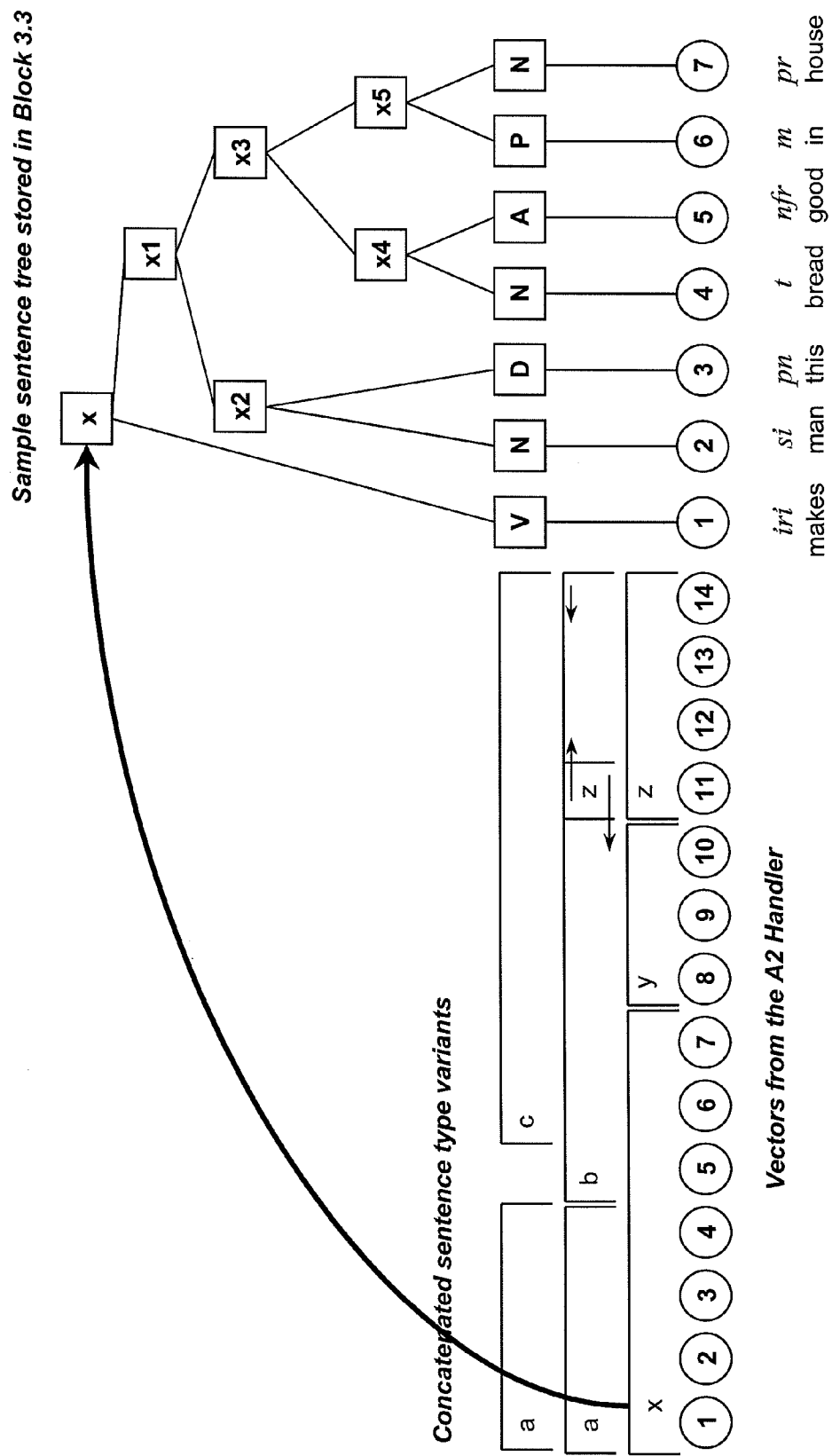
Fig. 7b: Binary trees and sentence variants

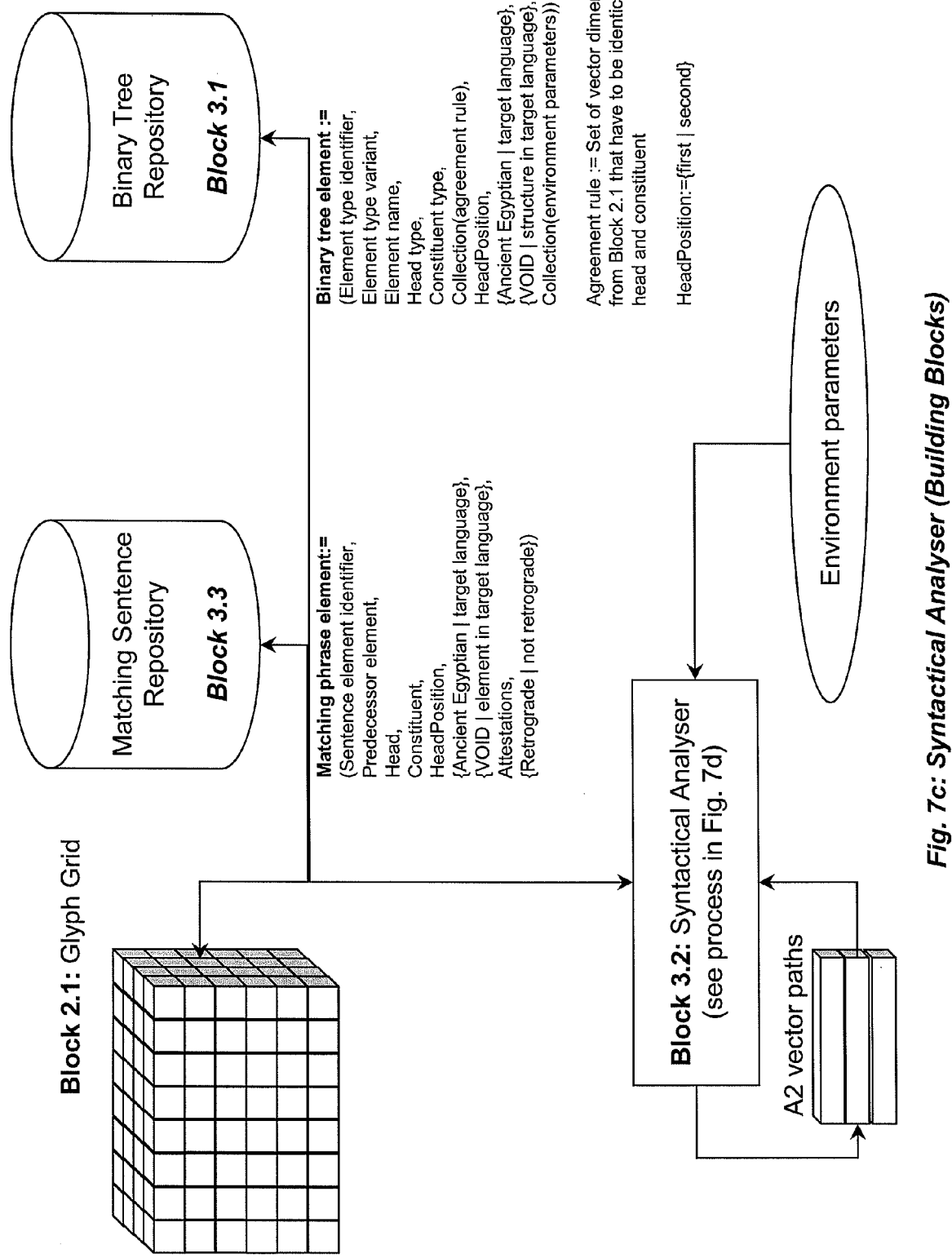
Fig. 7c: Syntactical Analyser (Building Blocks)

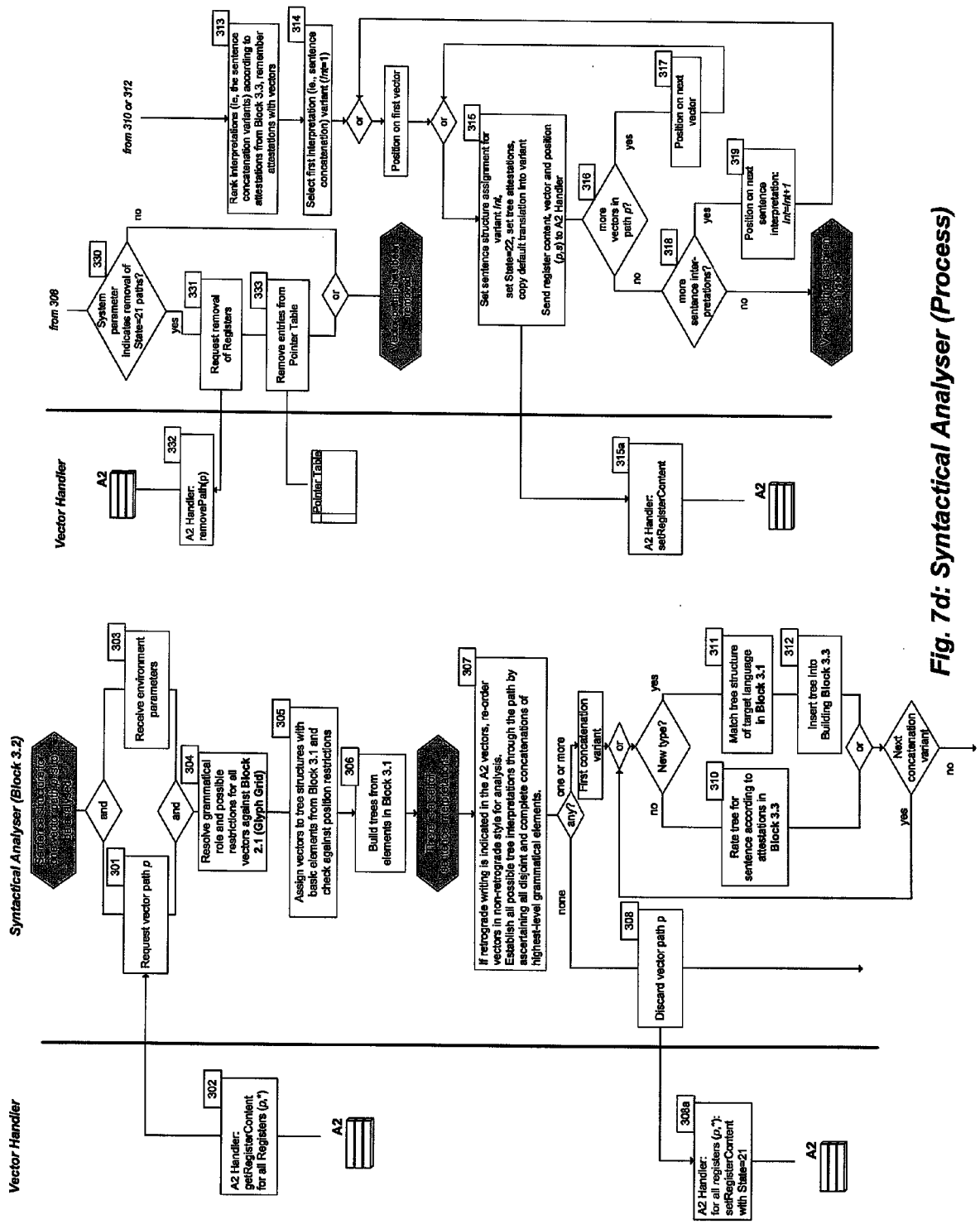
Fig. 7d: Syntactical Analyser (Process)

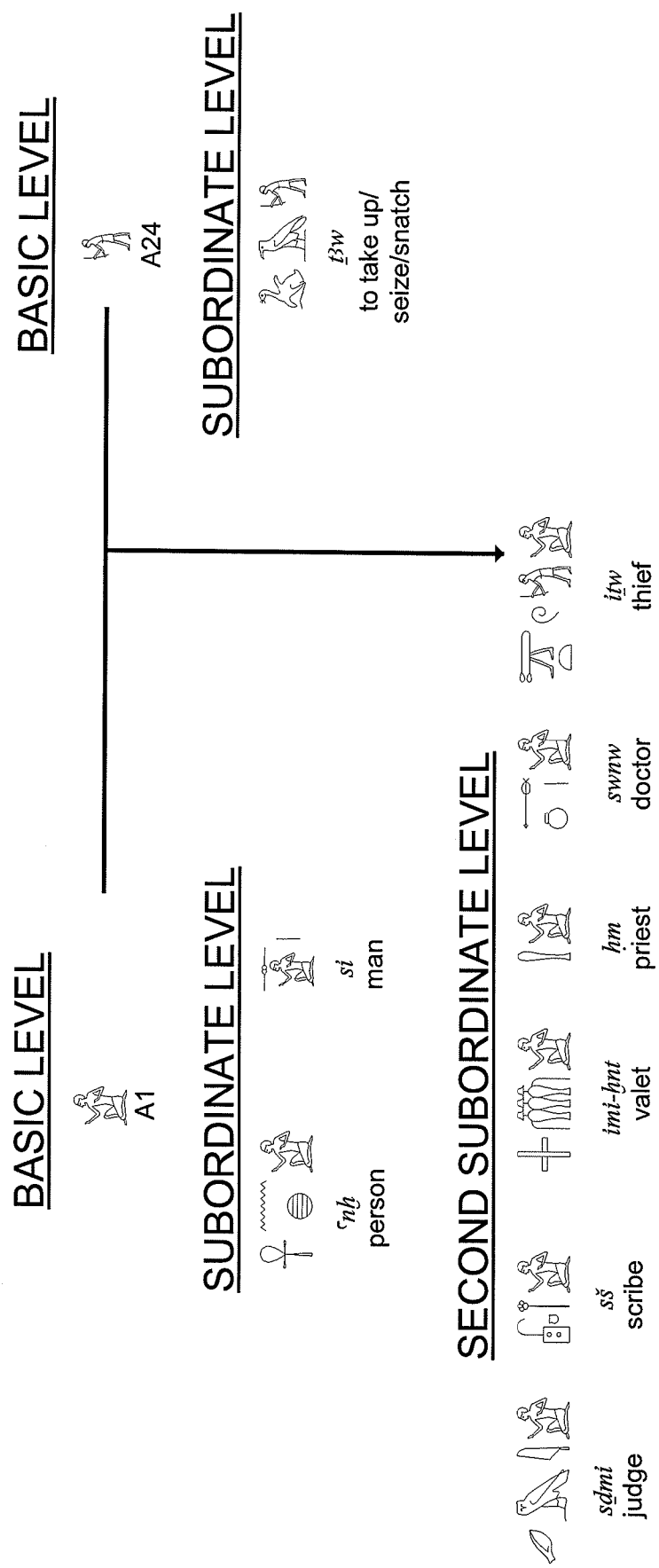
*Fig. 8a: Conceptual framework*

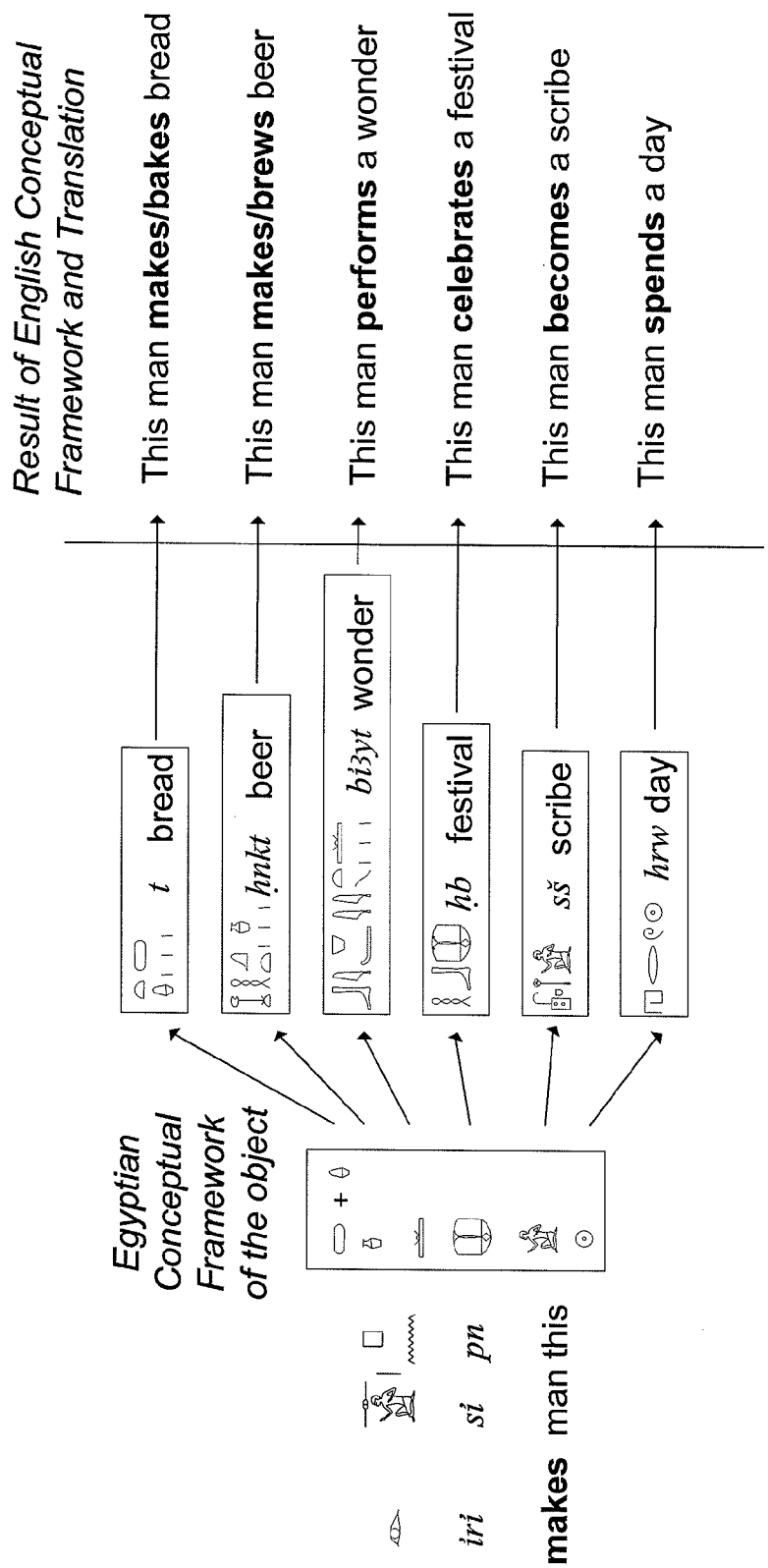
Fig. 8b: Conceptual framework across sentence structures

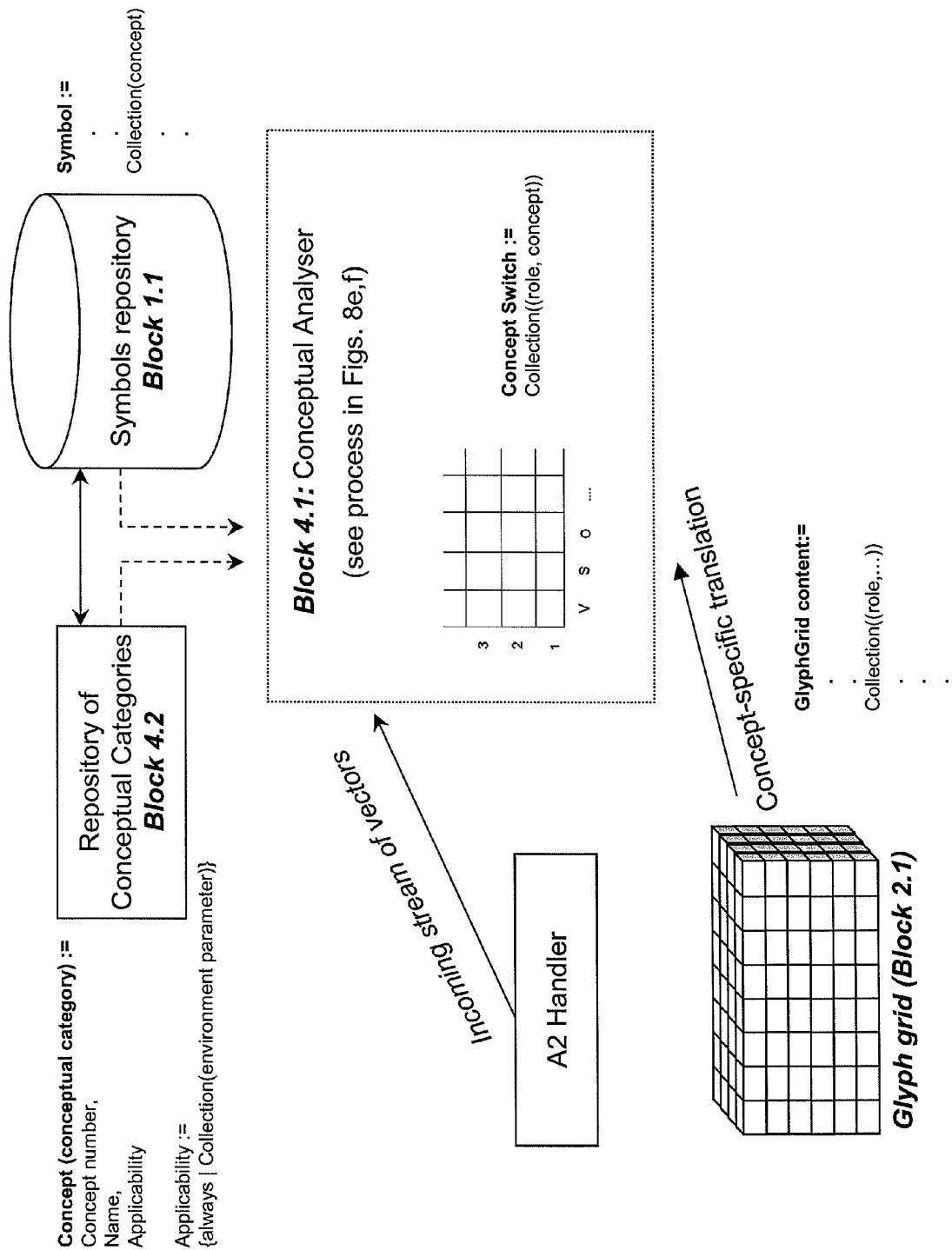
*Fig. 8c: Conceptual Analysis (Building Blocks)*

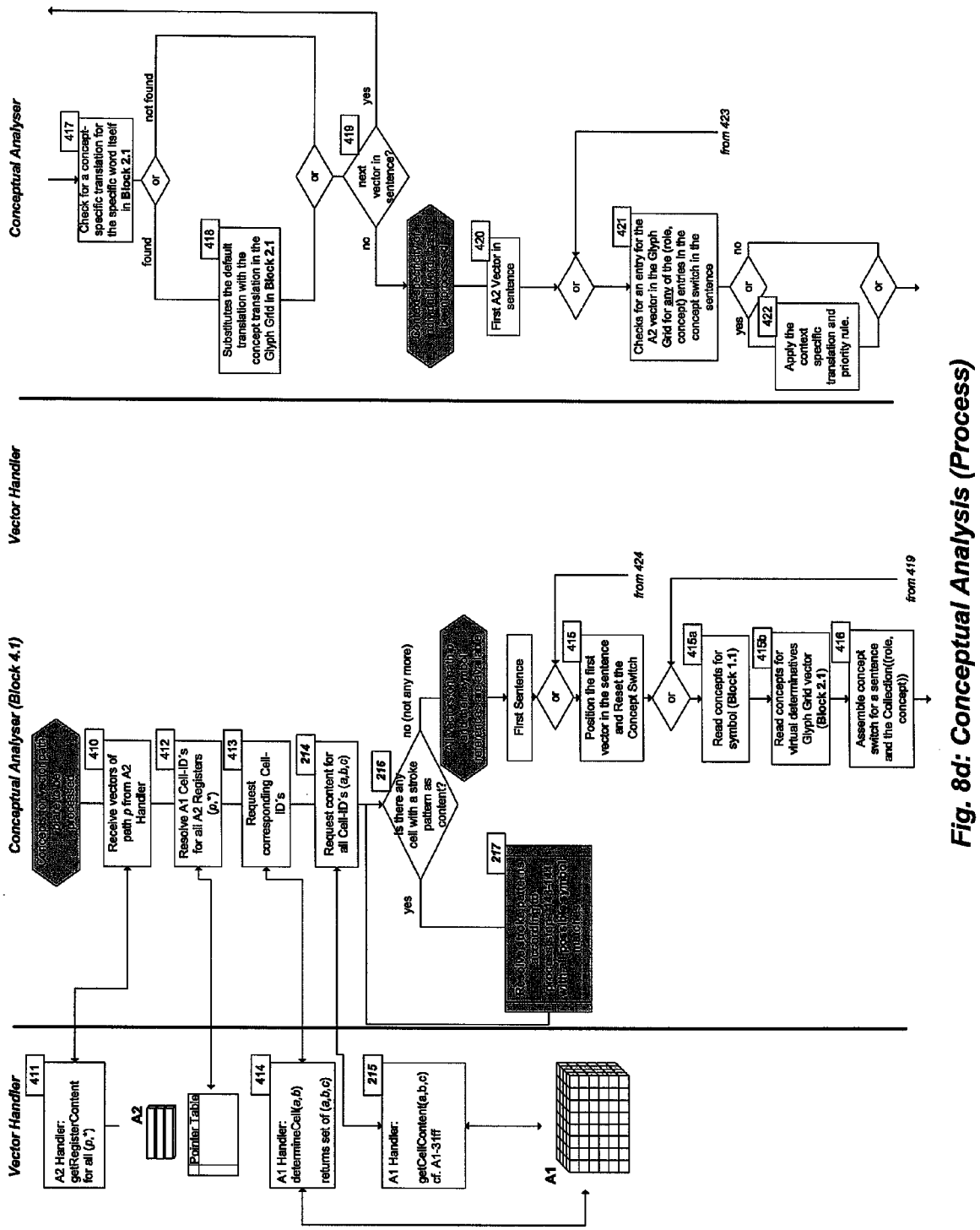
Fig. 8d: Conceptual Analysis (Process)

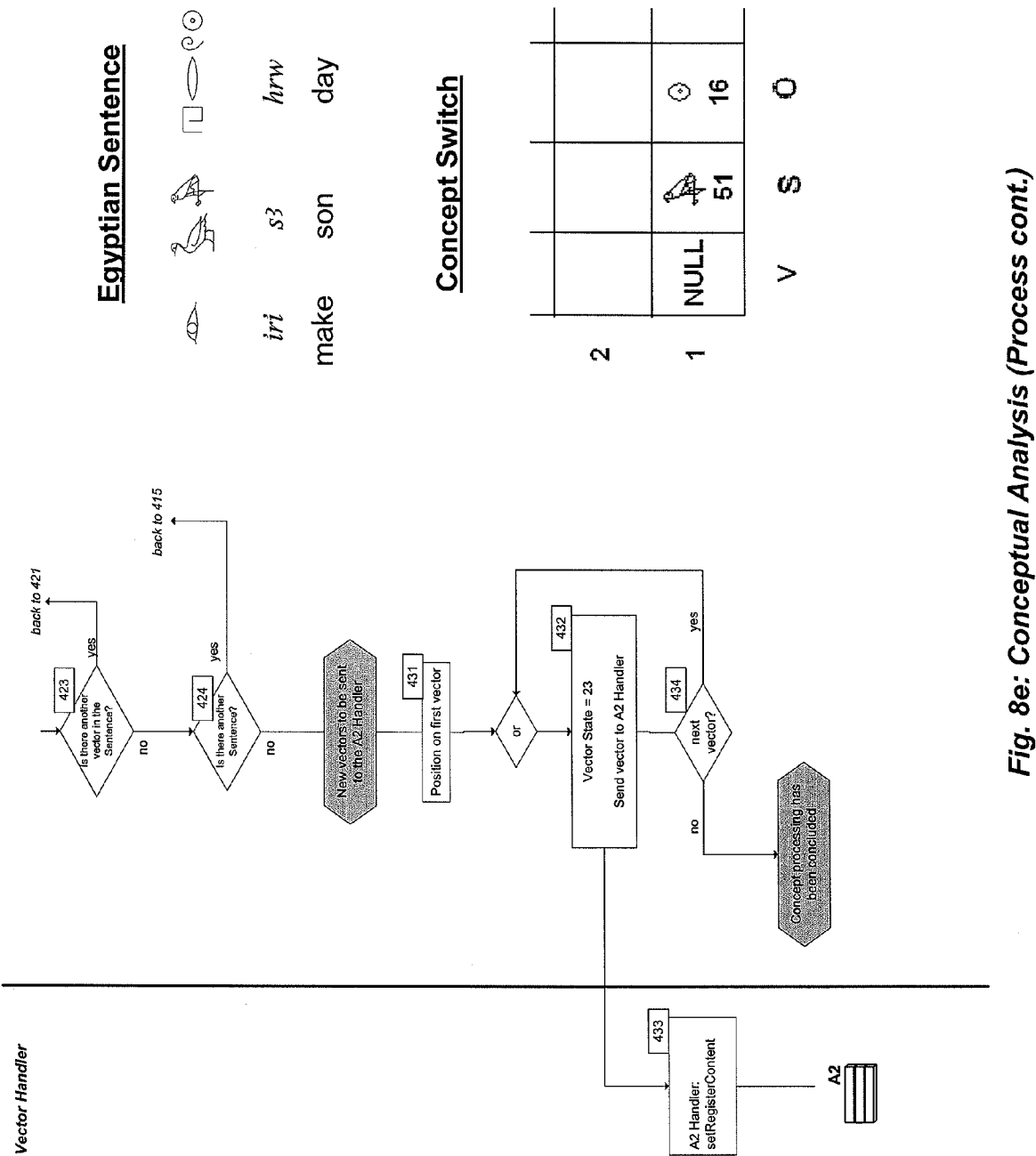
*Fig. 8e: Conceptual Analysis (Process cont.)*

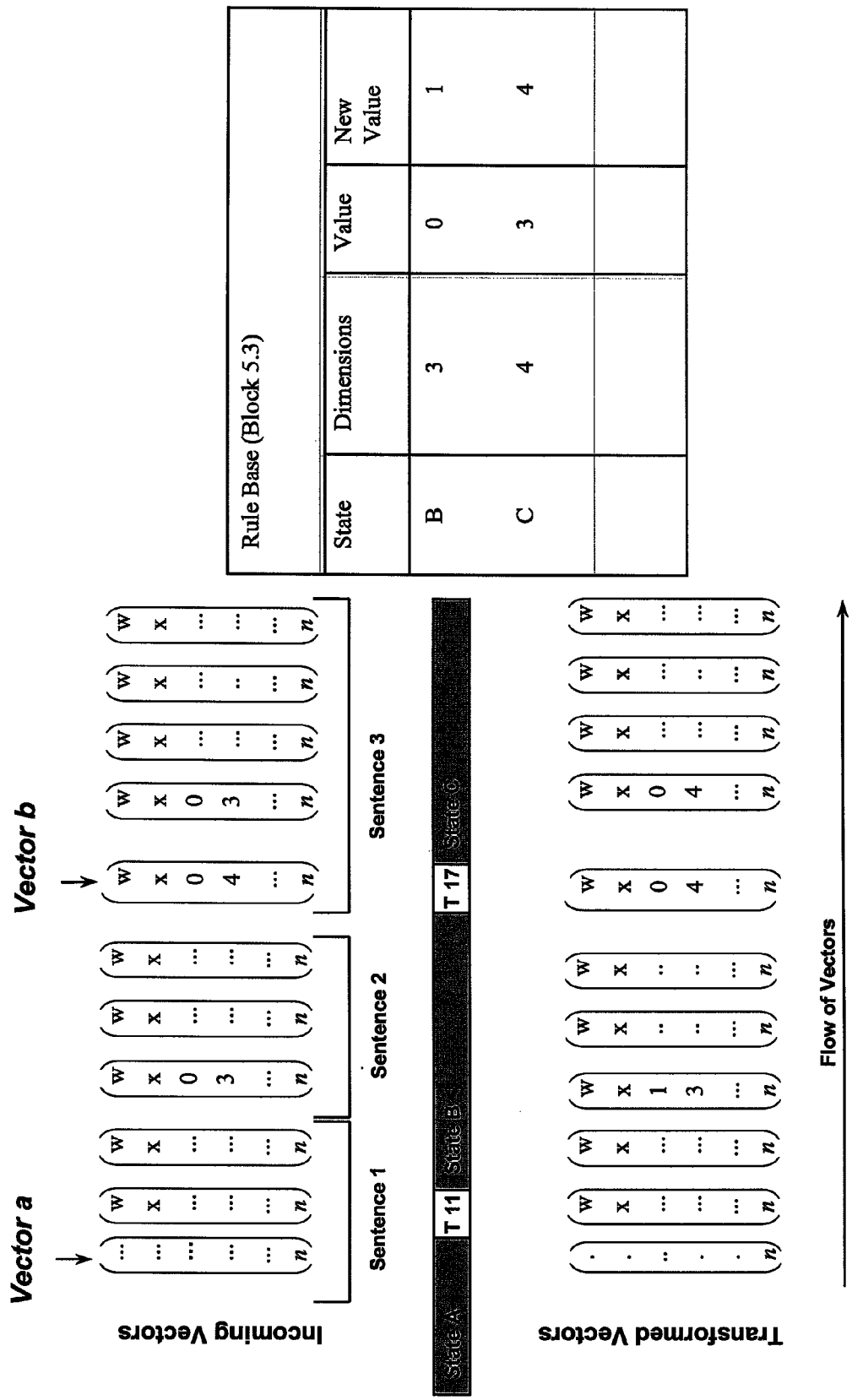
Fig. 9a: Inter-sentence grammar analysis

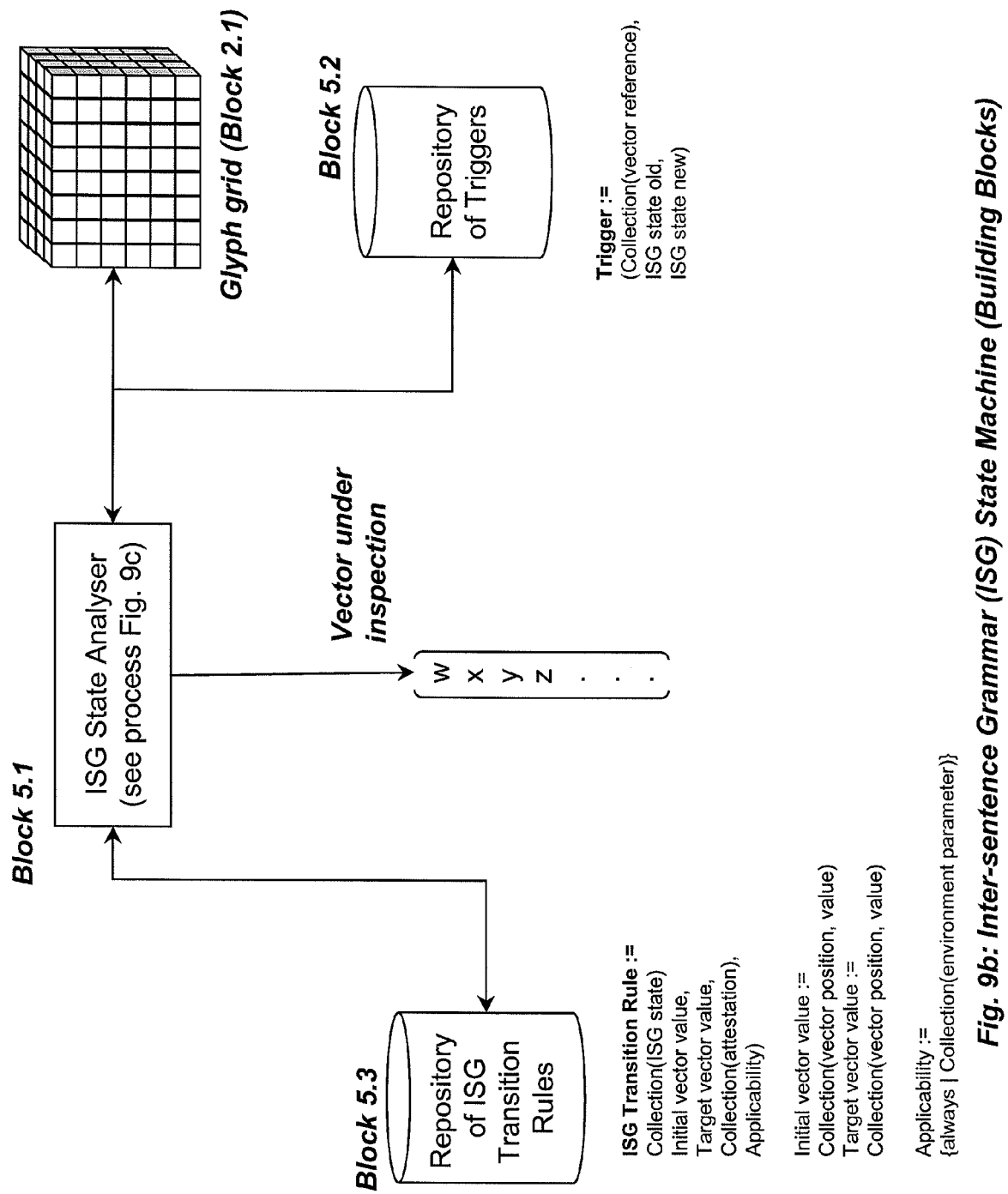
Fig. 9b: Inter-sentence Grammar (ISG) State Machine (Building Blocks)

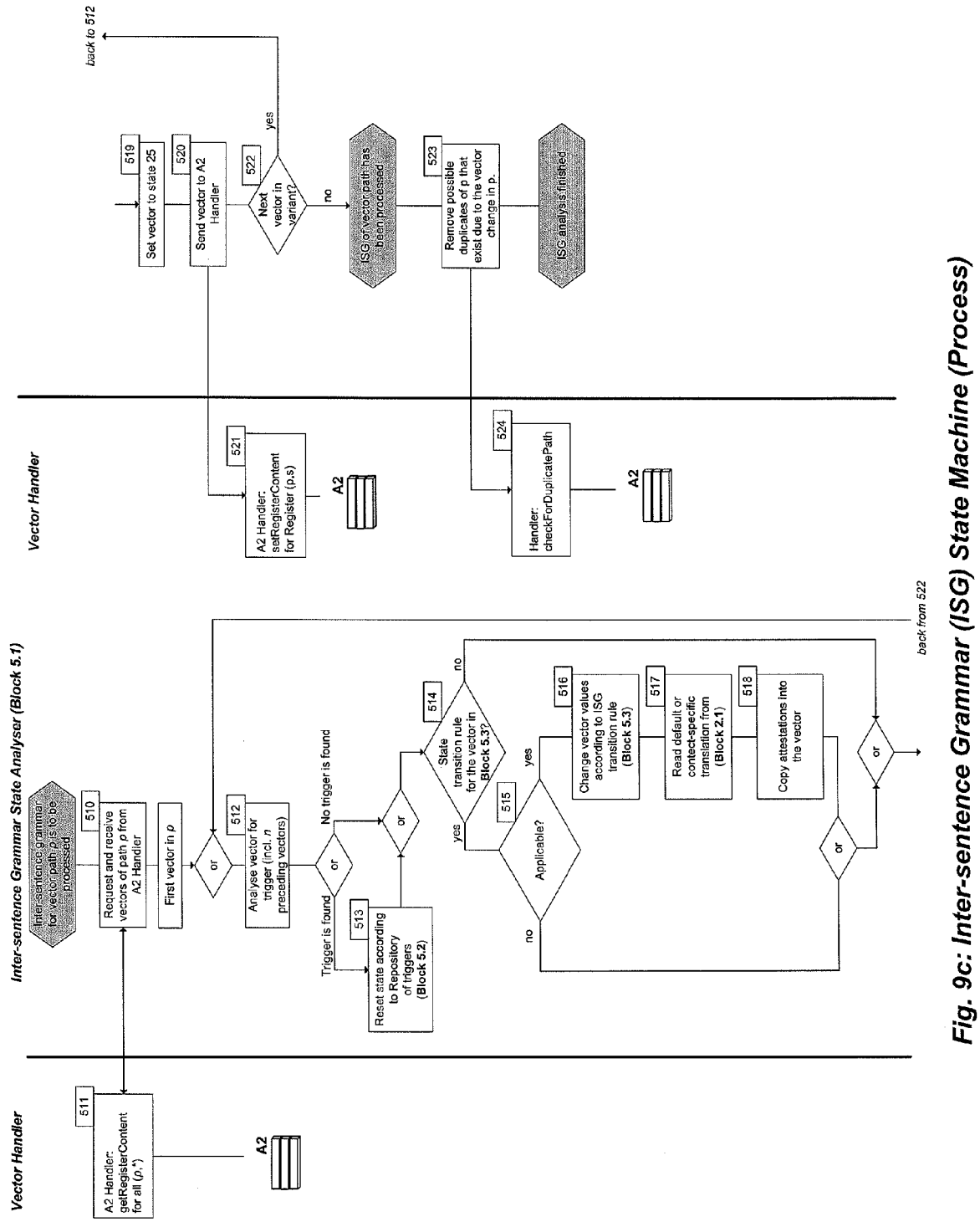
Fig. 9c: Inter-sentence Grammar (ISG) State Machine (Process)

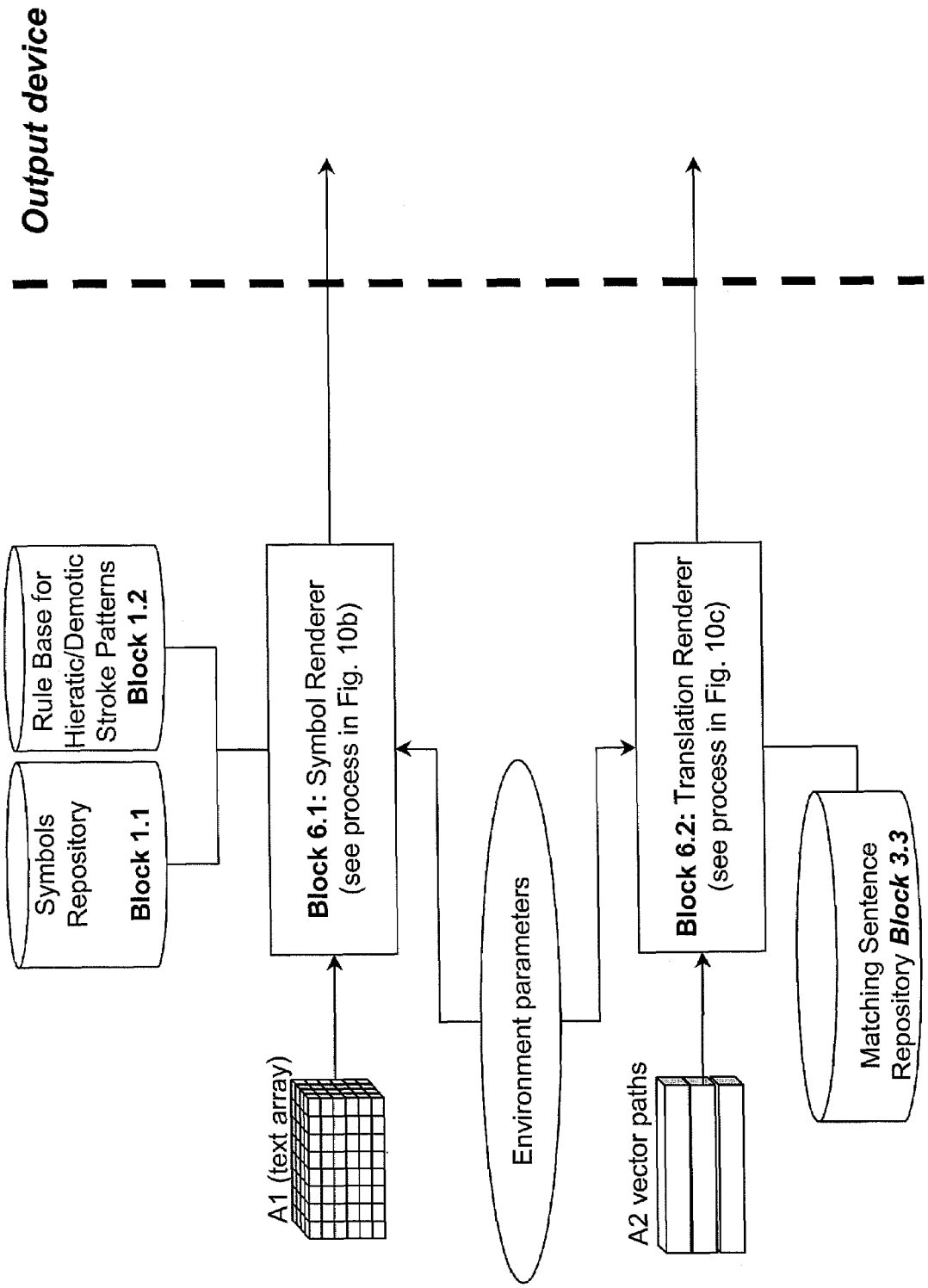
*Fig. 10a: Vector Analyser and Renderer (Building Blocks)*

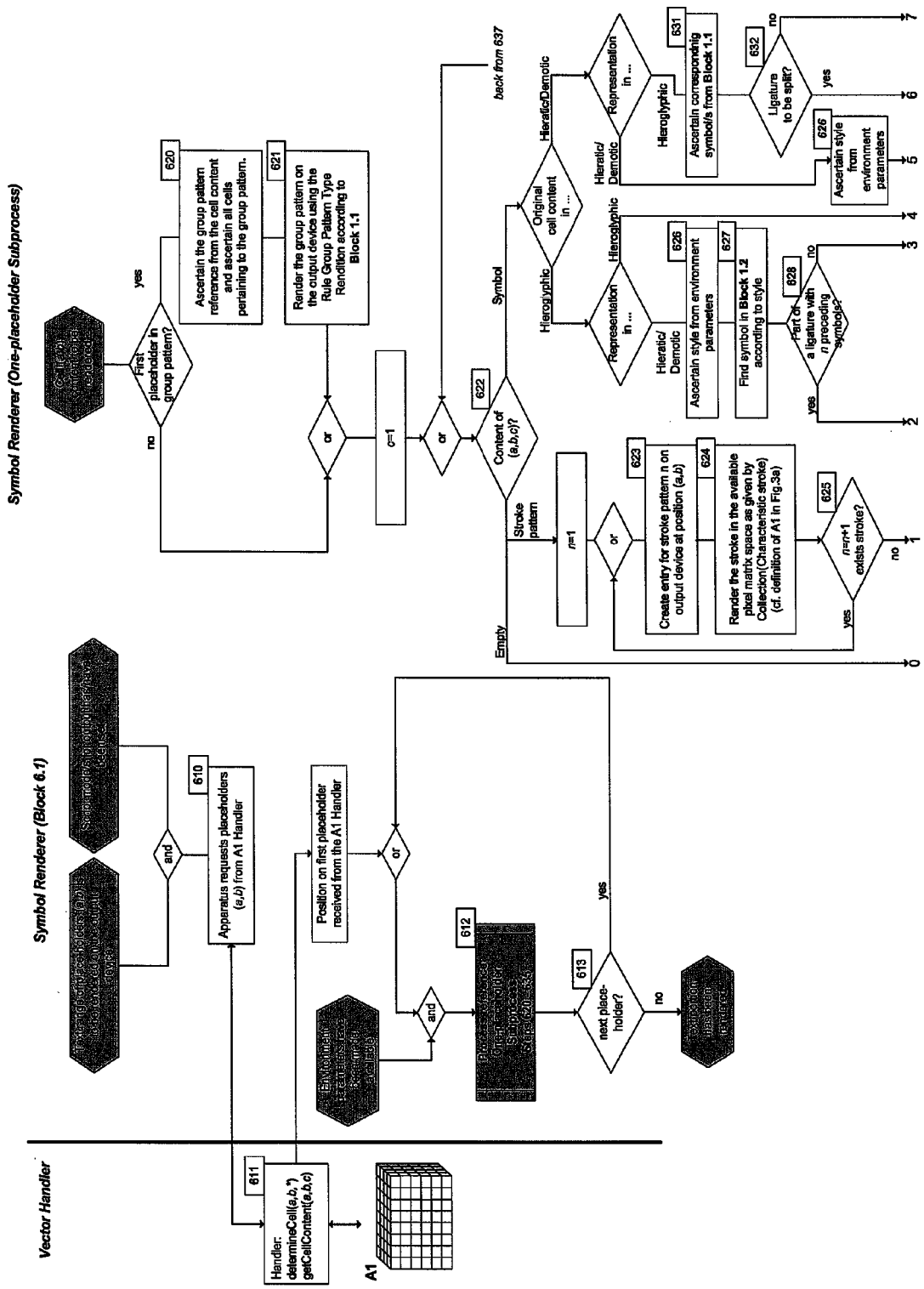
*Fig. 10b: Vector Analyser and Renderer (Process symbol rendition)*

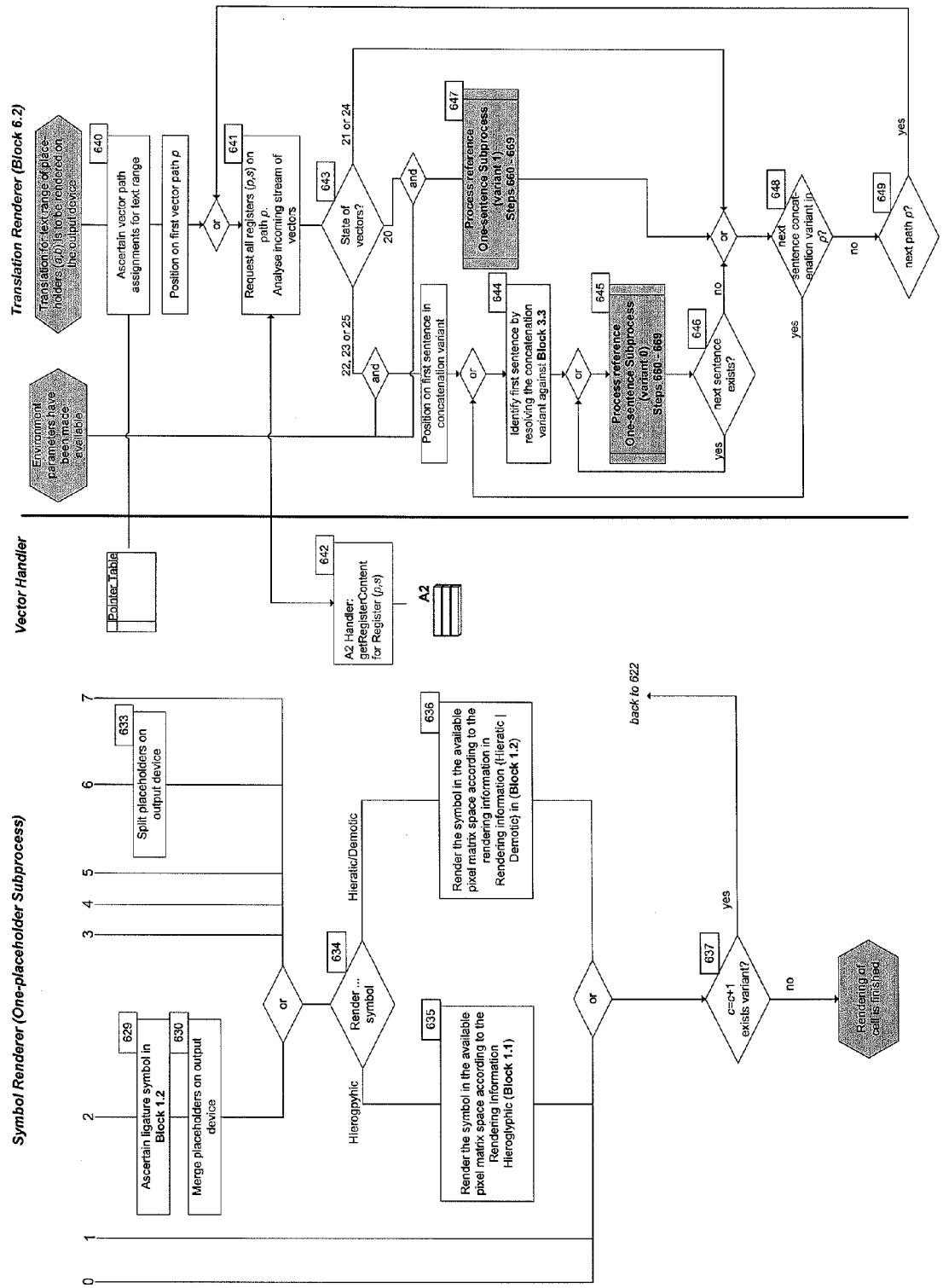
*Fig. 10c: Vector Analyser and Renderer (Process symbol (cont.)/translation rendition)*

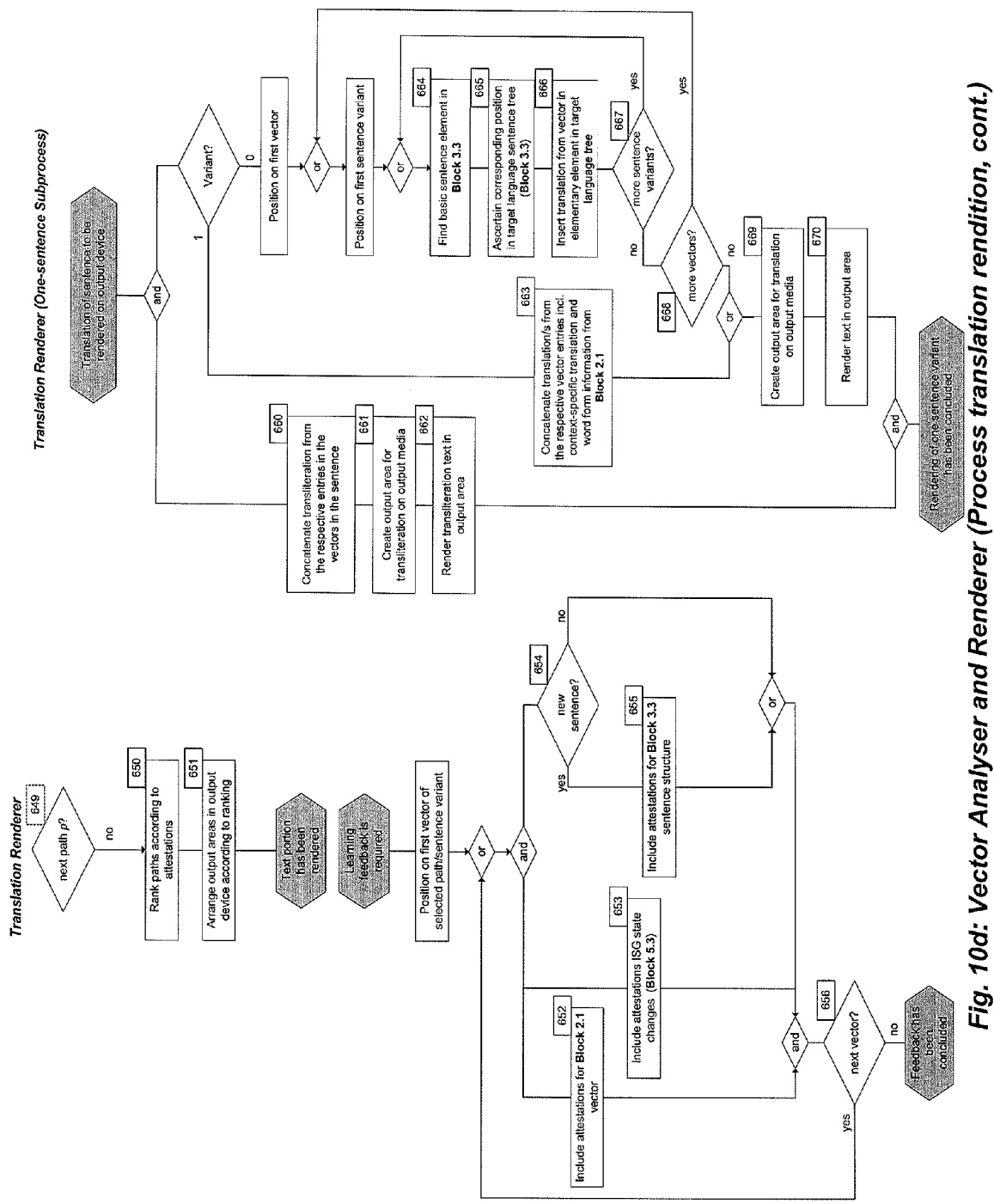
Fig. 10d: Vector Analyser and Renderer (Process translation rendition, cont.)

TEXT ANALYSIS, TRANSLITERATION AND TRANSLATION METHOD AND APPARATUS FOR HIEROGLYPIC, HIERATIC, AND DEMOTIC TEXTS FROM ANCIENT EGYPTIAN

BACKGROUND OF THE INVENTION AND PRIOR ART

Ancient Egyptian has some distinctive features separating it from modern languages and also from classical languages, such as Latin.

Ancient Egyptian was completely lost and there was no continuous tradition of the teaching its grammar, vocabulary and pronunciation. In its more than 4000 years of history, grammatical rules and words changed over time and the Ancient Egyptian language is classified into four major phases, namely Old Egyptian, Middle Egyptian, Late Egyptian and Coptic.[1] The use of a previous phase of the Ancient Egyptian language in a later period can be observed throughout Egyptian history such on the walls of Hatschepsut's temple in the Expedition to Punt written primarily in Middle Egyptian however the use of old Egyptian forms and words can be seen in the speech of Amun.[2]

[1] J. P. Allen, *Middle Egyptian: An Introduction to the Language and Culture of Hieroglyphics* (Cambrdige, 2000), 1.2, p.1; A. Gardiner, *Egyptian Grammar: Being an Introduction to the Study of Hieroglyphs*, 3rd Edition (Oxford, 1927), §3, p. 5

[2] E. Naville, *Deir el Bahari III* (London, 1898), pl. LXXXIV, LXXV

Prior art translators work on the assumption that a language's grammar is given and known. A translation method for Ancient Egyptian has to recognize the pertinent time period/phase with its characteristic features in order to interpret the text correctly, and to be able to account for older forms of the language as mentioned above and to be able to provide possible translations for debateable issues.

Ancient Egyptian was written using different scripts namely Hieroglyphics, Hieratic, Demotic and 'Coptic' and in the Graeco-Roman period all three were in use contemporaneously.[3] Hieroglyphics and Hieratic exhibit characteristics, which pose difficulties in the interpretation of Egyptian texts: Firstly, the use of 'Summary writings' in Egyptian texts, such as the omission of semi-vowels such as H1[4], i and H2, w in the marking of grammatical endings. As explained by Gardiner the word H3 Ddw means 'speaking' and is a masculine participle but is often written as H4, Dd which corresponds to the infinitive 'to say'.[5]

[3] Gardiner (1927), §8, p. 7; §4, p. 5

[4] References H1, H2, . . . refer to the hieroglyphic symbols in FIG. 1a

[5] Gardiner (1927), §20, p. 29

This peculiarity reveals itself further, for example, in attempting to distinguish between an imperfect active participle, H5 sDm that may or may not have a H2 as an ending and if so would in fact be its passive form H6 sDm.w. As stated by Ockinga the singular ending -w is seldom written in active forms and occasionally in the passive forms.[6]

[6] B. Ockinga, *A Concise Grammar of Middle Egyptian* (Mainz, 1998), §99, p. 61

As a mere illustrative example, let us just explore the difficulty presented when we attempt to distinguish between a perfective participle and the imperfective participle using a common and strong verb sDm that we just spoke about. In fact a perfective active participle written H5 sDm may look exactly like its imperfective counterpart and furthermore its passive written H6 or H5 sDm.w could in fact be an imperfective participle active, passive, perfective active or passive.[7] The Egyptians more often than not wrote using summary writings and in doing so 'grammatical distinctions are often obliterated and become a mere matter of inference'.[8]

[7] Ockinga (1998), §98ff

[8] Gardiner (1927), §20, p. 29

Tense and mood in Ancient Egyptian are not clearly marked and the omission of vowels in writings has obliterated the differences between verb forms. An example would be H7 wbn ra m p.t, which could mean depending on context: The sun rises in the sky; the sun rose in the sky; the sun will rise in the sky; when the sun rises in the sky; when the sun rose in the sky; if the sun rises in the sky; let the sun rise in the sky; that the sun may rise in the sky.[9] Prior art translators are not designed to deal with indeterminate results due to summary writings.

[9] Gardiner (1927), §30, p. 36

The correct grammatical interpretation (mainly but not exclusively) of verbs regularly depends on grammatical elements in other sentences and their contextual elements. Therefore, a more precise grammatical analysis has to embody parameters from previous (and on some occasions from following) sentences. Hence, this document will distinguish between intra- and inter-sentence grammar issues. Prior art translators are not able to analyse grammatical issues beyond sentences.

One and the same hieroglyphic symbol can play several roles in a word, namely it can represent a phonetic value (eg. unilateral, bi- or triliteral), an idiogram/logogram or a determinative.[10] The stem of a word may be decomposed into separate parts, that of its phonetic value and that of its determinative (optional). Ideograms have phonetic values, but may also be used as determinatives, when the word represented by the ideogram is phonetically spelt out. Hence, an ideogram may also have a determinative function. Prior art translators do not address these issues.

[10] Ockinga (1998), §3ff

A word in ancient Egyptian can be written iconically; phonetically; or phonetically and iconically. Determinatives may be added to the phonetic spelling/s of a word or replace other possible determinative(s) in order to confer a contextual or semantic[11] meaning and act as a possible ambiguity dispeller, cancelling out other phonetic possibilities for a word.[12] The use of determinatives in this way enabled the ancient Egyptians to add a quasi-second layer to the spelling/s of a word giving the reader through the use of determinatives contextual information. The ancient Egyptian "collective mind"—a term coined by Goldwasser in describing the deep structure of world classification of the Egyptian culture[13]—is reflected in the use of the determinative, which can be categorized as representing the Ancient Egyptian conceptual understanding of their world. This will be referred to as the 'conceptual framework,' in this document, which is in turn mapped onto the English language's conceptual framework in order to give us an accurate contextual understanding of the words written. A contextually accurate translation of the text requires that this conceptual layer be interpreted correctly as well.

[11] Loprieno (1995), 13

[12] Goldwasser (1995), 43

[13] Goldwasser (1999), p. 49; *'Issues in categorization with which we are primarily concerned have to do with explaining the categories found in a culture and coded by the language of that culture at a particular point in time.'* (cf. E. Rosch, Principles of Categorization; E. Rosch and B. B. Lloyd (ed.), *Cognition and Categorization* (Hillsdale, 1978), p. 28)

Not only may determinatives influence the contextual interpretation of the word itself, but the determinative used in the head parameter of a phrase may influence the correct interpretation of the constituent and vice versa.

An example of where the constituent would influence the contextual meaning is that of a prepositional phrase, where the constituent, perhaps a noun, would influence its head, the preposition and therefore determine the correct translation of the phrase.

It also applies to several layers of head-constituent relationships. Lets look at a simple Egyptian phrase (Note transliterations were taken from Faulkner (1999)) such as iw iri.n=i ir.t Hbs, which literally translates to 'I made an overseer of the clothing'. This phrase is semantically incorrect because what is meant is—'I became an overseer of the clothing'.[14] There are three factors, which play a role in the semantic interpretation of this sentence, the verb, the object and subject. In order to correctly interpret this sentence, these three elements should be conceptually mapped to the corresponding translated language in order to attain a semantically correct interpretation. For a more comprehensive example, see FIG. 6c.

[14] R. Anthes (ed,), *Die Felseninschriften von Hatnub* (Leipzig, 1928), Die Graffiti aus dem 4. Jahre NHrj's I, p 32f Conceptual categories of words may also be indicated by the choice of phonetic symbols made by the scribe. The Egyptian scribe may have theoretically had a certain number of symbols at his disposal to express a certain phonetic combination. For example, the word smA "to unite" or "to assemble" could theoretically be phonetically represented as H8 (composed of uniliterals s, m and A only), H9, H10, H11 or H12, H13, H14 and H15. Also the choice of phonetic symbols may confer a semantic meaning, but this area is still subject to research.

Summarizing, a translator for Ancient Egyptian has to be able to analyse the conceptual framework represented by the determinatives (and by the choice of phonetic symbols as well) not only in the interpretation of individual words but also in the interpretation of sentences and texts as a whole:

There are no spaces between words or punctuation (in some cases red dots were inserted referring to stitch divisions in Egyptian texts in order to facilitate oral reading, but are not considered verse points, but rather where the scribe should pause. Due to their considerable flexibility it is difficult to deduce clear rules for their placement).[15] Often relative or final subordinate clauses may be identical in form as main clauses in a sentence and in many cases are merely distinguishable due to context rather than syntax.[16] In this way due to the frequent omission of form endings it is essential to not only syntactically distinguish the role a word plays in a sentence but contextually in order to ascertain at times where a sentence begins and ends.

[15] Fox (1985), 6
[16] Allen (2000), 12.11, p. 136

Hieratic is generally written horizontally from right to left, but was also written vertically reading top down, from right to left.[17] Hieroglyphics can be written vertically from right to left or left to right as well as horizontally reading top down either right to left or left to right depending on the way in which the symbols are facing.[18] However, hieroglyphics can also be found written in retrograde such as in the Book of Gates[19] or in Hatschepsut's Expedition to Punt. An example of retrograde writing from the Expedition to Punt would be:

[17] G. Möller, Hieratische Lesestücke für den Akademischen Gebrauch: Erstes Heft (Leipzig, 1909)
[18] Ockinga (1998), §1
[19] Hornung (1999a), 32

Row 1: 'for the benefit of Life, Prosperity [and] Health of Her Majesty'; Row 2: 'for Hathor, mistress of Punt'; Row 3: 'for his mother ship after ship'; Row 4: 'the ships with tributes'; Row 5: 'Unloading'. The hieroglyphics face dictates reading direction of text in the direction from Row 1 to 5 but should be read from Row 5 to Row 1.[20] Prior art translators are not able to detect and handle retrograde writing.

[20] E. Naville, *Deir el Bahari III* (London, 1898), pl. LXXII

The Ancient Egyptian scribe's aim according to Hannig is that hieroglyphics was written to optimally make use of the space available in order to produce an aesthetically pleasing hieroglyphic cluster of symbols or to optimally represent the script binding it with its pictorial representation.[21] Hieroglyphic signs may also be transposed that is for example a small sign such as H16 may be placed under the breast of a bird H17 even when it should be read H18. There are other tendencies that also fall under this category.[22] Hence, the order of symbols as it appears in the text may not necessarily be the order in which it is transliterated and then interpreted (transposition).

[21] Hannig (1995), LV
[22] Gardiner (1927), §56, p. 51

Symbols forming a word are grouped (for an example, see FIG. 1a); the group patterns for one and the same word may vary substantially (group pattern variation).

Symbols are frequently left out for presumably aesthetic reasons or perhaps due to changes in the pronunciation of a word (omission).

One and the same word may appear in several different symbol combinations and determinatives indicating the correct interpretation of a word may be left out or changed (word variations).

Group pattern variations, transpositions, omissions and word variations may occur in a word simultaneously and they may depend on factors such as the period or type of text.

Late-period texts, such in the Ptolemaic period, introduce a large number of new symbols that led to further variations in the spellings of words.

In Ancient Egyptian complex symbols may be depicted by a quasi wildcard symbol such as H19 (symbol Z5) and therefore in order to correctly translate the word one would need to search for the correct rendering of the Egyptian word. For example the word H20, msi 'to give birth' is sometimes written H21.[23]

[23] Ockinga (1998), §10b

Words in ancient Egyptian may be written in several different ways. For example the verb 'to protect' may be written H22, H23 or H24[24] transliterated as xwj and the order in which the symbols may be found may also vary due to aesthetic reasons. The transliteration of Egyptian words most often does not reflect a one to one relationship to its hieroglyphic phonetic transcription and in many cases hieroglyphic dictionaries render various transliterations for a particular word such as the preposition H25 that can be transliterated as xnt or xntj.[25] Furthermore a hieroglyph may have several phonetic transliterations for example the symbol H26 (Aa13) may be transliterated as jm, m or gs[26] and complicating the problem further a particular symbol may represent the short form for several different words such as the symbol H27 (T14) which is the short form for THnw meaning Libya or nHsj meaning Nubians with only the phonetic complements, if written, to assist in deciphering the correct phonetic value of the symbol and hence its meaning. This same symbol however can also replace H28 (Aa26), H29 (M3), H30 (P11), H31 (T13) and H32 (D50) which may have their own phonetic values as well as logogram properties and functions as determinatives in different words.[27] One should not expect to find the same word spelt the same way in every text or even in the same text.[28] It is therefore essential for a translator to record various attested spellings of a word and to note in which context, period, text etc. a word was found. Please note that in this section words and their transliterations were taken from Hannig (1995).

[24] Hannig (1995), 588
[25] Hannig (1995), 607
[26] Hannig (1995), 1102
[27] Hannig (1995), 1083
[28] Allen (2000), 3.6, p. 29

Word variations present a number of problems, two of which are explained below: (a) They make it difficult to distinguish whether a new word is merely another variation or a scribal error; (b) to predict various forms of a particular word. For example if a verb is known only in $3^{rd}$ person singular, we cannot with certain accuracy predict all forms in which the word could occur in Egyptian texts. Therefore a translator must be flexible enough to cater for word variations and the problems associated with them. Prior-art translators do not work with attestations of words and grammatical constructs (the corpus of a modern language is typically known), and can therefore not deal with such contingencies.

Input devices for prior art translators work with deterministic text entry, the text symbols to be translated are discernible and known. This is frequently not the case in Ancient Egyptian. Text passages may be seriously damaged where the remains of a symbol may be visually interpreted in several alternative ways, which later have to be assessed to find the correct matching symbol/s. Handwritten texts may show substantial idiosyncrasies in the scribe's handwriting, which also leaves symbol recognition open to ambiguity, which can only be resolved in a broader context. Frequently, symbols are not discernible at all and the modern reader can identify only stroke patterns. This issue particularly applies to Hieratic and Demotic script. In addition, there may be systematic scribal errors in the forming of certain symbols.

Many of the problems described above also apply to an Ancient Egyptian dictionary: [04]-[07] Summary writing, context-specific interpretation of individual words according to the symbols used [09]-[14], the variations and ambiguity described in [18]-[25], the issue of attestations of particular spellings and form variants [26] and the input device [27].

Terminology Used

Let us first clarify some terms:

The invention refers to texts in Hieroglyphics, Hieratic and Demotic, in the following referred to as "(Egyptian) script". Monumental inscriptions were written in Hieroglyphic script, whereas most common everyday texts, such as letters, were written with ink and a reed brush on papyrus, wood, leather, etc. Various forms of cursive writing styles were developed: (i) cursive hieroglyphs, which follow the monumental hieroglyphs relatively closely, (ii) Hieratic script, which was used for most handwritten communication and which eventually developed into (iii) Demotic script in the Late Period as an even more cursive form.[29]

[29] Allen (2000), p. 6f

There are several writing styles of Hieratic/Demotic, for example depending on the period, source and/or the area. Generally, each Hieratic and Demotic symbol corresponds to one Hieroglyphic symbol, but there are "ligatures", where, for example, one Hieratic symbol corresponds to several Hieroglyphic symbols in particular pattern formations.[30]

[30] G. Möller, *Hieratische Paläographie: Die Aegyptische Buchschrift In Ihrer Entwicklung von der Fünften Dynastie Bis Zur Römischen Kaiserzeit, Erster Band* (Leipzig, 1909), 68ff The symbols of Egyptian script are arranged in "group patterns", each of which consists of one or several rectangular areas for the glyphs referred to as "placeholders". The placeholders within a group pattern are numbered thereby defining the sequence of symbols. The example in FIG. 1*a* consists of 5 group patterns of which G1 and G2 belong to Type 1 that has only one placeholder, C belongs to Type 2 with a certain arrangement of 5 placeholders (with two alternative sequences of placeholders indicated by n/n), G4 and G5 belong to Types 3 and 4 with arrangements of 3 and 4 placeholders, resp. The order of the placeholders is then established by the sequence of group patterns and the sequence of placeholders within the patterns, eg. in FIG. 1, G1-1, G2-1, G3-1, G3-2, G3-3, . . . [31] Placeholders can be of varying size and arrangement.

[31] Example from Bergmann (1885), 4; for further examples and explanations cf. Gardiner (1927), §16, p. 25f.

The group patterns thereby form words and sentences. A larger text is often subdivided into text registers (in the following referred to as "text portions" to avoid confusion with the A2 Vector Path Registers which are part of the invention disclosed herein).

SUMMARY OF THE INVENTION

Generally, it is an object of the invention to provide an automatic translation apparatus in respect of, for example, Ancient Egyptian, where the symbols may be unrecognisable.

In accordance with a first aspect of the present invention, there is provided a system for translating a body of text in an initial language into a target language, the system comprising an input device for inputting a body of text comprising a plurality of elements, a first analyser for analysing said text and identifying one or more possible characters of said initial language corresponding to respective said elements, a second analyser for analysing a stream of said identified characters to identify known characters or recognisable patterns thereof and assign thereto one or more potential translations into said target language, a third analyser for analysing the potential translations in conjunction with one or more determinatives representative of a conceptual framework of said text to determine which potential translations correspond with said conceptual framework, and an output device for outputting one or more potential translations determined to correspond with said conceptual framework.

Also in accordance with the present invention, there is provided a data storage system for apparatus for translating a body of text in an initial language into a target language, the apparatus having an input device for receiving a body of text comprising a plurality of elements, an analyser for analysing said text and identifying one or more possible characters of said initial language corresponding to respective said elements, the data storage system comprising a data handler for generating a text array comprising an array of cells, each cell being representative of an element and its location within said body of text and containing data representative of said element, the data storage system being arranged to map said array of cells onto a linear storage media.

Further in accordance with the present invention, there is provided apparatus for translating a body of text in an initial language into a target language, comprising an input device for receiving a body of text comprising a plurality of elements, an analyser for analysing said text and identifying one or more possible characters of said initial language corresponding to respective said elements, a data storage system as defined above, a multi-dimensional storage grid containing one or more possible translations into said target language, including alternative translations and spelling variations, corresponding to respective characters of said initial language, an analysis module for receiving a stream of elements from said linear storage media and assigning in respect of each element one or more vector paths indicative of one or more respective translations in said storage grid corresponding to said respective element, the system further being arranged to generate data linking said vectors to respective cells of said text array of said data storage system.

Beside the automatic translation of a target language, such as Ancient Egyptian, the object of the present invention relates more specifically to the organisation of data for this purpose. Due to the properties of this type of language and ambiguity in possible text interpretations, it is an object of the invention to provide a system within which the text itself and its grammatical representation is organised in a way that enables only meaningful interpretations to be output, thereby reducing processing and memory capacity requirement to a practical level for implementation.

Thus, still further in accordance with the present invention, there is provided a system for translating a body of text in an initial language into a target language, the system comprising means for receiving a body of text comprising a plurality of elements, means for analysing said text and identifying one or more possible characters of said initial language corresponding to respective said elements, means for generating a text array comprising an array of cells, each cell being representative of an element and its location within said body of text and containing data representative of said element, means for retrieving from said text array a stream of data representative of a series of elements of said body of text, means for assigning in respect of each element one or more vectors so as to generate vector paths indicative of one or more possible translations into said target language of a respective element, means for generating data linking said vectors to respective cells of said text array representative of said elements, and means for retrieving from said text array a stream of data representative of a series of elements of said body of text and the respective cells by which they are identified, retrieving said linking data and identifying the possible translations of respective elements represented by respective vector paths, analysing the possible translations in conjunction with one or more determinatives representative of a conceptual framework of said text to determine which potential translations correspond with said conceptual framework, and means for outputting one or more potential translations determined to correspond with said conceptual framework.

In a preferred embodiment, the apparatus or system defined above further comprises a conceptual analyser for retrieving streams of elements from said data storage system, identifying, using said linking data, the vector paths associated with respective elements and determining therewith the possible translations of said elements from said multi-dimensional storage grid, analysing said possible translations in conjunction with a respective conceptual determinative, and discarding any possible translations determined not to correspond with said conceptual determinative.

It will be appreciated that the term "conceptual determinative" in relation to the exemplary embodiment described below pertains to the process of determining concepts from individual words or from complete sentence structures and, on the basis of a rule base, determining a conceptually correct translation (which is once again found in the so-called "Glyph Grid" in the exemplary embodiment described below).

The apparatus or system defined above preferably further comprises a grammar analyser for retrieving streams of elements from said data storage system, identifying, using said linking data, the vector paths associated with respective elements and determining therewith the possible translations of said elements from said multi-dimensional storage grid, analysing said possible translations in conjunction with one or more inter-sentence grammatical rules and discarding any possible translations that do not comply with said rules.

The system defined above preferably further comprises a data storage system for mapping said array of cells onto a linear storage media. Beneficially, if a plurality of possible characters are identified in respect of an element, data representative of each of said possible characters is entered in the respective cell representative of said element.

In a preferred embodiment, said text array of said data handler comprises a multi-dimensional array of cells, each cell being representative of an element, its location within said body of text and a vector path indicative of a possible translation of said element into said target language. Beneficially, said possible translation may be one of a plurality of possible translations into said target language, including any alternative translations and spelling variations, corresponding to a respective element. Thus, the multi (preferably three-) dimensional aspect of the text array enables (i) a human user who is uncertain as to what exactly lies in a particular location to enter several alternative symbols for a given cell and/or (ii) a stroke pattern to be resolved into several possible symbol matches and the resulting variations then inserted into the cell. Depending on the "readability" of the text, the number of variations for a cell in the text array, and therefore the number of alternative interpretations of a text, may increase exponentially. This technical problem is overcome by the present invention (specifically the "Glyph Grid, Concept Switch" and "Inter-Sentence Grammar Switch" in the exemplary embodiment described below) so that the number of alternatives is reduced to a manageable level. This is crucial when considering the computing power necessary to compute such variations and, therefore, solves a significant technical problem, which has previously prevented the implementation of a system of the claimed type.

The system defined above preferably further comprises a multi-dimensional storage grid containing one or more possible translations into said target language, including any alternative translations and spelling variations, corresponding to respective elements, in respect of which said vector paths are assigned to respective elements. Preferably, the system further comprises means for discarding any possible translations determined not to correspond with said conceptual determinative.

The system preferably further comprises a grammar analyser for retrieving streams of elements from said data storage system, identifying, using said linking data, the vector paths associated with respective elements and determining therewith the possible translations of said elements from said multi-dimensional storage grid, analysing said possible translations in conjunction with one or more inter-sentence grammatical rules and discarding any possible translations that do not comply with said rules.

Beneficially, the system further comprises an output device for outputting the remaining one or more possible translations of respective elements. In a preferred embodiment, if there is more than one remaining possible translation in respect of an element, all remaining possible translations in respect of said element are output for a user to select the most appropriate translation. The user's selection is preferably fed back to the system for use in future translation operations.

Rendering means are preferably provided for said elements of said received body of text onto respective placeholders of said output device, and wherein said output device is arranged and configured to output a visual representation of said element. Said initial language may have two or more different script modes, and said received body of text may be in a first script mode and said visual representation thereof may be in a second, different script mode.

In the case where said first script mode includes ligatures consisting of n elements merged together, and wherein n is an integer greater than 1, said rendering means is beneficially arranged to identify a ligature in said received body of text and split the respective placeholders of said output device to correspond with the elements of said ligature. In the case where said second script mode includes ligatures consisting of n elements merged together, and wherein n is an integer greater than 1, said rendering means is beneficially arranged to identify a ligature in said visual representation of said received body of text and merge the respective placeholders of said output device to correspond with the elements of said ligature.

The present invention extends still further to a multi-dimensional storage grid for a system according to claim as defined above, each dimension of said grid corresponding to a grammatical dimension of a word in said target language, said grid comprising a plurality of cells, each cell being denoted by a vector defining the respective word and the value of each grammatical dimension in respect thereof.

In one exemplary embodiment of the invention, the initial language may comprise Ancient Egyptian and said elements may thus comprise symbols and stroke patterns.

Also in accordance with the present invention, there is provided a method for translating a body of text in an initial language into a target language, the method comprising receiving a body of text comprising a plurality of elements, analysing said text and identifying one or more possible characters of said initial language corresponding to respective said elements, generating a text array comprising an array of cells, each cell being representative of an element and its location within said body of text and containing data representative of said element, retrieving from said text array a stream of data representative of a series of elements of said body of text, assigning in respect of each element one or more vectors so as to generate vector paths indicative of one or more possible translations into said target language of a respective element, generating data linking said vectors to respective cells of said text array representative of said elements, retrieving from said text array a stream of data representative of a series of elements of said body of text and the respective cells by which they are identified, retrieving said linking data and identifying the possible translations of respective elements represented by respective vector paths, analysing the possible translations in conjunction with one or more determinatives representative of a conceptual framework of said text to determine which potential translations correspond with said conceptual framework, and outputting one or more potential translations determined to correspond with said conceptual framework.

In a preferred embodiment, the method may further comprise the step of analysing said vector paths and shifting a grammatical dimension of one or more of said elements in accordance with said conceptual framework so as to generate a revised vector path indicative of a respective potential translation.

Beneficially, the method may further comprise analysing said vector paths indicative of potential translations, and identifying and discarding any duplicates.

These and other aspects of the present invention will be apparent from, and elucidated with reference to the embodiments described herein.

Embodiments of the present invention will now be described by way of examples only and with reference to the accompanying drawings, in which:

BRIEF DESCRIPTION OF THE DRAWINGS

Figure 1B:
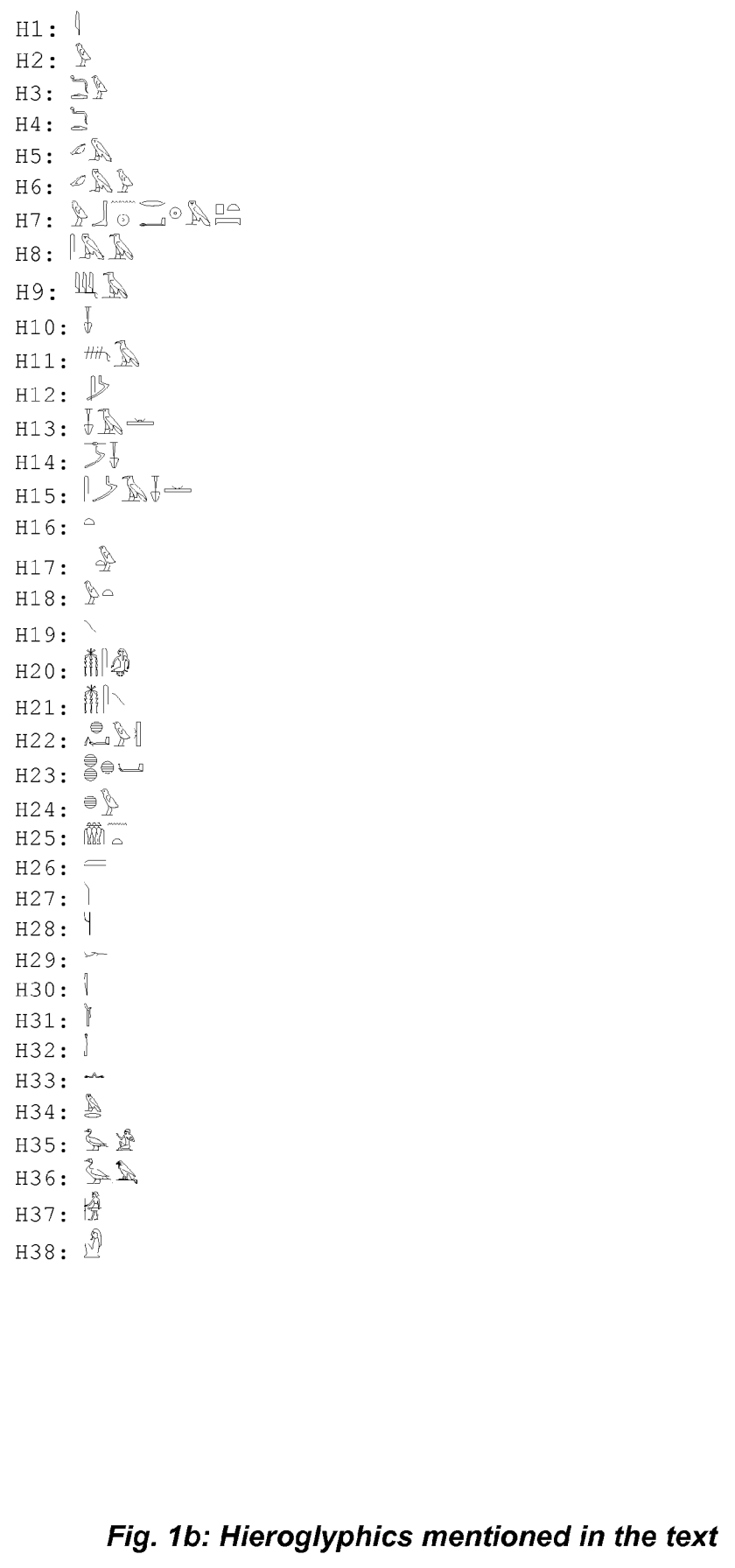

FIG. 1a: Group patterns and placeholders
FIG. 1b: Hieroglyphics mentioned in the text FIG. 2a: Overview of the invention
FIG. 2b: States of text array cells and vectors
FIG. 3a: Structure of the A1 Handler
FIG. 3b: Function primitives offered for A1 FIG. 3c: Function primitives offered for A1 (cont.) FIG. 4a: Pattern and Glyph Analyser (Building Blocks)
FIG. 4b: Pattern and Glyph Analyser (Building Blocks, cont.)
FIG. 4c: Pattern and Glyph Analyser (Processes)
FIG. 4d: Pattern and Glyph Analyser (Building Blocks, cont.)
FIG. 5a: Structure of the A2 handler
FIG. 5b: Function primitives offered for A2
FIG. 5c: Function primitives offered for A2 (cont.) FIG. 5d: Function primitives offered for A2 (cont.) FIG. 6a: Building Block 2—Glyph grid
FIG. 6b: Word segmentation FIG. 6c: Word segmentation (cont.) FIG. 6d: Word segmentation (Example) FIG. 7a: Binary trees FIG. 7b: Binary trees and sentence variants FIG. 7c: Syntactical Analyser (Building Blocks)
FIG. 7d: Syntactical Analyser (Process) FIG. 8a: Conceptual framework
FIG. 8b: Conceptual framework across sentence structures FIG. 8c: Conceptual Analysis (Building Blocks)
FIG. 8d: Conceptual Analysis (Process)
FIG. 8e: Conceptual Analysis (Process cont.)
FIG. 9a: Inter-sentence grammar analysis
FIG. 9b: Inter-sentence Grammar (ISG) State Machine (Building Blocks)
FIG. 9c: Inter-sentence Grammar (ISG) State Machine (Process)
FIG. 10a: Vector Analyser and Renderer (Building Blocks)
FIG. 10b: Vector Analyser and Renderer (Process symbol rendition)
FIG. 10c: Vector Analyser and Renderer (Process symbol (cont.)/translation rendition)
FIG. 10d: Vector Analyser and Renderer (Process translation rendition, cont.)

DETAILED DESCRIPTION OF THE INVENTION

The A1 Array

There is a clear distinction between the text found on an artefact and its machine representation, as disclosed herein. (i) Due to the deterioration of the artefact, misspellings, poor handwriting, unknown occurrences of words etc, the text may only be recognizable, in the case Hieratic/Demotic, as stroke patterns, or in the case of the hieroglyphic script as multiple glyph interpretations, which may internally render any given position in the text as having multiple interpretations. (ii) Furthermore, it is essential that information pertaining to the position of any given symbol/stroke pattern in a group pattern is maintained as it is not only relevant for the exact reproduction of the text, but essential in the interpretation of the word itself, as one and the same word may be written using an arbitrary number of pattern formations. (ii) When considering text written in Hieratic/Demotic a stroke pattern may equate to one or more hieroglyphic symbols, as is the case with ligatures. It is important to note that ligatures as such are most often indistinguishable from the individual Hieratic stokes, which equate to a particular Hieroglyphic symbol and their Hieroglyphic counterparts they represent as they are a quasi short form for commonly used symbol combinations, and can be best understood in context.

The Translation Apparatus "sees" the text elements in their logical context (e.g., second glyph interpretation variant in the 2nd placeholder of the fifth group pattern). A representation of the text "ready for analysis", on the other hand, is provided by the A1 Handler, which provides the appropriate physical representation and the link logic between the two views of the text.

The Pattern and Glyph Analyser of the Translation Apparatus (Building Block 1 in FIG. 2a) accepts a stream of symbols/stroke patterns from the input device and uses the A1 handler to structure and save it on a physical storage media, whose structure is shown in FIG. 3a. The A1 Handler consists of the following elements: The Physical Text Array and a collection of Array Function Primitives managing the Physical Text Array as specified in FIGS. 3b,c.

The Physical Text Array consists of an array of cells with the following elements: (i) The Cell-ID with the dimensions: line in the text register, (coordinate a) (see paragraph 0 for a definition); the number of the placeholder in a line (coordinate b); and the variant (coordinate c) which enables the storage of multiple interpretations of a particular symbol or stroke pattern for a particular set of (a,b) coordinates/position in a text; (ii) The content of a cell (a,b,c) consists of: the type of content (eg. empty cell, symbol or stroke pattern); the group pattern type the placeholder belongs to; a symbol reference or stroke pattern; a ligature reference indicating that a stroke pattern may be equivalent to many hieroglyphic symbols (if any) and; a state (see FIG. 2b for an overview of the possible A1 states).

Line number a may also be structured thereby conferring information on the text analysed, eg. line 108-2 may be the second line of text 108, whereby the information pertaining to the text is maintained in a separate table in the Handler consisting of the number and some text-related information fields (not shown in FIG. 3a).

The A1 Handler is used by various Building Blocks of the Apparatus, to which it offers a set of Array Function Primitives, which provide the mapping between the logical text view of the Apparatus and the physical representation in the A1 Handler. The translation Apparatus accesses a set of glyphs in the text; and the A1 Handler translates this into an array cell and manages possible variants. For this purpose, it offers the respective calling process in the apparatus that uses the A1 Handler a set of function primitives as shown below (FIG. 3a. lists the function primitives disclosed): determineCell finds the physical cell corresponding to the logical text element processed by the Translation Apparatus, however does not address the content of a cell itself, it only locates a cell. createCell creates a new cell and resets the internal structure in the array. It should be noted that createCell creates an empty cell yet to be filled with content opposed to the primitives setCellContent and getCellContent; setCellContent and getCellContent set the glyph and/or stroke pattern reference and retrieve it; both primitives in order to do this make use of the primitives determineCell, in locating the cell and createCell, where necessary; removeCell deletes an array cell, after it has been located by determineCell and subsequently resets the internal structure in the array.

The function primitive determineCell is specified in FIG. 3b (left). The process using the array supplies the logical references: A text line a, either a range of placeholders [p(1), p(2)] within one or several group patterns m or an individual placeholder reference p within m. In addition, the calling process may also specify a variant c. The A1 handler moves in two stages: (i) It determines the absolute placeholder number/s (a,b) in the array and then (ii) locates the physical cell/s representing the placeholder/s including possible variants:

Concerning the first step (Process Reference A1-1 in FIG. 3b), line a is already known from the message of the Apparatus. To compute b, the A1 Handler computes the sum of all placeholders in all group patterns in line a preceding m plus the sequence number of the placeholder p in the group pattern m; this gives b as the absolute sequence number of the placeholder in the line. Consider FIG. 1a for an example: The third placeholder in group pattern G4 would be referenced as (m=4,p=3) by the Apparatus determineCell would inspect the preceding group patterns in the line and count their respective number of placeholders: 1 placeholder for G1 and G2 each and 5 placholders for G3, giving 7 placeholders preceding G4. Since p=3 in G4, the absolute number of the placeholder is 10 giving (assuming that it is the second line in a text) placeholder (a,b)=(2,10) in the A1 handler. Furthermore, assuming that the flower depicted in the above placeholder in FIG. 1a is the first variant, the full Cell-ID would therefore be (2,10,1). This may be the only placeholder or the initial placeholder of a range.

The second step in Paragraph 0 concerns the physical media, which is linearly organised. Hence, the physical cell location has to take into account the number of all physical cells in the preceding lines: Assuming in our example that line 1 (a=1) has 20 physical cells, and that for each of the placeholders in G1, G2 and G3 in FIG. 1a there is only one variant, the physical location of the above Cell-ID (2,10,1) would physically be represented as cell 30. If, for instance, the placeholder in group pattern G1 in FIG. 1a (i.e., placeholder (2,1) had 3 alternative interpretations (that is Cell-ID's (2,1,1), (2,1,2) and (2,1,3)), the same above Cell-ID (2,10,1) would be located in the $32^{nd}$ physical cell, as two more cells in the preceding text would be needed. Hence, highly complex group patterns, glyph and stroke pattern variations that are logically organised in an array, can eventually be mapped onto a linear physical cell structure. This is the task of the A1 handler. Summarizing this in a formal definition, the mapping of a Cell-ID onto the physical array cell within the A1 handler is done as follows: Given a certain cell (A,B,C) and a linear cell organisation cell(1), cell(2), . . . , cell(n) in the physical device, the physical cell number is given by: Physical location of (A,B,C)=Physical cell number n, $$n = \left[\sum_{a=1}^{a=A-1}\sum_{b=1}^{b*(a)}\sum_{c=1}^{c*(a,b)} \text{number of Cell} - ID's(a, b, c)\right] +$$
$$\left[\sum_{b=1}^{b=B-1}\sum_{c=1}^{c*(A,b)} \text{number of Cell} - ID's(A, b, c)\right] +$$
$$\sum_{c=1}^{c*(A,B)} \text{number of Cell} - ID's(A, B, c)$$

with b*(a) as the maximum (=last) placeholder b in line a and with c*(a,b) as the maximum (=last) variant c in placeholder (a,b).

If the calling process in the Apparatus supplies the variant c (Process Reference A1-2), a complete Cell-ID (a,b,c) is known (Step A1-3), otherwise the A1 Handler sets c=1 (Step A1-4). In both cases, the physical array cell can be determined according to the above formula (Step A1-5).

If there are more variants c to be considered, the next variant for the placeholder (a,b) is determined and buffered (Step A1-6). After all (requested) variants of a placeholder (a,b) have been determined, the question arises whether there is another placeholder requested by the calling process (Step A1-7). If so, the new (a,b) is determined and the process starts again at process step A1-2. It should be re-emphasized that determineCell only buffers the array locations of the cells matching the request by the Apparatus and does not deal with any issues regarding content as explained above in Section 0. Please note determineCell may be applied to all cell states in FIG. 2b.

If new cells are to be created by the primitive createCell (FIG. 3b, right) the calling process in the Apparatus sends the reference placeholder p in group pattern m in line a, whereafter they are to be inserted or appended. This is of course, not a valid Cell-ID (a,b,c) and hence cannot be mapped onto a physical array location, therefore, the determineCell primitive is used to determine all cells pertaining to (a,b) (Step A1-11) and will provide createCell with the physical location of where a new cell/line/variation is to inserted or appended or whether a simple line break without any new cells is to be inserted.

Step A1-12 distinguishes between three cases: (i) whether a group pattern together with a new line is to be created after the reference placeholder (a,b): In this case, the first new cell to be inserted is logically set to (a+1,1,1) (Step A1-13). The calling process in the Apparatus has to provide the type of group pattern, which indicates the number of placeholders to be inserted. Hence, the array cells can physically be shifted forward by the appropriate number of cells and the Cell-ID of all cells following the newly created line are logically updated with a=a+1, with all b and c remaining the same; furthermore the placeholder sequence number of all placeholders in the line where the new group pattern was inserted is increased by n (that is the number of placeholders in said group pattern (Step A1-14). (ii) whether a new group pattern with n placeholders is to be inserted in the same line a: The first Cell-ID of the new placeholder is set to (a,b+1,1) (Step A1-15); since the placeholder is new, it must be the first variant. The other n placeholders of the group pattern are created accordingly, if any. Again the type of group pattern (and hence the number of placeholders) to be inserted is communicated by the calling process in the Apparatus and the physical array cells are shifted by n accordingly. Also, the Cell-IDs in the same line a have to be modified in that b=b+n with n as the number of inserted placeholders according the group pattern type. All c remain the same. Beyond line a no changes have to be made, as placeholder numbering b restarts with each new line a. (Step A1-16) (iii) or whether a new variant of an existing placeholder is to be inserted: The highest existing variant c* in line/placeholder (a,b) is found and incremented (Steps A1-17,18). The new variant is assigned Cell-ID (a,b,c*+1) and all subsequent physical array cells are shifted forward by one; no existing Cell-ID is to be modified as this is a local change in an already existing placeholder (a,b) (Step A1-19).

Finally, the cell/s created in A1-14, -16 or -19 is/are initialised (Step A1-20) in that their structure is created, but the content itself is as yet unspecified (cf. also FIG. 3a): The type of content is "empty", group pattern, symbol references and ligature references are empty, and the state is set to 00 (see the state diagram in FIG. 2b).

The function primitive setCellContent (FIG. 3c, upper left) fills a given Cell-ID with content. The setCellContent primitive is given the Cell-ID by the determineCell primitive. The content type received from the Apparatus is used interpret the content (Step A1-21) and the content is then inserted into the cell (Step A1-22). The difference between a symbol reference (State 10, see the state diagram in FIG. 2b) and a stroke pattern (State 11) as cell content is indicated at in the field Type of content, and is instrumental in determining how the content itself is to be assessed. If the embodiment does not enable variable-length cells, a maximum cell size is specified and the Handler rejects any content exceeding the limit. However, those skilled in the art will realise how cell concatenation may be used as a solution in such cases. The setCellContent primitive always overwrites the existing content, either moving the A1 cell state from 00 (initialised, see the createCell primitive) to either 10 or 11, or may also effect changes from States 10 and 11 (and vice vera), if, for instance, a stroke pattern is replaced with a glyph reference (see the state diagram in FIG. 2b). If setCellContent does not supply any new content, the cell is initialised again (State 00, see FIG. 2b). The primitive may also be applied to cells in state 12 and 13.

To get a cell content (FIG. 3c, lower left), the Cell-ID and the physical location are determined first using the determineCell function primitive. Then the type of cell content is determined according to the Type of Content (see FIG. 3a) (Step A1-31), whereupon either a sequence of stroke definitions (Step A1-33) or a symbol reference (Step A1-32) is returned. This primitive may be applied to all A1 states; in State 00 however, an empty content is returned.

As to removeCell (FIG. 3c, right), the Cell-ID's concerned are first determined and located by determineCell (Step A1-41). In the further processing, four cases have to be distinguished (Step A1-42): (i) If a complete line a is to be removed, all cells with a Cell-ID (a,*,*) are physically initialised and the number of the respective cells to be removed r is counted (Step A1-43). All subsequent cells are logically set with a new line number minus 1, that is with a Cell-ID (a−1, b,c) (Step A1-44). Finally, the subsequent cells are physically shifted forward by r number of places and the last r number of cell structures are physically removed from the A1 array. (Step A1-53). (ii) If an entire group pattern is to be removed, process reference A1-41 has determined all cells in the range (arrange[b(1),b(2)],c) where range[b(l),b(2)] covers all placeholders in the group pattern. These cells are removed (Step A1-45) and the cells concerned are counted r. All Cell-IDs in subsequent lines are not logically concerned by the change, but all cells are in the same line that follow the removed group pattern are set to b-r as they are now logically moved backward within the line; their a and c values remain unchanged, as line assignment and placeholder variants remain unchanged (Step A1-46). Finally the array is again physically moved backward by r positions (Step A1-53). (iii) If a single placeholder is removed, at least one variant of said placeholder, as an empty cell, must remain in the array; otherwise the entire group pattern would be incomplete. To see this point cf. FIG. 1a and imagine group pattern G3 without any of its elements: The group pattern would "have a hole". Hence, the placeholder as such in variant 1 must remain, even though set to empty content. All other variants are physically removed and counter r is set. (A1-47,48). Again the array is finally physically moved backward by r (A1-53).

(iv) If a definite variant c of a placeholder (a,b) is to be removed, the array handler has to distinguish, whether it is the first variant (c=1, Step A1-49) and if so whether variant 1 is the only variant (Step A1-50). If this is the case, this (only) variant cannot be removed; instead it is initialised (Step A1-48) to State 00. r is set to zero, as no cell has been removed. In all other cases (a,b,c) is removed (A1-51) and all variants after the removed c are decreased by 1, that is the new Cell-ID is set to (a,b,c−1) (A1-52). Finally, the array is physically moved forward by one position (A1-53).

The removeCell primitive may be applied to all A1 cell states including State 00.

The A1 handler may be any combination of hard- and software that can fulfill the requirements set in this Section in terms of structure and function primitives. For performance reasons it may be preferred to implement more functions in hardware.

Building Block 1: Pattern an Glyph Analyser

The input device enables the user of the Apparatus to enter Hieroglyphic, Hieratic and Demotic text. The input device may be constituted by any analogue or digital input device, such as a keyboard, a mouse, a pen-based digital tablet or pen computer, a PDA (Personal Digital Assistant) or other mobile computing device, a touch screen, an optical scanner or similar devices, a communication device or a storage medium reader. Alternatively, the input may be supplied by an automated process. Typical situations for the use of this input device include: A user with an original artefact (eg. papyrus or tomb wall) or plates thereof uses the Apparatus to input (and later analyse) the text visible on the artefact, either to search for individual words, forms or phrases or to translate the text in its entirety. The Apparatus supports text entry and analysis from both experts such as an Egyptologist or non-experts. The text may not be clearly visible or discernible in its entirety. Alternatively, (plates of) an artefact may be optically scanned in to generate a stream of stroke patterns or a stream of symbols/patterns may be read from a storage file, where the Apparatus analyses the stream. In both cases, an automated process to classify and to structure the input is triggered as described below.

The Sub-Building Blocks of the Pattern and Glyph Analyser are specified in FIGS. 4*a,b*: Block 1.1 A repository of all Hieroglyphic symbols and group patterns including their rendering information (pixel matrix and scaling) and their transliteration (variants). The transliteration variants may differ according to the role of a symbol in a word (eg. idiogram, uniliteral etc). A hieroglyph may have several different representations in Hieratic/Demotic writing depending on the environment parameters (see below). These representations are stored with their respective rendering information and the strokes characterising the symbol in Block 1.2. To facilitate the user input, the symbols are presented in toolboxes, which group them according to certain rules defined in Block 1.1; a symbol may be assigned to several toolboxes (see Collection (Assignment to toolbox . . . ), where also toolbox-specific rendering information (eg. scaling information) may apply. Both the assignment of a symbol to a toolbox or the toolbox in its entirety may be constrained by environment parameters (see below). If the Apparatus is used for manual text entry, the possible group patterns (Block 1.4) and the toolboxes (Block 1.5) are rendered on the output device for user selection. The rendition of both may be influenced by environment parameters, such as the time period or the class of text (see FIG. 4*a*). Symbols may be inputted as such or as stroke patterns; depending on the Apparatus' settings the stroke patterns are either resolved against the symbol repository immediately or the dominant stroke patterns are extracted and handled as such. This is done in Block 1.6, which extracts the dominant strokes from the patterns supplied by the input process according to the Extraction Rules. The Mapping Rules map the dominant strokes to the characteristic stroke patterns from Blocks 1.2 (Hieratic/Demotic); for an example, see the upper part of FIG. 4*b*: The dominant strokes extracted are mapped onto the characteristic individual strokes stored in Block 1.2 (in this case some Hieratic sources according to Möller (1909).

The Text Entry Logic combining the rule bases concerned is provided in Block 1.3 and is specified in FIGS. 4*c,d*. The rule bases are in many cases constrained by the Environment Parameters (see FIG. 4*a*), which are supplied by the input process and concern contextual properties of the text itself, eg. The class and period of the text, material and script mode, positional parameters, eg. symmetric text (eg., on a "false door"), speech text in front of a figure, standard text register, text orientation etc., information related to the output media and preferences set by the user of the Apparatus.

Block 1.3 enables to (i) edit group patterns and placeholders and (ii) to edit the placeholder content, which are both triggered by the input device or process; it also (iii) renders toolboxes and (iv) triggers rendition of the A1 text array content. (i) and (ii) may be arbitrarily combined in manual entry by the user; in the case of an automated input process, the group pattern is automatically ascertained and the stroke patterns/glyphs are inserted in the placeholders thus created in a sequential manner.

The editing process for group patterns and placeholders is specified in FIG. 4*c*, left: In manual entry, the user adds or removes group patterns after the current state of the A1 Handler has been rendered on the output device [100]. In automatic entry, no rendering is necessary as there is no user interference. If a new group pattern is to be created [101*a*], the available group pattern types are extracted from Block 1.1 and rendered according to Group Pattern Type [102] and the specification in FIG. 4*a*) on the output device in Block 1.4. The rendering calculates the relative size and position of the elements in relation to the resolution of the output device (obtained from the environment parameters) and ascertains the order (or multiple alternative ordering options) of the placeholders within the group pattern from Block 1.1.

In manual and in automatic processing [103] the next step is to determine the group pattern type [104]. In manual entry this is done according to the user selection from Block 1.4, in automatic entry the location of the symbols to be entered is compared to the available group patterns to determine the best match. Also the position of the new group pattern is to be determined [105], in manual entry according to the user selection and in automatic entry the group patterns are appended sequentially. In both cases the current Cell-ID and its physical location are determined by the A1 Handler [106].

If the group pattern has several order sequences of its placeholders, the environment parameters received are used to select the order, as every placeholder ordering in Group Pattern Type Rendition (FIG. 4*a*, see Collection(order number, reference to environment parameters, priority of environment parameters) is linked to environment parameters which are ordered according to priority to enable automatic selection. In manual entry, the user may manually override this automatic selection [107].

The Apparatus sends the corresponding information to the A1 handler to trigger one or several createCell(a,b,c) for the new placeholder/s [108]. This either involves a new line to be inserted [A1-13]ff or only inserts a group pattern [A1-15]ff.

If cells are to be removed, the initial cell to be removed is first determined [109]. Furthermore, the user or the process has to determine the scope of the removal [110]: A complete line, a group pattern or an individual placeholder may be removed and the corresponding removeCell primitive in the A1 handler is called [111-114]. Finally, after insertion or removal [115], the new state of the A1 Handler for and after the inserted group pattern is rendered on the output device (see the process reference in [116]), which is however only done in manual entry with user interaction.

The editing process for the placeholder content (symbol or stroke pattern) is specified in FIG. 4d. The input process has to indicate the placeholder where to enter symbols/stroke patterns, which may or may not be empty. DetermineCell is used to ascertain the Cell-ID/s and the physical location of the respective cell/s [130]. The user has to specify whether a new variant is to be entered, a variant is to be deleted or whether an existing variant for the placeholder is to be replaced [131]. If the content of an existing cell (a,b,c) is to be replaced, then the Apparatus positions itself on this cell [132], where the status of the cell may be either 00, 10 or 11 (see FIG. 2b). Also cells in state 12 and 13 can be edited, which however may render the respective sentence analysis invalid. If a new variant is to be added to a placeholder, the new variant (a,b,c*+1) is created by calling the createCell function primitive in A1 ([133, 133a, cf. [A1-17]ff.); the new cell is created in State 00. In both cases, the process is continued depending on the type of content to be inserted in the placeholder variant [135]. In manual entry the available symbols are rendered in Block 1.5 (see Insert [78] below). If a variant is to be removed [134], the removeCell primitive is called [134a] and the process is concluded.

Following process reference 135 in FIG. 4d, the Apparatus supports glyph entry by three means: (i) A stream of symbols is received from the input device (symbol mode), (ii) the entry of a transliteration (transliteration mode) and (iii) by means of stroke pattern analysis (stroke pattern mode).

In symbol mode and with manual entry the user indicates the desired symbol by choosing from a toolbox, whose creation and rendering is defined by the following insert:

Insert: Toolbox rendition (FIG. 4c, right side). There are approximately 10,000 different symbols in ancient Egyptian.[32] Building Block 1.1 provides a repository that holds the symbols, their transliteration (variants) and possible roles (ideogram, determinative, etc.); Block 1.2 consists of their Hieratic and Demotic representations. There is a standard classification and sorting scheme for the more frequently occurring hieroglyphs following Gardiner[33] with categories such as "birds" or "parts of mammals" and a sorting sequence within each category. In addition, a symbol may play a variety of roles in a word and may for example be an idiogram, determinative, uni-, bi- or triliteral; other schemes are possible as well. The process steps 120ff are to present symbols to the user for manual entry, where toolboxes are sorted and filtered according to environment parameters. The user then selects a symbol and the symbol is inserted in the selected placeholder (variant). Also several script modes or several styles of the same script mode may be rendered in parallel according to the environment parameters, eg. Hieratic symbols may be written differently according to the style of writing found in a particular source.

[32] Hannig (1995), XXVIII
[33] Gardiner (1927), p. 442ff

To render the toolboxes on the output device, the Apparatus receives and analyses the stream of environment parameters [120]; they include indication of the script mode (eg. Hieratic), which boxes are to be rendered (active indicator) and the class of text (eg. religious, didactic). The Apparatus then sets the first script mode to be rendered [121]. The toolbox may either be used to render the entire repository of symbols or a number of symbols selected by a calling process using Block 1.5 to render the selection on the output device. The rule base (Rule Toolbox Rendition) in Block 1.1 is used to establish the membership (assignment to a toolbox) and sort criteria within the toolbox [122a,b].

Depending on whether Hieroglyphics or Hieratic/Demotic script is to be rendered, the rendition rules from Block 1.1 or 1.2 are obtained [123, 124] and are applied in relation to the Output Media Information in the environment parameters [125a, b]. If several script modes are to be rendered, the procedure is repeated. Those skilled in the art will appreciate how pixel-matrix and scaling information can be used to render the toolboxes and the symbols on various output media given Output Media Information in the environment parameters.

End of insert: Toolbox rendition

Returning to the input process in FIG. 4d, the user is confronted with a selection of toolboxes and has to choose the desired symbol in the input device, which is then received by the Pattern and Glyph Analyser [136]. The symbol reference and the information on the active placeholder/variant is then passed on to the A1 Handler [137] for a setCellContent(a,b,c) function primitive [138].

For professional Egyptologists text entry in transliteration mode may be the fastest way—however, in most cases, a transliteration will produce several symbol matches. Prior art hieroglyphic editors are not able to handle complex selection processes based on a transliteration string as disclosed herein (or a stream of symbols as disclosed in the previous section), because they do not have the mechanism specified in FIGS. 3 and 4. Also, they cannot handle multiple alternatives at a placeholder because they do not structure and handle text as it is done by the A1 Array Handler. The input device enables one to automatically capture the transliteration and the pertinent environment parameters (period and class of text, script mode, transliteration variant preferred by the user[34]). The Apparatus analyses the incoming stream of transliteration symbols and environment parameters from the input device [139] and depending on the environment parameters uses the rule bases in Blocks 1.1 and 1.2 to find all symbol matches [140]. If several matches were found and there is manual interaction, the rendering information of the resulting symbols is used to build a toolbox (cf. process reference to [120]-[126]). In automatic entry, no such selection can be performed and the Analyser processes all possible matches found. In the case of one symbol found, the Analyser proceeds.

[34] There is no generally acknowledged transliteration style, but various "schools". The word H34 ("overseer") can be found transliterated as imy-r (Faulkner 1927), jmj-rA (Hannig 1990), or imj-rA (Erman and Grapow 1926). Hence, the Apparatus on the one hand has to know the transliteration style preferred by the user (environment parameter) and on the other hand has to flexibly assign transliteration variants in the symbol repository (Block 1.1).

The first (and possibly only) symbol found is accepted and processed in [136]-[138]. However, automatic entry of a transliteration or a stroke pattern may result in several symbol matches. In this case, this would require that more cells would need to be created (cf. [133]) and only the first symbol match can be inserted in the already created cell. For the other matches, new cell variants need to be inserted in the A1 text array (cf. process references [133/133a]), where the additional symbols are inserted [136-138]. Hence, entry by transliteration or stroke pattern may result in several variants to be stored for a placeholder.

The above methods require that the identification of the symbol, or at least of some definite alternatives, is possible. For the cases described in paragraph 0, the Stroke Pattern Analyser is disclosed. Hieratic and Demotic writing consists of some elementary stroke patterns, for which FIG. 4b provides an example: In the upper part possible representations of the Hieroglyphic symbol H33 (Gardiner D35) in Hieratic script from different periods and sources are shown. The lower part discloses the structure of the Stroke Pattern Analyser; the process is shown in FIG. 4d, References [141]ff.: In a first step, the incoming stream of patterns is analysed for dominant stroke patterns [141] according to the Extraction Rule. Further processing depends on whether the stroke pattern is to be stored in the placeholder variant as such or whether it is to be immediately resolved into a set of possible symbols.

In the first case, the A1 setCellContent function primitive is called [142], the cell content is set to "stroke pattern" ([A1-21] in FIG. 3c) and the cell content is set [A1-22].

In the second case, the Mapping Rules in Block 1.6 are used to compare the set of dominant strokes extracted from the input with the characteristic stroke patterns available for each Hieratic and Demotic symbol in Block 1.2 [143]. A straightforward matching, however, may on the one hand result in a large number of matches, on the other hand it may miss a symbol that may have been intended by the ancient scribe. Hence, more discriminating mapping rules apply according to the Mapping Mode: If the environment parameters, for instance, indicate that a particular source or cluster or sources are relevant in terms of style, period or other parameters, a match found in another style may be disregarded. On the other hand rules may apply that certain characteristic strokes, which are well known to have been frequently omitted by some scribes may be omitted in the matching procedure and the dominant stroke pattern may still qualify, even though this particular characteristic stroke may be missing. The Hieratic matches, for example, are mapped onto Hieroglyphic Symbols [144].

If this search results in more than one symbol, they are displayed in a toolbox as was the case with the transliteration entry ([120]-[126]). In automatic input, the process immediately continues with [136] storing the identified variants in the placeholder.

Finally, irrespective of whether symbol, transliteration or stroke pattern entry was processed, the Apparatus renders the current state of the A1 Handler for this placeholder on the output device (Process Reference [145]).

The A2 Vector Path Handler (FIG. 5a)

The A1 text array provides a representation of the text (or variants thereof) as such, the A2 Vector Path Handler (A2 Handler for short) puts a word and grammatical interpretation on top of these text variants. It is the A2 Handler that maintains the information by which placeholders (or their variants) are grouped to words, words to phrases and sentences and that maintains the grammatical interpretation of the ensuing structure in its entirety.

The A2 Handler consists of the Vector Path Array consisting of individual registers (cf. FIG. 5a) and a collection of Vector Path Function Primitives that are offered to the calling process in the Apparatus (cf. FIGS. 5b-d) and the Pointer Table linking A2 vectors to A1 cells. Each register is identified by a Register-ID (p,s) indicating the (alternative) path p through the text and the sequence number s of the register in its path. One and the same text may have a number of alternative word and/or grammatical interpretations, not just because of variants in the glyph references in a placeholder in A1 or because of ambiguity due to the fact that a text is only captured as a stroke pattern. Even though the text may be perfectly discernible in terms of the symbols used (and hence would only have one variant per placeholder in A1), ambiguity may be introduced due to "summary writing" (cf. Paragraph 0ff), the omissions of clearly defined tense and mood (cf. paragraph 0), retrograde writing (cf. 0), transpositions (cf. paragraph 0), group pattern variations, omissions and word variations (cf. 0ff). It is the task of the A2 Handler to represent this ambiguity and to enable the Apparatus to manage and finally reduce the ambiguity to a small number (ideally one) of the most likely interpretations of the text.

A2 registers are created when the text representation in A1 is segmented into words, where "word" means a definite word form and variant, e.g., verb "to go", present tense, 2nd person singular, indicative, word variant 2 (for a specification of the Glyph Grid see Building Block 2 below). Each of these entries designating a definite variant of a certain form of a word is represented by the vector value it has in the Glyph Grid in Building Block 2. A vector can hence be understood as a pointer to a cell entry in the multi-dimensional structure of the Glyph Grid; a word segmentation variant is therefore a chain of such pointers (vectors). The A2 Handler may be any combination of hardware and software that offers the specifications disclosed herein. An embodiment largely implemented in hardware components can be expected to offer better performance.

Each of the vectors is stored in a Register (pjs), where p indicates the path variant and s the sequence number of the vector. On its creation, a vector path in A2 is therefore a word segmentation variant of a portion of text stored in A1. The Content apart from the vector reference consists of the register's state (cf. FIG. 2b) and further references shown in FIG. 5a, which are added by the Apparatus in the course of the word segmentation (Building Block 2) and the grammatical analysis in Building Blocks 3 to 5.

The paths in the A2 Vector Path Array may be numbered sequentially or in blocks by an embodiment. In the first case, the Pointer Table and its references to the Cell-ID's assigns the registers to texts and text portions (see 0ff). Line numbering in blocks, however, where each block refers to a text (portion) enables faster reorganisation of the Array as the vector paths eligible for a function primitive are a priori limited to a certain block in the A2 array without referring back to the Pointer Table.

The calling process in the Apparatus may access these vector paths in the A2 Handler using a number of function primitives: The vector path is created by Building Block 2 of the Apparatus as output of the word segmentation process, whereby the path creation can be decomposed into a sequence of path amendments (amendPath). "All paths" in the context of this Section refer to all paths that are alternative word/grammatical interpretations of a certain text portion. A certain common placeholder marks the beginning of each path and identifies the vector paths as a group. Individual vectors can be changed by the Apparatus, for instance, if the Inter-sentence State Machine (Building Block 5) changes a verb form and hence the reference to a vector in the Glyph grid (setRegisterContent). Paths may be requested by the Apparatus as a whole or in part (getRegisterContent). However, it does not make any sense to delete individual parts of a path; when the Apparatus processes a new segmentation, all paths for a certain text portion are deleted (removePath). Vector changes in a path may render this path equal to another path; checkForDuplicatePath performs this check and calls removePath to eliminate redundant paths.

FIG. 5b, left side, specifies the getRegisterContent primitive. Like the A1 Handler the underlying physical media is linearly organised. The Apparatus "sees" the word and grammatical structure of a text logically, it is the task of the A2 Handler to maintain the interpretative variants of the text, to maintain the link between words and the glyph entries (or variants of entries) in the A1 Handler and to physically organise the representation on the storage media. The calling process in the Apparatus may either request a specific register (p,s) or an entire path (p,*); in the second case, s is initially set to 1 giving register (p,r) [A2-1a,b]. Then the physical location has to be ascertained, that is all registers in all paths preceding p are counted and (s-1) is added to this figure giving the sequential physical cell number of the register [A2-2] enabling A2 to read the register content [A2-3]. Those skilled in the art will realise how to organise the A2 array in blocks to facilitate register organisation and to accelerate counting.

The Pointer Table (see FIG. 5a) maintains the information pertaining to which placeholder/s (variant/s) are associated with the vector in the register and this information is read as well [A2-4]. Finally, the content is returned to the Apparatus [A2-5]. If more s have been requested by the Apparatus, [A2-2] to [A2-5] are repeated.

In the setRegisterContent (FIG. 5b, right) function primitive the A2 Handler receives a path/sequence number (p,s) combination designating the register and the content to insert at this address from the Apparatus [A2-6]. The A2 Handler locates the physical register [A2-7] as described in the Paragraph 0 and inserts the content in Register-ID (p,s) [A2-8], which may be any of the content parts specified in FIG. 5a. If the change did not affect the vector, no further processing is required. A change in the vector, however, may render the current path equal to another path, for instance, if two paths are identical except for the tense interpretation of the verb and the change in one of the paths made the tense form equal to that in the other path. This check is performed in the checkForDuplicatePath primitive described immediately below and concludes the setPrimitive and the resulting content of (p, s) is set.

The checkForDuplicatePath function primitive receives a path p, locates a redundant path, merges p with this path and finally eliminates p. There can only be one duplicate path, as the amendPath function primitive triggered by Building Block 2 does not create duplicates (see below); Building Blocks 3 and 4 do not change the vector values; Building Block 5, which does change vector values, after every change calls this primitive to check for duplicates, hence, at any point in time there can only be at most one duplicate for each given path p.

The process is specified in FIG. 5c, right side: All paths q (except for p itself) are compared to p [A2-41] in their entirety, that is from s=1 to s*=max(s) in the path.

If the other path q is equal to p, p is to be merged with q. For every vector in p the attestations are compared to the attestations of its pendent in the duplicate path; if they do not exist, they are copied [A2-42]. Therefore, the vector in the duplicate path q obtains the superset of all attestations. Every sentence tree concatenation variant from Block 3.3 (see Error! Reference source not found.ff below) in p is checked against the variants in the duplicate path q.[A2-43]. If a sentence concatenation variant does not already exist, it is copied into the duplicate q together with the translation [A2-44]. This is repeated for all variants [A2-45]. Finally, path p including its Pointer Table entries is removed by calling the removePath primitive defined below (A2-46). Since there can only be one duplicate, the primitive ends at this stage.

The removePath primitive (FIG. 5c, left) is used by the Apparatus to remove a given path p communicated by the caller process (either in the Apparatus or the A2 Handler itself). The A2 Handler first physically locates Register (p,r) [A2-31] and counts all registers in the path giving s [A2-32]. The registers are effectively deleted by moving all subsequent registers forward by s registers, which leaves s initialised registers at the end of the A2 array [A2-33]. If the A2 array is structured by text blocks as described in Paragraph 0), the renumbering is confined to the respective block.

If a register is removed, the corresponding entries in the Pointer Table have to be removed as well [A2-35]. Also, the path number of all paths that belong to the same text portion, whose path number is larger than p, are decreased by 1 [A2-34] and the entries in the Pointer Table are changed accordingly [A2-36].

The paths are created and amended by the word segmentation in Building Block 2, which is described in the following Section. When segmenting the symbols into words, the Apparatus finds Glyph Grid entries (represented by their vector) that match the symbols found. Whenever such a vector reference is established, the Apparatus sends a message to the A2 Handler triggering an amendPath primitive in FIG. 5d. The paths to be amended are identified by the current End Point, that is the placeholder after which the segmentation that yielded the given vector interpretation started. If, for instance, the current End Point being processed is placeholder (2,11), this means that the vector passed on to the A2 Handler covers symbols in placeholders (2,12) and following. There can never be a gap or a step back between the End Point and the Cell-ID's sent to the A2 Handler in the amendPath primitive, for instance for a path with End Point (2,11), vectors whose first Cell-ID is (2,14,1) or (2,9,2) can never be valid amendments.

In a first step, the A2 Handler ascertains all paths with a valid End Point [A2-10], which also shares the same starting point and hence belong to the same group. The caller process in the Apparatus need not communicate the End Point as the End Point must be the placeholder just before the first Cell-ID covering the vector/s communicated. The range of Cell-ID's covered by each vector may differ, but they must share the same first Cell-ID and the same End Point (that is the preceding placeholder). The Handler positions on the first path p found; the following process steps are performed per path p.

If n=0, the Apparatus sends an empty message and it is recognised as an error [A2-11]. If n=1, the current path p need not be duplicated and all registers physically located after the current (p,s*) are moved forward by one register [A2-12, 13], with s* being the current end of path p. If the array is organised in blocks, this forward move only concerns the respective block (cf. Paragraph 0). Then the register thus emptied is initialised, the Register-ID set to (p,s*+1) and the vector is inserted [A2-14] together with the default translation/transliteration and the attestations from Block 2.1; the state is set to 20 (see FIG. 2b).

To retain the information as to which Cell-ID's are referred to by the vector, a pair of (current Register-ID=(p,s*+1), Cell-ID) is inserted in the Pointer Table for each Cell-ID received from the caller process in the Apparatus [A2-15].

If n>1, the current path splits and from the current position s* on has several alternative word interpretations according to the Glyph Grid. In this case, the maximum path number used for the starting placeholder determined in [A2-10] is calculated as p* [A2-16], and for each of the alternative vectors from 1 to n−1 the following procedure is processed: The last physical register R in the A2 Handler is ascertained, no matter which path it belongs to [A2-17]; if the array is organised in blocks, only the respective block is considered (cf. Paragraph 0). As many registers as are needed to copy the existing path p (that is s* registers) are physically created and initialised [A2-18]. Then all registers of p between (p,1) and (p,s*) are copied into the newly created registers following R. Since these copied registers also logically form a different path, the Register-ID's have to be adjusted to (p*+1,s) with the first path copied, (p*+2,s) with the second, generally to (p*+counter,s); the sequence numbers s within the path are not changed [A2-19]. For the new vector communicated by the Apparatus, a new register is created after the copied path at physical location R+s*+1 (R was the originally last position in the array, s* registers were appended to copy the path p). The Register-ID is set with path number p*+counter and the vector sequence number s*+1. Finally, the same vector data as in [A2-14] is inserted [A2-20].

The Pointer Table has to contain references for the registers copied from p and for the new register. In [A2-21] the Pointer Table entries for all (p,s) in the original path (with s between 1 and s*) are copied as (p*+counter,s) entries corresponding to the duplication of the existing path p in p*+counter). In [A2-22] the Pointer Table entry for the new Register-ID (p*+counter,s*+l) is inserted. Finally the counter is increased by 1 [A2-23]. If there are more paths to be copied (counter still smaller than n), Process [A2-17] to [A2-23] are repeated copying p once again. However, path p needs only to be copied n−1 times, as one of the vectors communicated by the Apparatus can be appended to p. Hence, also Process [A2-12] to [A2-15] are processed for variant n.

This process is repeated for every path p found in A2-10 [A2-25] until all relevant paths have been amended.

BUILDING BLOCK 2: WORD SEGMENTATION USING THE GLYPH GRID

Block 2 segments the stream of glyphs into words and assigns them to word types. Words are not stored in a vocabulary file or database, but in a multi-dimensional structure, the Glyph Grid (Block 2.1, see FIG. 6a), which enables storage of word and spelling variations for the grammatical dimensions of a word depending on its word type (tenses, active/passive, genus, numerus and person etc.). Of course, some dimensions do not apply to some word types, eg., a noun does not have tenses, in which case a null dimension is created in the grid. The glyph grid also differentiates between historical periods. Hence, each combination or cell in the glyph grid is accessible as a grid vector value ("vector"). The specification in FIG. 6a shows the minimum dimensions of the vector and the minimum content in each cell designated by a vector. (Hint: The graphical representation in FIG. 6a only shows 3 dimensions for graphical reasons, the grid is in fact n-dimensional).

The word segmentation process is incorporated in Block 2.2, the Path Analyser, and is specified in FIGS. 6b,c: After a text portion has been designated for analysis [210]; the Apparatus requests the deletion of all paths that may already exist due to previous processing for the same starting point; these paths can be found by searching the Pointer Table for all Registers (p,l) with the respective starting Cell-ID; the paths are then removed, if any are found [211a-c]. Of course there may be an overlap between the current range of Cell-ID's selected and existing paths, which may start earlier and/or continue beyond the selected cell range and these are not deleted or at this stage modified. An example of why these paths should not be deleted is in the case of an ancient Egyptian relative sentence that could also be seen as a separate sentence in itself or alternatively as part of a previous sentence depending on interpretation.

Furthermore, the Apparatus passes the selection of Cell-ID's on to the A1 Handler [212], which triggers processing of determineCell primitive/s in the A1 Handler [213] for a range of placeholders [p(1),p(2)] in one or several lines a. The A1 Handler returns the set of Cell-ID's (a,b,c) matching the request, for which the Apparatus in turn requests the cell content [214, 215] in FIG. 6b.

The Apparatus analyses the incoming stream of A1 cells [216]. If any of the cells contains a stroke pattern, the pattern is resolved according to the steps defined in [143-144] and all possible matches are included [217]. When all patterns have been resolved, the Path Analyser positions itself on the first placeholder in the text selected and remembers the placeholder before it as the first "End Point" [218] that is the end of the previously analysed cells. If the selection in [210] starts at the beginning of the text then the Apparatus remembers 0 as its End Point.

Starting at the beginning of the selected text, the Apparatus sets a forward window considering all placeholders within the window [219]. If the forward window exceeds the (remaining) text, it is reset to the last placeholder [220].

Then all placeholder variants, if any, are resolved for the placeholders within the window and each possible combination is ascertained [221]. If, for instance, the window consists of three placeholders b=1 to b=3 in line 5, where b=1 and b=3 have 2 alternatives glyph interpretations each and b=2 only one, then there would be four alternative placeholder sequences created: ((5,1,1),(5,2,1),(5,3,1)),((5,1,2),(5,2,1),(5,3,1)), ((5,1,1),(5,2,1),(5,3,2)),((5,1,2),(5,2,1),(5,3,2)). Due to the fact that the Glyph Grid only maintains words in Hieroglyphics, ligatures for example have to be resolved against Block 1.1 and 1.2. The resolution is done by a look-up operation in Block 1.2 to ascertain for example whether a Hieratic symbol represents a ligature, and by resolving this symbol against the Hieroglyphic symbols in Block 1.1 (see the specification in FIG. 4a) [222].

Then the Glyph Grid is searched for the resulting stream/s of symbol references in the range of placeholders covered by the forward window opened in [219] and [220] (that is all four alternatives from the above example would be searched for in the Grid). The Glyph Grid stores all omission variants by designating the respective symbols as "optional" (see definition in FIG. 6a), all word and transposition variants and by assigning alternative numbering schemes to the symbols involved it also contains all pattern variations known. The applicability of entries may be constrained by environment parameters, such as the type of text analysed, eg. religious texts where there is a predefined and relatively consistent structure to its layout. [223].

Only individual matches in the Grid that cover all symbols within the forward window count as a match, for the forward window will be gradually narrowed and hence partial matches found at the beginning of the stream of symbols under consideration would anticipate this operation.

[223] yields 0, 1 or more vector references to the glyph grid, each representing an alternative interpretation of the symbols within the forward window.

If no match was found, processing continues with reducing the forward window by 1 [227] and with repeating the process steps after Step 221.

If one or several matches were found, they are buffered together with the Cell-ID's they cover [224]. If the last placeholder (a,b) in the matching string buffered in [224] has not been remembered by the Path Analyser yet, the placeholder is remembered as an "End Point", unless the end of the area selected for analysis has already been reached [225, 226]. In effect the Apparatus calculates the length of the path and notes the starting point for the next forward windows of analysis.

If the search window is still larger than 1, it is shrunk again and a new grid search is done [227]. If the window has closed completely, the End Point from which this forward window had been spawned is eliminated from the list of End Points maintained by the Path Analyser [228].

The vectors buffered for this End Point together with their respective Cell-ID's that they cover are passed on to the A2 Handler [229, 230] to amend the physical paths in the Handler to represent them, which includes the default translation and transliteration from the Glyph Grid vector and the attestations for this vector. The starting point of the text area under consideration, selected in [210] is also communicated in order to enable the A2 Handler to identify the relevant paths. Later, the translation may become context-specific and this may depend on the word concatenation variant, hence, later several translations may exist for the vector. At this stage only the default translation is inserted in Collection(variant, translation) in the A2 Register content (cf. FIG. 5a) as variant=1. The state of the Register must be 20 (created cf. FIG. 2b) and need not be communicated separately to the Handler, as an amendPath function primitive automatically creates Registers in State 20 (cf. Paragraph 0). Further processing, in particular the identification of the path/s to be amended and the amendment itself are autonomously carried out by the A2 Handler. Then the buffer is released [229].

If there are more End Points [231], the next one is selected [232] and the forward window is spawned again from the placeholder following this End Point [233]; the steps from [219] are reiterated for this new window until the end of the text has been reached and there are no more End Points left to process. Then the environment parameters are checked for the possibility of retrograde writing [234]. In the absence of such a possibility, the process is finished. Otherwise the entire text portion is re-ordered according to the line breaks as indicated by the line number a in the Cell-ID's (a,b,c) [235]. The entire process is then repeated for the re-ordered text portion [236].

The basic functioning of the grid can be illustrated with a simple example of an ambiguity problems found in Ancient Egyptian. The glyph combination shown in H35 could be interpreted as (i) sA "(the) son" with the sitting man (A1) as a determinative for "man" further clarifying the meaning of the phonetic representation or; (ii) sA=i "my son" with the sitting man representing the first person suffix pronoun meaning "my" with the determinative left out; (iii) sA(=i) "my son" where the seated man is the determinative for son and the suffix pronoun has been omitted, however is to be understood, if context permits. Complicating the example a little further let us examine a similar example found in FIG. 6d, top. The symbol combination could be interpreted as (i) sA=i "my son" with the first seated man as a determinative and the second as the suffix pronoun; (ii) as sA.wy the "two sons" (dual) with the two seated men signifying the dual form of the word sA, 'son'; or as (iii) sA.wy(=i) "my two sons", where the two seated men are the determinatives depicting duality and where the suffix pronoun has been omitted, however as above is to be understood.[35]

[35] Both examples can be found in: Allen (2000), p. 51

The above segmentation mechanism finds each possible vector combination validly interpreting the symbol string that can be found in the Glyph Grid. For purposes of explanation, however, we will assume that the glyph grid gives only non-conjugated results in order to explain this process although in reality it will also find declinated vectors such as 'my son' and vectors which are specific to peculiarities of the language such as the omission of a symbol which is to be however still interpreted.

Assume the example in FIG. 6d, Line 2, left is to be analysed. It consists of one line with three placeholders, where the line number is line 1 (a=1) and where there are no variations (c=1). Therefore (1,1,1)=the goose, (1,2,1)=the first man and (1,3,1)=the second man (FIG. 2d, left, Line 2). The first End Point would initially be (1,0), see process step [218] in FIG. 6b, and the window would initially start at placeholder (1,1) spawning all three symbols, for which the Glyph Grid returns a=(sA.wy, two sons, noun, period=all, tense=<NULL>, active/passive=<NULL>, subj/ind.=<NULL>, number=dual, gender=m, person=$3^{rd}$ person) [223]. The determinative would be marked as "optional" in the Glyph Grid (see specification in FIG. 5a) and in [224] the Apparatus would then buffer the first path p(1)=[a] and the End Point placeholder would be remembered as (1,3) [225, 226].

A reduction in the forward window by one (cf. FIG. 6d, line 3, left) would result in the window covering the goose plus one seated man yielding one vector interpretation from the Glyph Grid: b=(sA, son, noun, period=all, tense=<NULL>, active/passive=<NULL>, subj/ind.=<NULL>, number=singular, gender=m, person=$3^{rd}$ person) with an End Point (1,2).

Reducing the forward window by 1 (cf. FIG. 6d, line 4, left) yields one resulting vector in [223]: c=(Apd, goose, noun, period=all, tense=<NULL>, active/passive=<NULL>, subj/ind.=<NULL>, number=singular, gender=m, person=$3^{rd}$ person) with the End Point placeholder (1,1).

A further reduction of the window closes the window and the End Point (1,0) is eliminated from the list of End Points maintained by the Path Analyser [228].

The next End Point to process is therefore (1,2) [232] (FIG. 6d, Line 2, right) giving the starting point (1,2). The forward window spans the two seated men, for which in our example no interpretation can be found in the Grid. A reduction in the window yields a single seated man for which the Glyph Grid returns three vectors (FIG. 6d, line 3, left): d=(si, man,/idiogram, period=all, tense=<NULL>, active/passive=<NULL>, subj/ind.=<NULL>, number=singular, gender=m, person=$3^{rd}$ person); e=(i, I, personal pronoun, period=all, tense=<NULL>, active/passive=<NULL>, subj/ind.=<NULL>, number=singular, gender=communal is, person=$1^{st}$ person); f=(i, my, possessive pronoun, period=all, tense=<NULL>, active/passive=<NULL>, subj/ind.=<NULL>, number=singular, gender=communal is, person=$1^{st}$ person)

Then the window closes and the End Point (1,1) is removed [228]

The last end point in this window to process is (1,2) giving the starting point (1,3) where the forward window contains only one seated man. (FIG. 6d, line 4, right). The results of the process would yield once again in our example the following: d=(si, man,idiogram, period=all, tense=<NULL>, active/passive=<NULL>, subj/ind.=<NULL>, number=singular, gender=m, person=$3^{rd}$ person); e=(i, I, personal pronoun, period=all, tense=<NULL>, active/passive=<NULL>, subj/ind.=<NULL>, number=singular, gender=communalis, person=$1^{st}$ person); f=(i, my, possessive pronoun, period=all, tense=<NULL>, active/passive=<NULL>, subj/ind.=<NULL>, number=singular, gender=communalis, person=$1^{st}$ person). As we can see the resulting vectors are exactly the same as was found in accessing the previous symbol due to the duplication of the symbol in our example.

A further reduction of the window then closes the window and End Point (1,2) is eliminated from the list of End Points maintained by the Path Analyser [228]. The End Point (1,3) cannot have a forward window spawned.

The vectors, each with the Cell-ID's it covers, are sent to the amendPath primitive of the A2 Handler to organise the physical representation in the array [230]. The vector paths are accessed beginning with End Point (1,3) [230] and all end point scenarios listed above are processed [231-233]. All paths in the group are consequently organised and the resulting paths are: P(1)=[a]=,two sons'; P(2)=[b, d]=,son man'; P(3)=[b, e]=,son I'; P(4)=[b, f]=,son my'; P(5)=[c, d, d]=, goose man man'; P(6)=[c, d, e]=,goose man I'; P(7)=[c, d, f]=,goose man my'; P(8)=[c, e, d]=,goose I man'; P(9)=[c, e, e]=,goose I, I'; P(10)=[c, e, f]=,goose I, my'; P(11)=[c, f, d]=,goose my man'; P(12)=[c, f, i]=,goose my I'; P(13)=[c, f, f]=,goose my my'; all with End Point (1,3).

Path p(1)=[a] also has End Point (1,3). No further window can be spawned from this End Point and in our example there are no further End Points to process [231] and therefore the process is concluded. The amendPath primitive ensures that the above paths are non-redundant and each path variant only appears once.

It should be noted that the Glyph Grid would also take into account various declinations and peculiarities specific to the language such as the deliberate omission of symbols on the part of the scribe in the interpretation of texts. Once again, this was not shown in the example for the purpose of demonstration.

The multitude of paths can be expected to be reduced in further processing, as some paths do not have a feasible grammatical interpretation, such as path 5 "goose man man" or path 3 with "son I". These variants are sifted out by Building Block 3 where the Syntactical Analyser attempts to fit the string of words created by the Word Segmentation into a consistent sentence structure.

It should be noted that Building Block 2 can significantly reduce ambiguity in poorly legible texts, which are represented as variants in the A1 Handler. This ability becomes even more apparent in the interpretation of mere stroke patterns, where each individual stroke pattern may have dozens of interpretations giving an innumerable number of possible interpretations in even a small portion of poorly legible hieroglyphs, let alone whole text portions that are hardly readable. By ascertaining all possible hieroglyphic interpretations of the stroke patterns (Blocks 1.3 and 1.6) and by matching them with the Glyph Grid even poorly legible texts can be reduced to a manageable number of feasible word interpretations. Continuing with the analysis in the following Building Blocks (syntax (3), context (4) and inter-sentence grammar (5) analysis) can yield a parsimonious interpretation of what at first glance appears to be an uninterpretable, poorly visible pattern of strokes on an artefact. The mechanisms disclosed herein can therefore provide meaningful interpretations of artefacts that are not analysable by the human reader.

Building Block 3: A Binary-Based Syntactical Tree Structure for Ancient Egyptian As outlined in the introductory section, the main issues relating to sentence structures in Ancient Egyptian include the following: (i) In Ancient Egyptian there is no punctuation indicating the end of clauses or sentences and in many cases sentence delimitations are open to discussion. Retrograde writing is also known to occur in some texts such as in the Expedition to Punt in Hatschepsut's temple; (ii) Sentence structures varied substantially over time, in that in some cases word order changed and the use and interpretation of grammatical elements such as demonstratives and personal pronouns; The general approach in creating tree structures is to use predefined binary structural elements in order to build a bottom up grammatical tree structure.[36] The Egyptian Language presents discrepancies in regards to common grammatical theories in that any one language contains structures which are either head-first or head-last, for ancient Egyptian appears to contain within itself structures which can be both head-first and head-last. The Apparatus presented herein is able to build binary structures taking into account both types within the same language. For example the noun phrase shown in Example 1 in FIG. 7*a* 'si pn' translating literally as 'man this' meaning 'this man' would be considered a head-first tree structure because the demonstrative 'this' must agree in gender and number with the noun 'man' namely masculine singular. Therefore, the head is the noun 'man' and its constituent is 'this'. This is not the case in the Example 2 in FIG. 7*a*, where the noun and the determiner/demonstrative are swapped around, that is the demonstrative, which must agree with its noun in gender and number is placed in front on the noun rather than behind it[37]. In both examples the noun is the head with which the constituent must agree, however they are different positions in relation to one another; (iii) Sentence structures from different time periods may be mixed in one and the same text perhaps used as a stylistic feature (eg. Gods may use elements of Old Egyptian in direct speech in a text otherwise written in Middle Egyptian); furthermore, texts from earlier periods may be copied into later texts, or may be continued later where the amendments show structures from later periods;[38] also, writers from later periods frequently wrote in Middle Egyptian (eg. on monumental or funerary inscriptions), but may have inadvertently introduced their elements of their present-day Egyptian.[39] Prior art translators are not capable of dealing (and are indeed not intended to deal) with these issues.

[36] For a discussion on tree structures see A. Radford, Syntax: A minimalist Approach (Cambridge, 2000); G. Grewendorf, Minimalistische Syntax (Tübingen, 2002); K. Heinz Ramers, Einführung in die Syntax (München, 2000)
[37] J. Allen, Middle Egyptian: An Introduction to the Language and Culture of Hieroglyphs (Cambridge, 2000), 54
[38] The famous collection of stories in the Papyrus Westcar is generally written in Middle Egyptian, however shows elements of New Egyptian throughout (cf. D. Bagnato, Working Paper: The Westcar Papyrus)
[39] This may occur for example in religious texts (cf. E. Bergman (1885))

The Syntactical Analyser [Block 3.2] requests the A2 vectors (a chain of words) of path p (a block of text)[301, 302], from the A2 Handler as shown in Building Block 2. (For an overview of the Building Blocks see FIG. 7*c* and the process descriptions in FIG. 7*d-e*) A text portion may consist of several word segmentation interpretations and hence A2 vector paths. Environment factors may also play a role in the interpretation of the ancient Egyptian text in terms of its syntactical tree structure due to the differences in tree structures found in different periods as explained in paragraph 137, throughout the Egyptian language and therefore it is necessary for the Apparatus to receive the environment factors and assess them accordingly [303].

The Grammatical role of a word (eg. verb, noun, adjective etc.) is ascertained from the Glyph Grid in Block 2.1 [304] and the A2 vectors assigned to basic binary tree elements [305]. For example 'man' and 'this' in the example in FIG. 7*b*. would be assigned to a simple tree structure with the parent node being a Noun Group (NG) shown in FIG. 7*a* with two children nodes Noun (N) 'si' 'man' and Determiner or Demonstrative (D) 'pn' 'this'. There may, however be vectors, which at this stage remain unassigned such as in the example in FIG. 7*b*. with the verb 'makes', or alternatively vectors may be assigned to several elementary trees. The assignment of vectors to trees is then checked against a word's agreement rules from Block 3.1 and its positional parameters from the Glyph Grid.

In [306] the binary tree structures are then built from specific elementary tree structures which are defined in Building Block 3.1 as being either head-first or head-last structures. This enables flexibility in interpreting varying tree structures found throughout the different periods of the Egyptian Language. This recombination process is performed until a highest-level grammatical element (a sentence type) is reached. 'Sentence type' includes main and subordinate clauses. If the A2 vectors involved indicate retrograde writing (see definition in FIG. 5*a*), the vectors are re-ordered in non-retrograde style and then the analysis is performed.

The outcome of this process is a set of alternative sentence concatenations that interpret the underlying A2 vectors. The example in FIG. 7b. shows three alternative interpretations for the vectors 1 to 14. Concatenation Variant 1 consists of sentences a and c, which is not complete due to the gap created by vector 5 between the trees a and c; variant 2 consisting of sentences a, b and z, where sentence b and c share the vector 11 and is therefore not disjoint; finally variant 3 contains sentence trees x, y and z which is complete and disjoint[307].

If none of the sentence concatenation variants for a particular vector path p is found to be complete and disjoint, the vector path is discarded as uninterpretable [308] and the vectors are set to State 21. This would mean that the particular word segmentation variant of a certain text portion was deemed uninterpretable and the Apparatus would attempt the next alternative word segmentation and read vector path p+1, beginning the entire syntactical process again.

If the Apparatus deems a vector path to be invalid [330] (state 21), it reads the Apparatus' system parameter and ascertains whether the path should be physically discarded. If so then the vectors and pointer table entries are physically removed [331-333], otherwise they are still maintained for further inspection.

If at least one sentence concatenation variant survives [307], the following process steps are performed. At this stage sentence analysis is limited to sentence concatenation variants which are complete and disjoint such as x, y and z in FIG. 7b. Block 3.3 contains assembled and complete sentence tree structures that have already been attested to in the Egyptian Language complete with their counterparts in the modern target language (eg. English).

If the Apparatus encounters the resulting sentence tree structure in Block 3.3 the rating given by its attestation is copied into the vectors concerned with type attestation 'sentence' [310]. If on the other hand the resulting tree structure has not been found in Block 3.3 then the resulting target language tree structure is assembled from the individual elements in Block 3.1 and their pointer structures in the target language and then mapped onto the target language structure according to the current language analysis [311]. The newly found tree structure is inserted into Block 3.3 together with its corresponding target language counterpart [312].

Once all concatenation variants have been assessed and if there are several surviving concatenation variants for a vector path, the variants are ranked according to the attestations of the individual sentence types that form each variant as stored in Block 3.3 [313].

Then the first sentence concatenation variant is selected [314] and the Apparatus positions itself on the first vector. In [315] the following information is set in the A2 vector: The sentence structure assignment, which is a reference to the lowest level element in the sentence tree in Block 3.3, the state to 22; the tree attestations, if any, are copied from the Block 3.3 entry (type of attestation='sentence'); the default translation is copied into the variant and the register is sent to the A2 Handler. This is performed for all vectors in path p [315-317]. Once a sentence concatenation variant has been finished [318] the Apparatus positions itself on the next concatenation variant or sentence interpretation [319].

The result of the Syntactical Analysis process is a set of vector paths identified by the Word Segmentation in Building Block 2 on the basis of the text array captured in Building Block 1, where the vectors are now either assigned to sentence structures or discarded. The sentences also contain a default transliteration and translation. The next steps are to analyse the contextual framework of the sentences (Block 4) and access the inter-sentence grammar (Block 5).

Building Block 4: Conceptual Categories

As discussed in 0 to 0, through the use of determinatives ancient Egyptians could more precisely define a semantic interpretation of words, written phonetically in ancient Egyptian. The choice of determinatives may have varied depending on the script used, for example in Hieratic, being a cursive script that was primarily used for everyday correspondence, the number of determinatives was restricted for ease of use and readability and in some cases simpler determinatives were intentionally chosen due to the complexity involved in drawing graphically difficult symbols. For example one could appreciate the difficulties in drawing details such as in the symbol depicting a standing man with a stick and club (A23) H37 opposed to a seated god (A40) shown in H38, especially when one takes the size of the text in consideration.

Generally determinatives could be seen as adding a quasi-second semantic layer to the interpretation of words and affecting their understanding in sentences, particularly in hieroglyphics where the full corpus of symbols was available to the scribe, and their interpretations when placed in combination with other semantic interpretations as shown in the example below.

The semantic interpretation of particular words could also have been expressed through the choice of phonetic symbols chosen by the scribe in writing a particular word. Although this area leaves room for further research the apparatus enables researchers to further study the symbol selections of particular words and their effects on the interpretation in sentences (see 0).

This enables researchers to classify words according to the Ancient Egyptian conceptual understanding of the world and to harness this knowledge to provide a text translation that is semantically and contextually correct by mapping this conceptual understanding onto that of the target language, for example English.

Conceptually, words can in fact be hierarchically classified as seen in FIG. 8a. The top level of the tree displays the basic conceptual level that the symbol expresses, that of a man. The seated man (A1) can then be found in the words listed in the Subordinate level namely person and man defining yet another conceptual level, which may be further categorized into a second subordinate level for example that of occupations. The occupations on this level could be interpreted due to the determinative as occupations held by men. For demonstration purposes let us suppose that one of these occupations was held by a woman, then the determinative to be chosen to best express this fact would be a seated woman. Automatically the reader would interpret, for example the word doctor with the determinative of a woman as a female doctor rather than a male doctor, which would naturally have a determinative of a man.

A simpler example would be the word son which could be written as H35 with the determinative of a seated man (A1), however when written with the determinative of the falcon on a standard (G7) in H36 instead of the seated man, the word son may refer to a royal son, therefore changing its semantic meaning.[40]

[40] For other examples (Allen (2000), p. 29)

A more complex example would be in the case of the word 'thief' shown in FIG. 8a, which contains two determinatives that of the seated man (A1) and of a man striking with a stick (A24). The seated man determinative could be seen as depicting the male sex and the man striking with a stick is most commonly used for actions involving effort such as to strike, rob, teach and be strong. Both determinatives used in conjunction give the reader a better semantic understanding of the word 'thief', namely a man who makes an effort and perhaps in this case with force.

As we have seen determinatives may play a role in the interpretation of individual words, but also may enhance the understanding and interpretation of other words in a sentence and therefore the sentence itself.

An example can be seen in FIG. 8b. The verb iri basically means 'to do' or 'to make", however when used in combination with its object and translated into English the basic meaning of the word iri is no longer satisfactory. Placing the word iri in the following theoretical examples we find that in some cases we would get an awkward translation and in other cases we would find that the meaning may be lost altogether: 'This man makes bread', 'This man makes beer', 'This man makes a wonder', 'This man makes a festival', 'This man makes a scribe' and 'This man makes a day'. In some cases we find the raw translation to be satisfactory such as 'This man makes bread' and 'This man makes beer'. However in the other cases the better translation would be 'This man performs a wonder', 'This man celebrates a festival'. In the case of the last two examples the raw translation would be considered incorrect and possibly not understood and would be best expressed as 'This man becomes a scribe' and 'This man spends a day'. In all cases the objects were given determinatives which aid the reader in the semantic meaning of the words, however when used in combination with other words such as the verb iri we find that the determinative may influence not just the semantic meaning of the individual word but the contextual meaning of other words across the sentence structure.

FIG. 8c shows the sub-building blocks of Block 4: The *Conceptual Analyser* (Block 4.1, see specification in FIG. 8d,e) receives a stream of vectors from the A2 Handler, resolves the concepts in the Conceptual Analyser and builds the Concept switch from the *Symbols Repository* (Block 1.1) and the *Repository of Conceptual Categories* (Block 4.2). Each symbol may represent one or several concepts (see Collection(concept) in Building Block 1.1, FIG. 4a), and the concepts are defined in Block 4.2 in FIG. 8c.

The Concept Analyser must first retrieve the vectors from the A2 Handler, which contains a list of references to the Glyph Grid and hence word forms [410, 411] and then resolve the link to the actual text cell [412] containing the symbol references using the pointer table and finally the corresponding text cells stored in the A1 Handler are identified [413, 414] and the actual cell contents are read [215].

The content of any A1 cell may be VOID, a symbol reference or a stroke pattern. If a cell contains a stroke pattern instead of a hieroglyphic symbol reference, the stroke pattern is expanded to a symbol or a number of hieroglyphic symbols in the case of ligatures [216, 217 in Block 1]. It should be noted that the text stored in the A1 Handler is always kept in its original form and the Apparatus analyses and resolves the physical cell content at run time taking into account x number of alternative interpretations.

In contrast to prior art translators the apparatus can maintain original data due to its strict separation between text representations and its (possibly numerous) symbol interpretations.

Using the example shown in FIG. 8e right, building Block 2 would in this case calculate the default translation as 'make son day' and building Block 3 would have interpreted this as 'The son makes a day', however conceptually this translation would not be considered correct. The following described processes would provide the semantically correct translation.

Once all cell content is available in terms of possible hieroglyphic symbol references, the conceptual analyser positions itself on the first A2 vector received from the Handler and resets the concept switch [415]. It then attempts to resolve the concepts against two sources; firstly checking the actual symbols found in the physical text as represented by the A1 Handler [415a] (opposed to the ideal word found in the glyph grid, which would also contain optional symbols and variations) against possible concept references in Block 1.1. For example the word 'son' [See FIG. 8e, right] containing the determinative of Horus on the standard could conceptually be interpreted as royalty and/or divinity and therefore the 'son' being referred to may be a royal and/or divine son; secondly by accessing the A2 vector in the Glyph Grid [415b] determining possible 'virtual determinatives'. This information is then used to build the concept switch for each sentence. As stated above in paragraph 0 Building Block 3 has been processed and enables the concept switch to ascertain the grammatical role of the A2 vector [416] hence enabling the concept switch to map grammatical roles to their corresponding concepts ascertained in 415a and 415b.

The concept switch in our example would recognize that the verb 'make' would have a concept of NULL, the noun 'son' a concept of 51, which would be that representing for example the concept of royalty and 'day' a concept of 16 possibly representing time. The switch is graphically shown in FIG. 8e, right and would be created as defined in Block 4.2 as:

Concept Switch=[(Verb(1), NULL) (Subject(1), concept 51) (Object(1), concept 16)]

It should be noted that a sentence might have several verbs, subjects etc. and that the concept switch enables entries of several concepts per grammatical role.

In 417 the concept and the meaning of the actual vector itself is immediately analysed rendering the correct semantic meaning in this case of the Egyptian word 'son' as 'royal son'opposed to the default interpretation stored in the Glyph Grid in Block 2.1 of merely 'son', without any royal and/or divine connotation, written phonetically identically but without the determinative Horus on the standard. If a concept-specific translation is found then, the default translation is substituted for the conceptually correct translation [418].

Once the concept switch for all vectors in a sentence are assembled the conceptual analyser again positions itself on the first A2 vector in the sentence [420] and checks whether there is any entry in the concept switch that matches the prerequisite for a concept-specific translation for the vector itself [421]. In our example the verb 'make' would be checked first to ascertain whether there is a concept-specific translation for the combination (Subject, 51) and/or (object, 16). In this case it would find (object, 16) equating to the concept 'time' which would give the verb 'make', the context-specific translation of 'spend' for the object's concept of 'time'. If there are several matches for one particular verb then the concept-specific translation is selected according to the priority parameter is Block 2.1. If the context-specific translation is found it is inserted in the respective vector [422] and the insertion is performed according to the correct grammatical form as indicated by the tree structure and in this case 'makes' would be substituted for 'spends'.

All vectors in the sentence are similarly processed [423] until the end of sentence is reached [424] and the following sentence is processed resetting the concept switch [415].

Finally the modified vectors are sent to the A2 Handler that processes them in its SetRegisterContent function primitive [431-434]. The vectors are now in State 23 and the translation for our example would be 'The royal son spends a day' which is semantically correct.

Building Block 5: Inter-Sentence Grammar State Machine

To solve the issues outlined in 0 the Apparatus analyses the grammar across sentences. This is done by Building Block 5 (see specification in FIG. 9b), which consists of a an Inter-sentence Grammar (ISG) State Analyser (Block 5.1, see the process specification in FIG. 9c), a Repository of Triggers (Block 5.2) that indicate a change in the grammatical state and a Repository of ISG Transition Rules (Block 5.3) that indicates changes in the vector values for given grammatical states. A Trigger consists of the old state and a new state and is merely used to transfer the properties of a sentence from one state to another. The Transition Rules consist of the state where they apply, the vector dimension concerned and its value and the new value that should apply when the parameters of the specific state is reached.

The principle of the ISG State Analyser is illustrated in FIG. 9a. For explanatory purposes we will suppose that the dimensions concerned are the third and fourth dimensions, where the third dimension defines the mood of the sentence and the fourth the tense. Let us suppose that we receive vectors in three separate sentences, where the first sentence is to be interpreted as subjunctive due the first vector which caused a trigger changing the third dimension from indicative to subjunctive. As shown in the diagram we find that the first line depicts the incoming stream of vectors and the state is defined just below it. The final line under these vectors depicts the transformed flow of vectors that is sent back to the A2 Handler. It should be noted that the vector itself is the trigger defined by its dimensions and is stored in the Repository of Triggers, where a vector may be defined; in full that is that all dimensions are specified; or defined by only some dimension values. In the example, vector a is the trigger that triggers a set of transformation rules (shown on the right of the diagram) defined in Block 5.3 causing the change in the mood dimension from indicative to subjunctive. It should be noted that this may only be one of the changes that can take place.

The state remains the same until another trigger is found in the stream of vectors and then the state is reset. In our example vector B is trigger (T17) that changes the tense state to past tense and subsequently affects all vectors after that point in changing the state from 3 to 4 in dimension 4.

The process implementing this principle is performed by Block 5.1, the ISG State Analyser and is specified in FIG. 9c and described in the paragraphs below.

The Apparatus receives the vectors of a vector path p from the A2 Handler in State 23 or 25 (if the procedure is re-run) [510, 511] and positions itself on the first vector received. For each vector it is ascertained, whether it is a trigger [512] using the trigger repository in Building Block 5.2. The inter-sentence grammar (ISG) state is maintained by Block 5.1.

If a trigger is encountered, the current grammatical state is reset [513]. A trigger may consist of several vectors, hence the Analyser goes back n vectors in search of a trigger; n is given by the maximum number of vectors forming a trigger (Block 5.2).

Then the Apparatus checks whether there is a vector transition rule for the vector under inspection and the current grammatical state in Block 5.3 [514] (cf. definition of Block 5.3 in FIG. 9b). A transition rule applies in a certain ISG state (which may also be set to <VOID>, whereupon the rule generally applies) and defines a set of vector values. Not every vector coordinate needs to be part of the ISG state: In the case of verbs (the main application for the inter-sentence grammar analysis) tense, person or mood are primarily concerned by the shift; however, nearly all other Glyph Grid dimensions (FIG. 6a) forming the vector may apply. Some however may not be concerned, because a trigger cannot shift a word (variant) or the grammatical role of a vector that was identified in Word Segmentation in Block 2. For example, it cannot shift the vector dimensions in such a way that a participle becomes a finite verb form.

If the rule applies according to the environment parameters [515], the vector value/s is/are changed according to the rule found in Block 5.3 [516] and the default or a context-specific (according to the Concept Indicator set in the vector) translation for the new vector is inserted from the Glyph Grid (Block 2.1, [517]. Finally the attestations for the transition rule applied are copied from Block 5.3 [518] with the type of attestations being "ISG".

Consider another illustrative example in terms of the process diagrams for such a shift. The transition rule in Block 5.3 is ISG State=B; Initial vector:(tense=present tense, mood=indicative); Target vector: (tense=past tense); Attestations=(A1, A2, ..., An) and Applicability=general. Assume the current state to be B and the current vector from the A2 Handler as (for the dimensions cf. FIG. 6a) v=(word=hears (sDm), role=verb, variant=standard with determinative, period=all, tense=present tense, voice=active, mood=indicative, numerus=singular, genus=masculine, person=3$^{rd}$). In the first Step [514], the Analyser checks whether any of the states defined for State B matches the dimensions of the current vector—the above sample rule does, as tense and mood are matched and the other parameters are undefined and hence can take any value. Since applicability is general [515], the new value/s in the relevant vector dimension/s is/are inserted in the vector; in the example, the tense dimension is changed to past tense [516]. It should be noted that not all vector dimensions that are used to ascertain, whether the rule applies, are also modified. In the example, mood=indicative is used to indicate, whether the rule applies, but the mood dimension is not changed by the transition rule itself. Continuing the example the past tense default or context-specific translation is inserted in the vector [517) and the attestations A1 to An are inserted in the Collection((type of attestation, attestation)) of the A2 vector (FIG. 5a) with the type set to "ISG" [518].

Irrespective whether a trigger was encountered, or a vector change was effected or even whether there was no processing for the vector under inspection, the following steps are again common to all vectors: The vector state is set to 25 [519] and sent to the A2 Handler to modify the respective Register in the path [520, 521].

This procedure is repeated until there are no more vectors in the path selected [522].

The shift in vector changes may have rendered the path under analysis into a duplicate of an already existing path. Hence, the ISG Analyser requests the A2 Handler to check whether there is a possible duplicate path [523, 524]. The checkForDuplicatePath function primitive also removes this path if there is a possible duplicate. Since initially all paths created by amendPath are different from one another and since after every ISG application to a path the new path is checked for duplicates and is also removed if it is a duplicate, there can at most be one single duplicate for the path.

Building Block 6: Vector Analyser and Renderer

Building Block 6 (cf. FIG. 10a) consists of a Symbol Renderer (Block 6.1), which renders the cells from the text array in the A1 Handler representing a certain text portion on the output device, and a Translation Renderer (Block 6.2), which evaluates and ranks the vectors for a text portion received from the A2 Handler and renders the transliteration and translation on the output device. The processes are specified in FIGS. 10b-d.

The output device may be any combination of hardware and software that can represent the stream of information generated by Processes 6.1 and 6.2.

For the Symbol Renderer (FIG. 10b, left), two script modes are distinguished: (i) the mode in which the text had been originally captured; and (ii) the representation script mode. A Hieratic text, for instance, may be rendered on the output device either in its Hieratic original or as Hieroglyphic transcription. Several script modes may also be rendered in parallel, which may not only imply a parallel display of, for instance, a Hieratic original and its Hieroglyphic counterpart, but also several Hieratic styles in parallel (eg. the rendering of a text in the writing style found in the Papyrus Westcar). The user or an automatic process must also designate a text portion to be rendered; possibilities include: (i) a single word or phrase in dictionary search; (ii) a text portion to be translated that is finally rendered on the output device together with its translation (see Block 6.2); or (iii) a text portion that was entered by an input process and that is to be rendered on the output device [Steps 116, 145].

In any case, a range of placeholders (a,b) is indicated and supplied by the A2 Handler [610, 611]; the Apparatus receives the message from the A2 Handler and positions itself on the first placeholder content received. One placeholder after the other including its variants are processed by the Once-placeholder Subprocess [620-635] until the entire range of placeholders has been rendered on the output device [612, 613]. The environment parameters are available, either because the Apparatus already has stored them from previous processing, such as processing done in Building Blocks 2 to 5 in a translation request, or the parameters are read from the input device.

The One-placeholder Subprocess starts by checking whether a new group pattern has been started in the stream of incoming A1 cells. If so, the group pattern type reference (see specification of cell content in FIG. 3a) is resolved against the Group Pattern Type (see FIG. 4a) in Block 1.1 [620] and the placeholders in the pattern are rendered on the output device according to the collection of rendering information (see FIG. 4a and [621]).

Then the Apparatus positions itself on the placeholder variant c=1 and inspects the content of cell (a,b,c) indicated by Type of Content (see FIG. 3a). If the cell is empty, the Apparatus simply moves on. If the content is a stroke pattern, one characteristic stroke is rendered on the output device by first creating the rendering area/s [623]. For example creating a rectangular area on the output media to hold the stroke pattern and then rendering the characteristic stroke on the output device [624]. (for definition see FIG. 3a). To those skilled in the art it will be apparent that there are several options as to how an embodiment may render the strokes; possibilities include: (i) rendering all strokes in one area as an overlay; (ii) rendering each stroke in one area and show all areas at once; or (iii) show only the first stroke and let the user leaf through the pattern (eg., via a row of tabs, which also depends on the capabilities of the output device). The embodiment may, of course, also offer several rendering variants to choose from. In any case, the area created in [623] provides the (0,0) point from which the pixel matrix information from the characteristic stroke definition is implemented to build the pattern according to the Collection(Characteristic stroke) information from the A1 cell content.

If the content is a symbol (selection in [622]), the Apparatus distinguishes between the A1 cell content and the representation (see the remarks in Paragraph 0). If the original and the rendered script mode do not coincide, possible ligatures have to be taken into account. If the original script mode was Hieroglyphic and the script mode to be rendered is for example in Hieratic, the Apparatus ascertains the style from the environment parameters [626] and ascertains the corresponding symbol in Block 1.2 [627]. If the current symbol is part of a ligature in Hieratic [628], the respective ligature symbol is ascertained in Block 1.2 [629] and the two (or more) placeholders covered by the now merged Hieroglyphic symbols are also merged in the pixel-matrix representation [630]. Ligatures typically only cover two Hieroglyphic symbols, but frequently also cover three or more symbols.[41] In ascertaining whether there is a ligature, the Apparatus hence has to go back n symbols, with n [628] being a system parameter that corresponds to the highest number of Hieroglyphic symbols joined to a ligature in Block 1.2.

[41] G. Möller, Hieratische Paläographie: Die Aegyptische Buchschrift In Ihrer Entwicklung von der Fünften Dynastie Bis Zur Römischen Kaiserzeit, Erste Band (Leipzig, 1909), p. 68-76; G. Möller, Hieratische Paläographie: Die Aegyptische Buchschrift In Threr Entwicklung von der Fünften Dynastie Bis Zur Römischen Kaiserzeit, Zweite Band (Leipzig, 1909), p. 63-70; G. Möller, Hieratische Paläographie: Die Aegyptische Buchschrift In Ihrer Entwicklung von der Fünften Dynastie Bis Zur Römischen Kaiserzeit, Dritte Band (Leipzig, 1912), p. 64-68

If the original symbol in the A1 cell is in Hieratic or Demotic and the representation is the same script, the rendition style is ascertained from the environment parameters [626], which is the same module used for representing Hieroglyphic symbols in Hieratic/Demotic from the A1 Handler.

If the original symbol in the A1 cell is in Hieratic or Demotic and the representation is in Hieroglyphics, a ligature may have to be split. Hence, after ascertaining the symbol in Block 1.2 [631], the Apparatus checks whether the particular symbol is a ligature [632]. If so, the area for representation of this symbol is divided accordingly on the output media [633] according to the space allotted to the symbols and their pixel-matrix information in Block 1.1.

Finally, the symbol is rendered on the output device either in Hieroglyphics or in Hieratic/Demotic [634]—a Hieroglyphic symbol is taken from Block 1.1 (several symbols may be taken, if a ligature was split in Step [632]), a Hieratic/Demotic symbol is taken from Block 1.2 [635, 636].

If more than one variant c for the placeholder (a,b) exists, the procedure starts again at [622] with the next variant [637]. It depends on the output media chosen, as to how several variants may be depicted in parallel. Those skilled in the art will know several ways to render the alternatives in rendering areas hidden behind one another on a device enabling user interaction, such as tabs, scroll bar or control button arrangements. If the output device does not enable user interaction, the alternatives are rendered in parallel, such as in a vertical or horizontal row arrangement depending on whether the ancient text is organised in horizontal or vertical rows, resp.

The Translation Renderer receives a range of placeholders (a,b), typically the same range has already been rendered by the Symbol Renderer from the A1 text array. The Pointer Table [640] indicates which vector paths and registers are covered by the placeholder range and the Renderer logically positions itself on the first path p and requests the path registers from the A2 Handler [641, 642].

The next steps depend on the state of the A2 vectors in the path: States 21 or 24 (discarded, see FIG. 2b) are skipped completely and the process is continued with [648]. Vectors in State 20 have not been subjected to any type of sentence analysis (Blocks 3 to 5), hence only a vocabulary translation can be provided by calling the One-sentence Subprocess in variant 1 (that is without sentence structure, the subprocess is described below) and this would also be the variant for dictionary search only [647]. Vector states 22, 23 or 25 indicate that a sentence and possibly also a context and ISG analysis have already been performed, therefore, several sentence concatenation variants may exist. The Renderer positions itself on the first such variant and within the variant on the first sentence. The Renderer ascertains which sentence the vector belongs to by analysing the Collection(variant, sentence structure assignment) entry in the vector and by resolving the reference against Block 3.3, which contains the assembled complete sentence structures together with their matches in the target language [644]. This reference also indicates when a sentence ends. Then the One-sentence sub-process is requested in variant 0 (that is with sentence structure, [645]). This is repeated for all sentence concatenation variants in the path [646].

The A2 Handler function primitives ensure that all vectors in a path have the same vector state, however this process also works with vectors of different states, by first taking vector sequences in states 22, 23 or 25 with complete sentence (Block 3.3) assignments, then taking sequences of such vectors without complete sentence assignments and sequences (or individual vectors) in state 20 as dictionary search and by finally ignoring all vectors in state 21 and 24.

Once all sentence concatenation variants of a path have been rendered [648], the Renderer positions itself on the next path, if any [649]. Once all paths have been rendered, the sentence concatenation variants are ranked according to their attestations [650]. The attestations are stored in the A2 Handler (see Collection((Type of attestation, attestation)) in FIG. 5*a*): The Glyph Grid, which is vector-specific (Block 2.1 in FIG. 6*a*); the sentence attestations are sentence-specific (Block 3.3 in FIG. 7*c*); and the ISG rule is vector-specific (Block 5.3 in FIG. 9*b*).

The sentence-specific attestations are only stored with the first vector of the sentence. The vector paths and their respective alternative sentence concatenation variants are then arranged on the output device according to the ranking result [651].

The One-sentence Subprocess either processes one sentence in a sentence concatenation variant in a vector path (Variant 0) or a sequence of vectors in State 20 (see FIG. 2*b*) (Variant 1).

In both variants the transliteration from the vectors is concatenated [660], which—given the text font and size used for transliteration and the transliteration string size—gives the size necessary for rendering the transliteration. The respective output area is created on the output device and the transliteration is rendered thereon [661, 662].

In Variant 0 the Renderer does not only go through the vectors, but also ascertains the basic sentence element for each vector [668], for it may be part of several sentence variants. Hence, the Renderer positions itself on the first variant, resolves the elementary sentence element in Block 3.3 [664], ascertains the position of the corresponding element in the target language ([665] and the specification can be found in [311, 312]) and assembles the tree in the target language with the translation found in the vector. This translation may be the default translation from the Glyph Grid (State 22), a context-specific translation (State 23) or a translation already processed by the inter-sentence grammar rules (State 25) [666]. This is repeated for all sentence variants [667] and all vectors in the path [668].

In Variant 1 the Renderer ascertains all possible translations, including context-specific ones that apply to the environment parameters indicating also the context they apply to from Collection(Collection(role, concept), specific translation, priority) in Block 2.1 as well as all word forms and also indicates optional elements from the Glyph Grid entry in Block 2.1 [663].

In both variants the space necessary for rendering is known after the output area is created [669] and the transliteration/translation is displayed as textual information [670].

Finally, when the user accepts a certain translation variant as his/her selection, the respective rules gain an additional attestation each. This learning feedback enables the Apparatus to learn from experience and the user selection from alterative rule applications. As specified in Paragraph Off, some attestation references are vector-specific and are hence included once per vector [652, 653], some are sentence-specific and are hence included once per sentence in the concatenation variant confirmed by the user. This can only occur at the beginning of a sentence [654], as such a reference is only included for the first vector in the sentence. Here, the sentence repository in Block 3.3 is attested [655]. This procedure is repeated for all vectors in the confirmed sentence concatenation variant [656].

The exemplary embodiment disclosed herein thus comprises of the following main building blocks to analyse Ancient Egyptian words and texts and to translate them into a target language:

An input device that enables an automated input process or a human user to input text either as symbols or as stroke patterns, where the symbols themselves are unrecognisable. The Apparatus then processes the input in a series of Building Blocks (see FIG. 2*a*), each of which is described in a corresponding section.

The Pattern and Glyph Analyser (Building Block 1) accepts a stream of Hieroglyphic, Hieratic or Demotic symbols or a stroke pattern from the input device and analyses it: Stroke patterns are resolved into possible symbol combinations and alternative symbol interpretations are captured. The Apparatus then sends the interpretation to the Vector Handler (see paragraph below) to organise the text in a machine representation.

The Vector Handler consists of (i) the A1 Text Array Handler organizing the text in an array of placeholders and variants within a placeholder, whereby the array cells may contain symbols or stroke patterns, (ii) the A2 Vector Handler organizing the grammatical interpretation of the text (see below) and (iii) the Pointer Table linking grammatical vectors in A2 to placeholders and their variants in A1. Building Block 1 sets the A1 array cells in State 10 or 11 (FIG. 2*b*).

A1 is any combination of hardware and software that is able to offer the A1 function primitives disclosed in FIGS. 3*b* and 3*c*.

The Glyph Grid and Word Segmentation Block (Building Block 2) receives a stream of placeholder content from A1 either in state 10 or 11 (FIG. 2*b*), resolves stroke patterns into sets of matching symbols and scans the content for known symbol and placeholder patterns to segment them into possible words and forms including their default transliteration and translation into the target language. If there is no meaningful interpretation, the pattern is discarded in A1 (State 13 in FIG. 2*b*); if there is a meaningful interpretation, each alternative variant/form emerging from this process is represented by a vector giving alternative streams of vectors interpreting the script patterns (vector state 20, "created" in FIG. 2*b*). The resulting stream of vector paths is sent to A2 (FIG. 2*a*). The corresponding entries in A1 are transferred into state 12. The corresponding Pointer Table entries linking the A1 array cells to A2 vectors are created.

If the process is only to check for words/forms, the process ends at this stage and the text array cells in State 12 and the superimposed vectors in state 20 are rendered by the output process (Building Block 6).

The Syntax Analyser (Building Block 3) receives a stream of vectors in state 20 (or 21, 22, 23, 25) from A2 and matches them against known sentence patterns. The corresponding sentence pattern in the target language (eg. English) is identified and the sentence elements are linked to the target sentence structure. The information, whether paths (or parts of paths) match and the corresponding structural information is sent back to the A2 handler which flexibly discards paths and their corresponding vectors (state 21 in FIG. 2b) and structure paths according to the information received (state 22).

As mentioned in the introductory section, determinatives (or other symbols) may be used to express concepts, which in turn influence the correct translation. The Conceptual Analyser (Building Block 4) receives a stream of vectors in state 22 (or 23, 25) from A2 and checks for concept-relevant determinatives, resolves additive and/or conflicting determinatives and alters the translation of the words concerned and sends the stream of vectors back to A2. A2 moves the state of the vectors to 23; however, if certain vector combinations are impossible given the conceptual framework, the vectors (vector paths) are discarded (state 21).

The Inter-sentence Grammar (ISG-) State Machine (Building Block 5) receives a stream of vectors in State 23 or 25 from the A2 Handler and checks for (i) triggers that change the current state; or (ii) state transformation rules given the current state. This may lead to the merger of hitherto alternative vector paths. Building Block 5 changes the respective vector values and sends the stream of vectors back to A2, which in turn discards redundant paths (State 24) and the others are moved to State 25. Eg., two otherwise identical vector paths, one with the verb in present tense and one in past tense, with an active trigger in the previous sentence pushing the present into past tense, which makes the two paths identical.

Finally, the Apparatus renders the text array cells and the grammatical vectors on the output device (Building Block 6, Vector Analyser and Renderer). Different interpretation variants are ranked according to their attestations and the variant finally chosen by the human user of the Apparatus can be used as an additional attestation for the elements used in this variant.

The processes in Building Blocks 2 to 6 are performed without any human intervention; Building Block 1 may either be performed in human-machine interaction or also as an automated process, for instance, by scanning a document (see the section on Building Block 1 for alternative methods of input). The sequence of the building blocks is controlled by the Apparatus, which may be any combination of hardware and software that can generate and process the array cells and vectors in A1 and A2.

The Apparatus, the Arrays (A1, A2), the input unit and the output unit may be situated on one or several hardware/software systems, which may be interconnected by any network including the Internet.

Thus, it will be apparent from the above that, due to the properties of the language and ambiguity in possible text interpretations, the text itself (Al) and it's grammatical representation (A2) must be organised in a specific way. Both handlers are not primarily defined as data structures (see FIGS. 3a and 5a) but as physical array structures. Both arrays have a set of function primitives (FIGS. 3b, c and 5b-d), which are capable of internally organizing the data that is manipulated by the translation apparatus. The function primitives may indeed also be implemented to a large degree in a hardware device similar to, for instance, Ethernet adapters, which implement a large degree of the Ethernet protocol in hardware. This hardware implementation is referred to above. The Handlers could be considered as storage devices and the function primitives manage these storage devices in a way that support glyph representation and analysis. Also described above is the mapping of these structures on a linear storage media (p. 13) with the help of the aforementioned function primitives. Thus, a technical effect is provided that lends technical character to the internal functioning of the system itself, particularly in the management of computing resources required.

The translation apparatus per se can be conceptually separated from the array representation in the A1 and A2 Handlers. The translation software at each step of the translation process gets its data (operating parameters) from the handlers and sends the result back to the handlers which independently organise the data received triggering the appropriate function primitives in the Handler. Thus, the physical and technical functioning of the computing device is affected in the sense that the invention takes information from a (potentially) physical device and sends it back to the same physical device and thereby affects its functioning.

Apart from manual entry via the toolbox menus on screen the Pattern and Glyph Analyser can also receive scanned input from a photograph of a text (see Stroke Pattern Analyser, p. 21f and FIG. 4b). Due to deterioration of the original artefact, the translation apparatus received in many cases possibly incomplete stroke patterns from a scanner, calculate possible matches, evaluates their plausibility and sends the result to the A1 handler, thus affecting the technical and physical functioning of the device itself.

Whether the stroke pattern is entered via the user interface or via a scanner, the software is capable of determining possible meaningful interpretations of in many cases incomplete stroke patterns eliminating those interpretations which are not consistent with environment parameters (see below) or other parts of the text. This is enabled due to the specific organisation of information in the A1 Handler and its function primitives. The task could not be processed otherwise. Thus, a technical effect is achieved in the sense that the management of computer resources required lends technical character to the system.

FIG. 4a in the above description, lists environment parameters which play an essential role in determining plausible text interpretations for example, the period the text was written, where the text was found, where the text is located on the artefact etc. These parameters lend further technical character to the invention in that they contribute to the reduction of alternative interpretations to a manageable level, thereby reducing to a practical level the computing power necessary to compute such variations.

However, the environment parameters also include the physical properties of the user interface/output media. These parameters influence the representation of the content received by the A1/A2 Handlers and can be stylized according to the limitations and the degree to which the user may or may not be able to interact with the output media which is limited by the output media itself, thus once again, providing a technical effect that lends technical character to the claimed system in the internal functioning of the device supporting the system functionally.

Among others, the following are rendered on an output device: (a) the results of text entry; (b) text rendering from a scanner or transcription (converting Hieratic/Democratic script into Hieroglyphic 'prints', vice versa) (see FIGS. 4a, 10a-d and pages 45ff); (c) the toolboxes to support the user using the device (FIGS. 4a and 4c and p. 20). Thus, technical means to influence the visualisation is provided in the exemplary embodiment of the invention described above. FIG. 4a describes the rule bases for Hieroglyphic and Hieratic/Demotic symbols to be rendered on the output device depending on the environment parameters which also contain information on the output device itself. This concerns the style in which the script (Hieratic/Demotic) is represented. The arrangement of the glyphs in group patterns and—in its very first stage before even a symbol interpretation takes place—the representation as a stroke pattern, if the text is poorly readable and hence has to be entered (manually or scanned) as a series of stroke patterns which may be checked by the user but above all is analysed by the apparatus itself irrespective of whether the user interacts with the apparatus or not. This goes beyond the 'normal' physical effects of a computer programme in that the apparatus would use the environment parameters to, for instance, calculate and arrange Hieratic script in an automatic transcription from Hieroglyphs according to a certain period and style and according to the properties of the output media used. This goes beyond the normal operation of taking a character and displaying it on the dot-matrix of a media.

The main issue in Hieroglyphic translations is to cope with the ambiguity involved. Hence, the various forms/variations/possible omissions etc. are stored in the Glyph Grid (FIG. 6a, p. 28ff). Each entry is identified as a cell in a multi-dimensional grid denoted as a vector. Thus, further technical character is present in that vectors and their manipulation require technical considerations.

This not only enables a fast yet systematic search over possible word matches of a string of symbols/stroke patterns, but also in later stages of the text analysis, enables the application to implement rules for modifications in the interpretation. For instance, in Egyptian, the grammatical interpretation of an element in a sentence may depend on a 'state' created in a previous sentence, for example, a past tense verb or marker of some form. The identification of each individual word with a vector in the Grid enables the implementation of a rule base as a set of vector shifts. For example, Rule 24 indicates: if State 17 applies=>shift the $7^{th}$ dimension in every vector to value '9' if the original values are either '1' or '2'). That is if the previous sentence is in past tense; interpret a present tense verb in the following sentence as also being in past tense unless a marker of some form exists to counteract the shift. The rule base hence consists of contingent shift operations through the n-dimensional Glyph Grid. This provides a further technical effect in that it affects the efficiency of a process that is to determine the correct grammatical form stored in the apparatus, and enables a highly flexible, yet fast implementation or grammatical (or semantic) rules of arbitrary complexity and also permits to the concept switch (FIGS. 8c, d and e). The concept switch may also be used for conventional language translators. The Glyph Grid enables a clear, redundancy-free and concise definition of such rules minimising possible errors due to a protracted rule base, again providing a technical effect in terms of efficient management of computer resources.

The entire apparatus described above in the form of an exemplary embodiment is specified as a state machine as the translation process covers several stages (FIG. 2b) but also two stages are state machines in themselves, namely the concept switch enabling context-dependent translations (FIG. 8b) and the Inter-sentence grammar machine (FIG. 9a) thereby lending further technical character to the system.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word 'comprising' and 'comprises', and the like, does not exclude the presence of elements or steps other than those listed in any claim or the specification as a whole. The singular reference of an element does not exclude the plural reference of such elements and vice versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

Bibliography

Allen J. P., *Middle Egyptian: An Introduction to the Language and Culture of Hieroglyphics* (Cambridge, 2000)

Anthes R. (ed,), *Die Felseninschriften von Hatnub* (Leipzig, 1928)

Bergmann E. (trans.), Der Sarcophage des Nesschutafnut in der Sammlung Ägyptischer Alterthumer des Österr. Kaiserhauses in; G. Maspero (ed.), *Recueil De Travaux Relatifs A La Philogie Et A L'Archeologie Ëgyptiennes Et Assyriennes: Sixiéme Année* (Paris, 1885), 1-35

Faulkner R., A Concise Dictionary of Middle Egyptian (Oxford, 1999)

Fox M. V., *The Song of Songs and the Ancient Egyptian Love Songs* (Wisconsin, 1985)

Gardiner A., Egyptian Grammar: *Being an Introduction to the Study of Hieroglyphs*, third edition (Oxford, 1927)

Goldwasser O., *From Icon to Metaphor: Studies in the Semiotics of the Hieroglyphs* (Fribourg, 1995)

Goldwasser O., The Determinative System as a Mirror of World Organization; *GM* 170 (Gottinger, 1999), p. 49-61

Loprieno A., *Ancient Egyptian: A linguistic introduction* (Cambridge, 1995)

Möller G., Hieratische Lesestücke für den Akademischen Gebrauch: Erstes Heft (Leipzig, 1909)

Möller G., *Hieratische Paläographie: Die Aegyptische Buchschrift In Ihrer Entwicklung von der Fünften Dynastie Bis Zur Romischen Kaiserzeit, Erste Band* (Leipzig, 1909)

Möller G., *Hieratische Paläographie: Die Aegyptische Buchschrift In Ihrer Entwicklung von der Fünften Dynastie Bis Zur Romischen Kaiserzeit, Zweite Band* (Leipzig, 1909)

Möller G., Hieratische Paläographie: *Die Aegyptische Buchschrift In Ihrer Entwicklung von der Fünften Dynastie Bis Zur Romischen Kaiserzeit, Dritte Band* (Leipzig, 1912)

Ockinga B. G., *A Concise Grammar of Middle Egyptian* (Mainz, 1998)

The invention claimed is:

1. Apparatus for translating a body of text in an initial language into a target language, comprising an input device for receiving a body of text comprising a plurality of elements, an analyzer for analyzing said text and identifying one or more possible characters of said initial language corresponding to respective said elements, a data storage system comprising a data handler for generating a text array comprising an array of cells, each cell being representative of an element and its location within said body of text and containing data representative of said element, the data storage system being arranged to map said array of cells onto a linear storage media, a multi-dimensional storage grid containing one or more possible translation into said target language, including alternative translations and spelling variations, corresponding to respective characters of said initial language, an analysis module for receiving a stream of elements from said linear storage media and assigning in respect of each element one or more vector paths indicative of one or more respective translations in said storage grid corresponding to said respective element, the system further being arranged to generate data linking said vectors to respective cells of said text array of said data storage system.

2. Apparatus according to claim 1, further comprising a conceptual analyzer for retrieving streams of elements from said data storage system, identifying, using said linking data, the vectors paths associated with respective elements and determining therewith the possible translations of said elements from said multi-dimensional storage grid, analyzing said possible translations in conjunction with a respective conceptual determinative, and discarding any possible translations determined not to correspond with said conceptual determinative.

3. Apparatus according to claim 1, further comprising a grammar analyzer for retrieving streams of elements from said data storage system, identifying, using said linking data, the vector paths associated with respective elements and determining therewith the possible translations of said elements from said multi-dimensional storage grid, analyzing said possible translations in conjunction with one or more inter-sentence grammatical rules and discarding any possible translations that do not comply with said rules.

4. The apparatus according to claim 1, further comprising a multi-dimensional storage grid, wherein each dimension of said grid corresponding to a grammatical dimension of a word in said target language, said grid comprising a plurality of cells, each cell being denoted by a vector defining the respective word and the value of each grammatical dimension in respect thereof.

5. A system according to claim 4, wherein the user's selection is fed back to the system for use in future translation operations.

6. The apparatus of claim 1, wherein said initial language comprises Ancient Egyptian and said elements comprise symbols and stroke patterns.

7. A system for translating a body of text in an initial language into a target language, the system comprising means for receiving a body of text comprising a plurality of elements, means for analyzing said text and identifying one or more possible characters of said initial language corresponding to respective said elements, means for generating a text array comprising an array of cells, each cell being representative of an element and its location within said body of text and containing data representative of said element, means for retrieving from said text array a stream of data representative of a series of elements of said body of text, means for assigning in respect for each element one or more vectors so as to generate vector paths indicative of one or more possible translations into said target language of a respective element, means for generating data linking said vectors to respective cells of said text array representative of said elements, and means for retrieving from said text array a stream of data representative of a series of elements of said body of text and the respective cells by which they are identified, retrieving said linking data and identifying the possible translations of respective elements represented by respective vector paths, analyzing the possible translations in conjunction with one or more determinatives representative of a conceptual framework of said text to determine which potential translations correspond with said conceptual framework, and means for outputting one or more potential translations determined to correspond with said conceptual framework.

8. A system according to claim 7, further comprising a data storage system for mapping said array of cells onto a linear storage media.

9. A system according to claim 7 if a plurality of possible characters are identified in respect of an element, data representative of each of said possible characters is entered in the respective cell representative of said element.

10. A system according to claim 7, wherein said text array of said data handler comprises a multi-dimensional array of cells, each cell being representative of an element, its location within said body of text and a vector path indicative of a possible translation of said element into said target language.

11. A system according to claim 10, wherein said possible translation may be one of a plurality of possible translations into said target language, including any alternative translations and spelling variations, corresponding to a respective element.

12. A system according to claim 11, further comprising an output device for outputting the remaining one or more possible translations of respective elements.

13. A system according to claim 12, wherein if there is more than one remaining possible translation in respect of an element, all remaining possible translations in respect of said element are output for a user to select the most appropriate translation.

14. A system according to claim 12 comprising rendering means for said elements of said received body of text onto respective placeholders of said output device, and wherein said output device is arranged and configured to output a visual representation of said element.

15. A system according to claim 14, wherein said initial language has two or more different script modes.

16. A system according to claim 15, wherein said received body of text is in a first script mode and said visual representation thereof is a second, different script mode.

17. A system according to claim 16, wherein said first script mode includes ligatures consisting of n elements merged together, and wherein n is an integer greater than 1, and said rendering means is arranged to identify a ligature in said received body of text and split the respective placeholders of said output device to correspond with the elements of said ligature.

18. A system according to claim 16, wherein said second script mode includes ligatures consisting of n elements merged together, and wherein n is an integer greater than 1, and said rendering means is arranged to identify a ligature in said visual representation of said received body of text and merge the respective placeholders of said output device to correspond with the elements of said ligature.

19. A system according to claim 7, further comprising a multi-dimensional storage grid containing one or more possible translations into said target language, including any alternative translations and spelling variations, corresponding to respective elements, in respect of which said vector paths are assigned to respective elements.

20. The system of claim 19, wherein each dimension of said grid corresponding to a grammatical dimension of a word in said target language, said grid comprising a plurality of cells, each cell being denoted by a vector defining the respective word and the value of each grammatical dimension in respect thereof.

21. A system according to claim 7, further comprising means for discarding any possible translations determined not to correspond with said conceptual determinative.

22. A system according to claim 7, wherein said initial language comprises Ancient Egyptian and said elements comprise symbols and stroke patterns.

23. The system according to claim 7, further comprising a conceptual analyzer for retrieving streams of elements from said data storage system, identifying, using said linking data, the vector paths associated with respective elements and determining therewith the possible translations of said elements from said multi-dimensional storage grid, analyzing said possible translations in conjunction with a respective conceptual determinative, and discarding any possible translations determined not to correspond with said conceptual determinative.

24. The system of claim 7, further comprising a grammar analyzer for retrieving streams of elements from said data storage system, identifying, using said linking data, the vector paths associated with respective elements and determining therewith the possible translations of said elements from said multi-dimensional storage grid, analyzing said possible translations in conjunction with one or more inter-sentence grammatical rules and discarding any possible translations that do not comply with said rules.

25. The system of claim 7, wherein said initial language comprises Ancient Egyptian and said elements comprise symbols and stroke patterns.

* * * * *